US010048500B2

(12) United States Patent
Woodgate et al.

(10) Patent No.: US 10,048,500 B2
(45) Date of Patent: *Aug. 14, 2018

(54) DIRECTIONALLY ILLUMINATED WAVEGUIDE ARRANGEMENT

(71) Applicant: RealD Spark, LLC, Beverly Hills, CA (US)

(72) Inventors: Graham J. Woodgate, Henley on Thames (GB); Michael G. Robinson, Boulder, CO (US); Jonathan Harrold, Leamington Spa (GB); Miller H. Schuck, Erie, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,473

(22) Filed: Jan. 30, 2017

(65) Prior Publication Data

US 2017/0139110 A1 May 18, 2017

Related U.S. Application Data

(63) Continuation of application No. 13/897,039, filed on May 17, 2013, now Pat. No. 9,594,261.

(Continued)

(51) Int. Cl.
*F21V 8/00* (2006.01)
*G02B 27/01* (2006.01)
*G02C 7/02* (2006.01)

(52) U.S. Cl.
CPC ....... *G02B 27/0172* (2013.01); *G02B 6/0023* (2013.01); *G02B 6/0048* (2013.01);
(Continued)

(58) Field of Classification Search
CPC .............. G02B 27/0172; G02B 6/0048; G02B 6/0023; G02B 6/0061; G02B 6/0068; G02B 2027/0134; G02B 2027/0178; G02C 7/02
(Continued)

(56) References Cited

U.S. PATENT DOCUMENTS 2,133,121 A 10/1938 Stearns
2,247,969 A 7/1941 Stewart
(Continued)

FOREIGN PATENT DOCUMENTS

CN 100507678 C 7/2009
CN 201278049 Y 7/2009
(Continued)

OTHER PUBLICATIONS

International search report and written opinion of international searching authority for co-pending PCT application No. PCT/US2013/041192 dated Aug. 28, 2013.
(Continued)

*Primary Examiner* — Zachary Wilkes
*Assistant Examiner* — George G King
(74) *Attorney, Agent, or Firm* — Penny L. Lowry; Neil G. Mothew

(57) ABSTRACT

Disclosed is a light guiding valve apparatus comprising an optical valve, a two dimensional light source array and a focusing optic for providing large area collimated illumination from localized light sources. A stepped waveguide may be a stepped structure, in which the steps may be extraction features optically hidden to guided light, propagating in a first forward direction. Returning light propagating in a second backward direction may be refracted, diffracted, or reflected by the features to provide discrete illumination beams exiting from the top surface of the waveguide. A two dimensional array of viewing windows may be produced.

(Continued)

Such controlled illumination may provide for efficient, multi-user autostereoscopic displays with wide viewing freedom and low cross talk and near-eye displays that are substantially transparent.

10 Claims, 45 Drawing Sheets

Related U.S. Application Data

(60) Provisional application No. 61/648,873, filed on May 18, 2012, provisional application No. 61/649,141, filed on May 18, 2012.

(52) U.S. Cl.
CPC ......... *G02B 6/0061* (2013.01); *G02B 6/0068* (2013.01); *G02C 7/02* (2013.01); *G02B 2027/0134* (2013.01); *G02B 2027/0178* (2013.01)

(58) Field of Classification Search
USPC .................................................. 359/13, 466
See application file for complete search history.

(56) References Cited

U.S. PATENT DOCUMENTS

| | | |
|---|---|---|
| 2,480,178 A | 8/1949 | Zinberg |
| 2,810,905 A | 10/1957 | Barlow |
| 5,347,644 A | 9/1994 | Sedlmayr |
| 5,703,667 A | 12/1997 | Ochiai |
| 5,727,107 A | 3/1998 | Umemoto et al. |
| 5,771,066 A | 6/1998 | Bamea |
| 5,896,225 A | 4/1999 | Chikazawa |
| 5,903,388 A | 5/1999 | Sedlmayr |
| 5,959,664 A | 9/1999 | Woodgate |
| 5,971,559 A | 10/1999 | Ishikawa et al. |
| 6,014,164 A | 1/2000 | Woodgate et al. |
| 6,061,489 A | 5/2000 | Ezra et al. |
| 6,075,557 A | 6/2000 | Holliman et al. |
| 6,108,059 A | 8/2000 | Yang |
| 6,144,118 A | 11/2000 | Cahill et al. |
| 6,199,995 B1 | 3/2001 | Umemoto |
| 6,305,813 B1 | 10/2001 | Lekson et al. |
| 6,422,713 B1 | 7/2002 | Fohl et al. |
| 6,464,365 B1 | 10/2002 | Gunn et al. |
| 6,663,254 B2 | 12/2003 | Ohsumi |
| 6,847,488 B2 | 1/2005 | Travis |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate |
| 7,073,933 B2 | 7/2006 | Gotoh et al. |
| 7,101,048 B2 | 9/2006 | Travis |
| 7,136,031 B2 | 11/2006 | Lee et al. |
| 7,215,415 B2 | 5/2007 | Maehara |
| 7,410,286 B2 | 8/2008 | Travis |
| 7,430,358 B2 | 9/2008 | Qi et al. |
| 7,528,893 B2 | 5/2009 | Schultz |
| 7,545,429 B2 | 6/2009 | Travis |
| 7,660,047 B1 | 2/2010 | Travis et al. |
| 7,750,981 B2 | 7/2010 | Shestak |
| 7,750,982 B2 | 7/2010 | Nelson et al. |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton |
| 8,223,296 B2 | 7/2012 | Lee et al. |
| 8,325,295 B2 | 12/2012 | Sugita |
| 8,354,806 B2 | 1/2013 | Travis |
| 8,477,261 B2 | 7/2013 | Travis |
| 8,534,901 B2 | 9/2013 | Panagotacos et al. |
| 8,556,491 B2 | 10/2013 | Lee |
| 8,651,725 B2 | 2/2014 | Ie et al. |
| 8,714,804 B2 | 5/2014 | Kim et al. |
| 2002/0113866 A1 | 8/2002 | Taniguchi et al. |
| 2003/0137738 A1 | 7/2003 | Ozawa et al. |
| 2003/0137821 A1 | 7/2003 | Gotoh et al. |
| 2004/0108971 A1 | 6/2004 | Waldern et al. |
| 2004/0170011 A1 | 9/2004 | Kim et al. |
| 2004/0263968 A1 | 12/2004 | Kobayashi et al. |
| 2005/0135116 A1 | 6/2005 | Epstein et al. |
| 2005/0180167 A1 | 8/2005 | Hoelen et al. |
| 2005/0264717 A1 | 12/2005 | Chien et al. |
| 2005/0276071 A1 | 12/2005 | Sasagawa et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0215129 A1 | 9/2006 | Alasaarela et al. |
| 2006/0221642 A1 | 10/2006 | Daiku |
| 2006/0269213 A1 | 11/2006 | Hwang et al. |
| 2006/0291053 A1 | 12/2006 | Robinson et al. |
| 2006/0291243 A1 | 12/2006 | Niioka et al. |
| 2007/0025680 A1 | 2/2007 | Winston et al. |
| 2007/0115551 A1 | 5/2007 | Spilman et al. |
| 2007/0115552 A1 | 5/2007 | Robinson et al. |
| 2007/0188667 A1 | 8/2007 | Schwerdtner |
| 2007/0223252 A1 | 9/2007 | Lee et al. |
| 2008/0084519 A1 | 4/2008 | Brigham et al. |
| 2008/0086289 A1 | 4/2008 | Brott |
| 2008/0225205 A1 | 9/2008 | Travis |
| 2008/0259012 A1 | 10/2008 | Fergason |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0067156 A1 | 3/2009 | Bonnett et al. |
| 2009/0140656 A1 | 6/2009 | Kohashikawa et al. |
| 2009/0160757 A1 | 6/2009 | Robinson |
| 2009/0190079 A1 | 7/2009 | Saitoh |
| 2009/0225380 A1 | 9/2009 | Schwerdtner |
| 2009/0278936 A1 | 11/2009 | Pastoor et al. |
| 2010/0053771 A1 | 3/2010 | Travis et al. |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0188438 A1 | 7/2010 | Kang |
| 2010/0188602 A1 | 7/2010 | Feng |
| 2010/0214135 A1 | 8/2010 | Bathiche |
| 2010/0220260 A1 | 9/2010 | Sugita et al. |
| 2010/0231498 A1 | 9/2010 | Large |
| 2010/0277575 A1 | 11/2010 | Ismael et al. |
| 2010/0278480 A1 | 11/2010 | Vasylyev |
| 2010/0295930 A1 | 11/2010 | Ezhov |
| 2010/0300608 A1 | 12/2010 | Emerton et al. |
| 2011/0032483 A1 | 2/2011 | Hruska et al. |
| 2011/0044056 A1 | 2/2011 | Travis |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0188120 A1 | 8/2011 | Tabirian et al. |
| 2011/0216266 A1 | 9/2011 | Travis |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0310232 A1 | 12/2011 | Wilson et al. |
| 2012/0002136 A1 | 1/2012 | Nagata et al. |
| 2012/0013720 A1 | 1/2012 | Kadowaki et al. |
| 2012/0127573 A1 | 5/2012 | Robinson et al. |
| 2012/0243204 A1 | 9/2012 | Robinson |
| 2013/0101253 A1 | 4/2013 | Popovich et al. |
| 2013/0135588 A1 | 5/2013 | Popovich et al. |
| 2013/0222234 A1* | 8/2013 | Tanaka ............... G09G 5/10 345/156 |
| 2014/0376207 A1* | 12/2014 | Futterer ............ G02B 6/0035 362/97.1 |

FOREIGN PATENT DOCUMENTS

| | | |
|---|---|---|
| EP | 0860729 | 8/1998 |
| EP | 0939273 | 1/1999 |

(56) References Cited

FOREIGN PATENT DOCUMENTS

| | | |
|---|---|---|
| EP | 0708351 B1 | 3/2003 |
| EP | 2003394 | 12/2008 |
| JP | 08-237691 | 9/1996 |
| JP | 08254617 | 10/1996 |
| JP | 08340556 | 12/1996 |
| JP | 2000-200049 | 7/2000 |
| JP | 2002049004 | 2/2002 |
| JP | 2003-215705 | 7/2003 |
| JP | 2004319364 | 11/2004 |
| JP | 2005135844 | 5/2005 |
| JP | 2005183030 | 7/2005 |
| JP | 2005-259361 | 9/2005 |
| JP | 2006004877 | 1/2006 |
| JP | 2006031941 | 2/2006 |
| JP | 3968742 B2 | 8/2007 |
| JP | 2007273288 A | 10/2007 |
| JP | 2008204874 | 9/2008 |
| KR | 1020030064258 | 7/2003 |
| KR | 10-0932304 | 12/2009 |
| KR | 1020110006773 | 1/2011 |
| KR | 1020110017918 | 2/2011 |
| KR | 1020110067534 | 6/2011 |
| KR | 10-2012-004989 | 5/2012 |
| KR | 1020120048301 | 5/2012 |
| WO | 2001-061241 | 8/2001 |
| WO | 2011149739 | 12/2011 |

OTHER PUBLICATIONS

International search report and written opinion of international search authority for co-pending PCT application No. PCT/US2013/041619 dated Aug. 27, 2013.
International search report and written opinion of international searching authority for co-pending PCT application No. PCT/US2013/041655 dated Aug. 27, 2013.
International search report and written opinion of international searching authority for co-pending PCT application No. PCT/US2013/041703 dated Aug. 27, 2013.
International search report and written opinion of international searching authority for co-pending PCT application No. PCT/US2013/041548 mailed Aug. 27, 2013.
International search report and written opinion of international searching authority for co-pending PCT application No. PCT/US2013/041683 dated Aug. 27, 2013.
International search report and written opinion of international searching authority for co-pending PCT application No. PCT/US2013/041228 dated Aug. 23, 2013.
International search report and written opinion of international searching authority for co-pending PCT application No. PCT/US2013/041235 dated Aug. 23, 2013.
International search report and written opinion of international searching authority for co-pending PCT application No. PCT/US2013/041697 dated Aug. 23, 2013.
Tabiryan et al., "The Promise of Diffractive Waveplates," Optics and Photonics News, vol. 21, Issue 3, pp. 40-45 (Mar. 2010).
International search report and written opinion of international searching authority in PCT/US2012/042279 dated Feb. 26, 2013.
International search report and written opinion of international searching authority in PCT/US2012/037677 dated Jun. 29, 2012.
International search report and written opinion of international searching authority in PCT/US2011/061511 dated Jun. 29, 2012.
Kalantar, et al. "Backlight Unit With Double Surface Light Emission," J. Soc. Inf. Display, vol. 12, Issue 4, pp. 379-387 (Dec. 2004).
International search report and written opinion of the international searching authority from PCT/US12/052189 dated Jan. 29, 2013.
International Preliminary Report on Patentability in PCT/US2011/061511 dated May 21, 2013.
Travis, et al. "Backlight for view-sequential autostereo 3D".
International search report and written opinion of international searching authority for PCT application PCT/US2013/063133 dated Jan. 20, 2014.
International search report and written opinion of international searching authority for PCT application PCT/US2013/063125 dated Jan. 20, 2014.
International search report and written opinion of international searching authority for PCT application PCT/US2013/077288 dated Apr. 18, 2014.
International search report and written opinion of international searching authority for PCT application PCT/US2014/017779 dated May 28, 2014.
EP-13790195.5 European Extended Search Report of European Patent Office dated Mar. 2, 2016.
PCT/US2013/041619 International search report on patentability dated Nov. 18, 2014.
JP 2015-512887 1st Office Action (translated) dated Feb. 7, 2017.
CN-201380026070.8 Chinese 1st Office Action of the State Intellectual Property Office of P.R. dated Jul. 3, 2017.

* cited by examiner

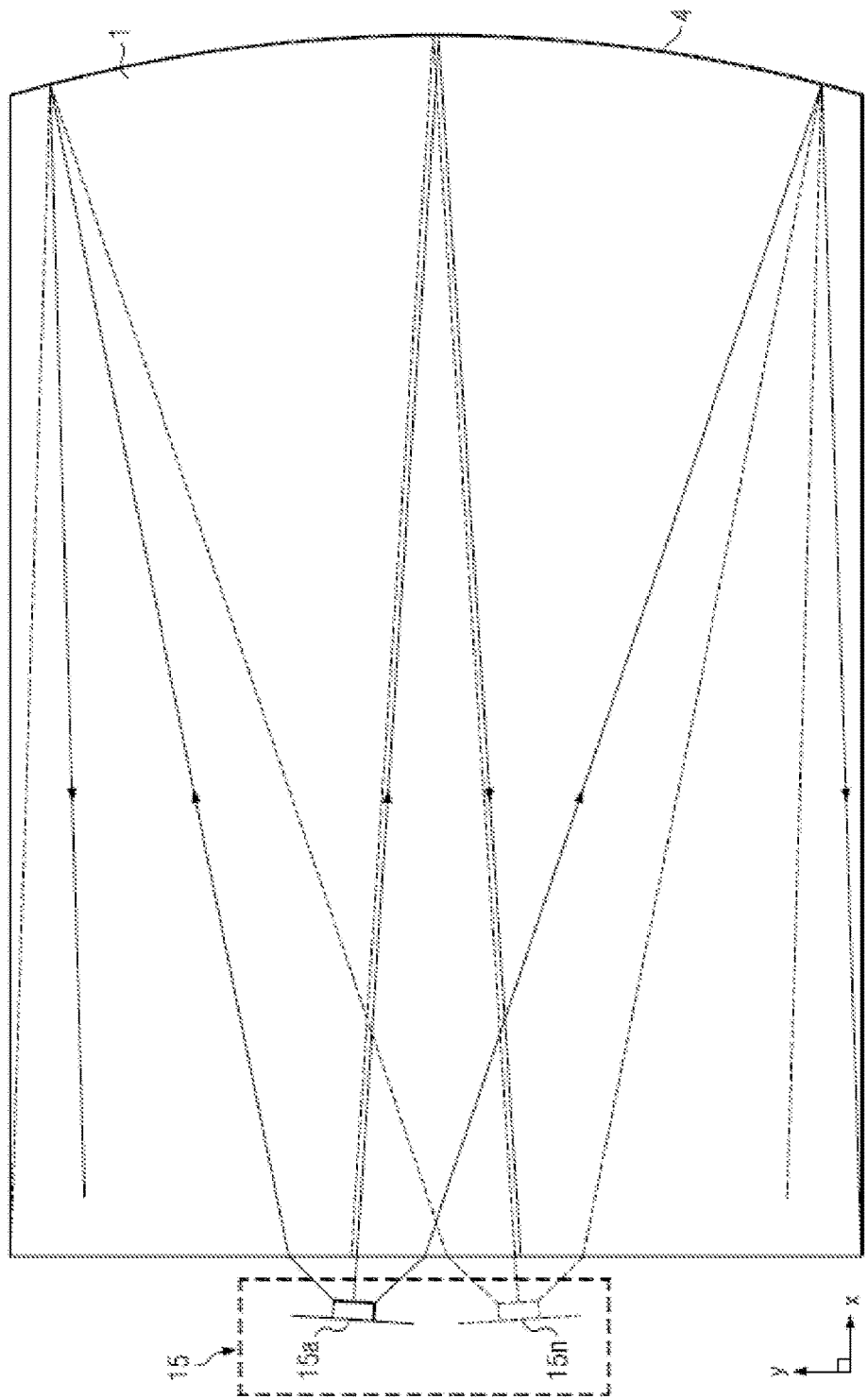

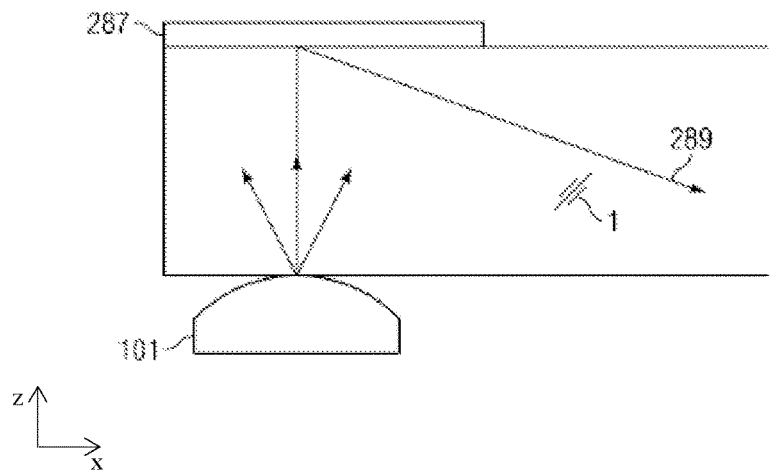
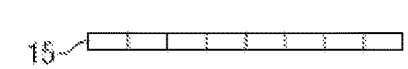
FIG. 32
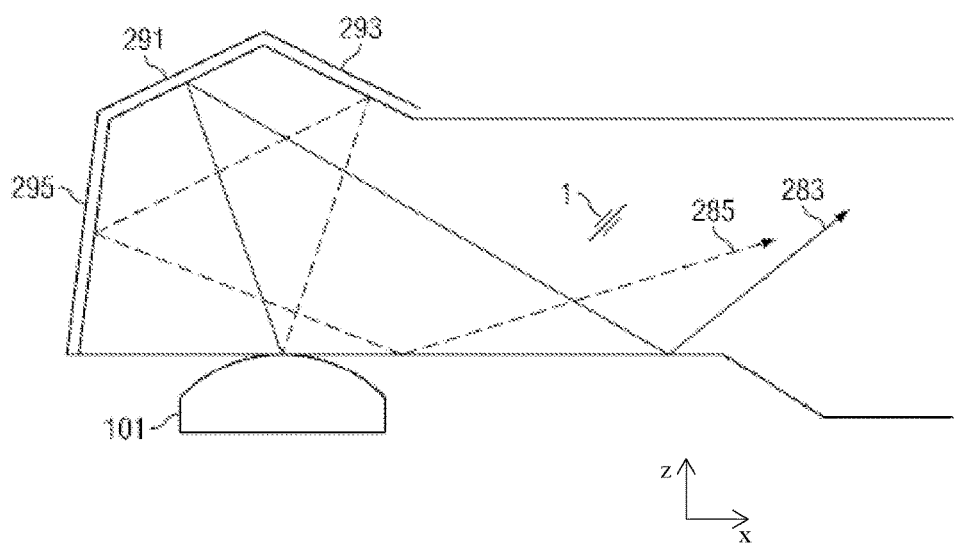
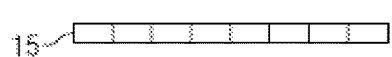
FIG. 33

DIRECTIONALLY ILLUMINATED WAVEGUIDE ARRANGEMENT

CROSS-REFERENCE TO RELATED APPLICATIONS

This application is a continuation of U.S. patent application Ser. No. 13/897,039, which in turn claims priority to U.S. patent application Ser. No. 61/648,873, entitled "Imaging directional backlight with two dimensional window arrays", filed 18 May 2012, and to U.S. patent application Ser. No. 61/649,141, entitled "Planar display apparatus", filed 18 May 2012, the entireties of which are herein incorporated by reference.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to an aspect of the present disclosure, there is provided a directionally-illuminated waveguide arrangement, comprising: a waveguide comprising an input end and first and second, opposed guide surfaces for guiding light along the waveguide. The first guide surface may be arranged to guide light by total internal reflection. The second guide surface may have a stepped shape comprising a plurality of facets extending in a lateral direction across the waveguide and oriented to reflect input light from input end through the first guide surface as output light. The second guide surface may further have intermediate regions between the facets that are arranged to direct light through the waveguide without extracting it. The waveguide arrangement may further comprise an illumination system selectively operable to provide the input light directed (a) from different lateral positions distributed in the lateral direction and (b) in different input directions distributed perpendicular to the lateral direction. The input light output through the first guide surface may be directed in output directions that are (a) distributed with respect to a normal to the first guide surface in the lateral direction in dependence on the lateral position of the input light. The input light output through the first guide surface may be directed in output directions that are (b) distributed with respect to a normal to the first guide surface in a perpendicular direction to the lateral direction in dependence on the input direction of the input light.

The present embodiments may advantageously achieve illumination that may be modulated in first and second angular orthogonal directions from points across the area of the waveguide.

In one use, such directional illumination can achieve a two dimensional array of viewing windows in a directional display device arranged for far field viewing. In that case, the waveguide may form part of a directional display device that further includes a transmissive spatial light modulator extending across first guide surface of the waveguide and arranged to modulate light output therethrough. Such a directional display can be used for autostereoscopic 3D display, privacy display, and high efficiency display modes. Such displays may be arranged to operate in landscape and portrait modes, and for orientations between the two, and thus is well suited to mobile display platforms. Further, such displays can achieve observer tracking functions for horizontal and vertical movements of an observer. According to a further aspect, a display apparatus may comprise the directional display device and a control system arranged to selectively operate the illumination system to direct light into viewing windows corresponding to said output directions. The display apparatus may be an autostereoscopic display apparatus wherein the control system is further arranged to control the display device to display temporally multiplexed left and right images and synchronously to direct the displayed images into viewing windows in positions corresponding to left and right eyes of an observer. The control system may further comprise a sensor system arranged to detect the position of an observer across the display device, and the control system may be arranged to direct the displayed images into viewing windows in positions corresponding to left and right eyes of an observer, in dependence on the detected position of the observer.

In a further use, such directional illumination can be used to display a collimated image, thereby achieving a near-eye display apparatus. In this case, the illumination system may be operated to provide the input light directed (a) from the different lateral positions and (b) in the different input directions in accordance with an image to be displayed so that the output light represents said image as a collimated image. For example in a near-eye display apparatus, the illumination system may be operated by a control system in accordance with image data representing the image. As a result, the output light may represent the image as a collimated image. The two dimensional angularly modulated output can be imaged by an observer's eye to a retinal image when placed in proximity to the cornea of the observer. The waveguide may have high transmission to external light but may provide a bright image. One or two eyes may be illuminated by a single observer, and a large output optical pupil size may be provided for convenient placement of the waveguide with respect to the eye's input pupil.

To allow use as a near-field display, such a waveguide arrangement may be conveniently incorporated into a head-mounted apparatus that is adapted to be worn on the head of a user with the waveguide arranged to extend across at least one eye of the user when the head-mounted apparatus is worn. The apparatus may also be arranged with communications system to enable provision of image data.

According to a further aspect of the present disclosure, a directional illumination apparatus may include an imaging directional backlight for directing light which may include a waveguide and an input optic located between the first and second light guiding surfaces, the input optic operable to direct light from each element of an array of illumination elements into respective different directional distributions within the imaging directional backlight. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

The present embodiments achieve a two dimensional array of windows from a display apparatus comprising an imaging directional backlight, and in particular stepped waveguide imaging directional backlights comprising further input focusing optics. Such a two dimensional window array advantageously may achieve enhanced functionality including vertical look-around, head tilt tracking, landscape-portrait operation and an increased number of independently tracked observers and is thus particularly suitable for large area display. Further, the present embodiments may efficiently limit the range of angles propagating within the stepped waveguide that may be used to achieve more compact display structures.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1A is a schematic diagram illustrating a front view of light propagation in one embodiment of a directional display device, in accordance with the present disclosure;

FIG. 32 is a schematic diagram illustrating in side view, the propagation of light into a stepped waveguide including a holographic deflector element, in accordance with the present disclosure;

FIG. 33 is a schematic diagram illustrating in side view, the propagation of light into a stepped waveguide including a prismatic deflector element, in accordance with the present disclosure;

DETAILED DESCRIPTION

Figure 1B:
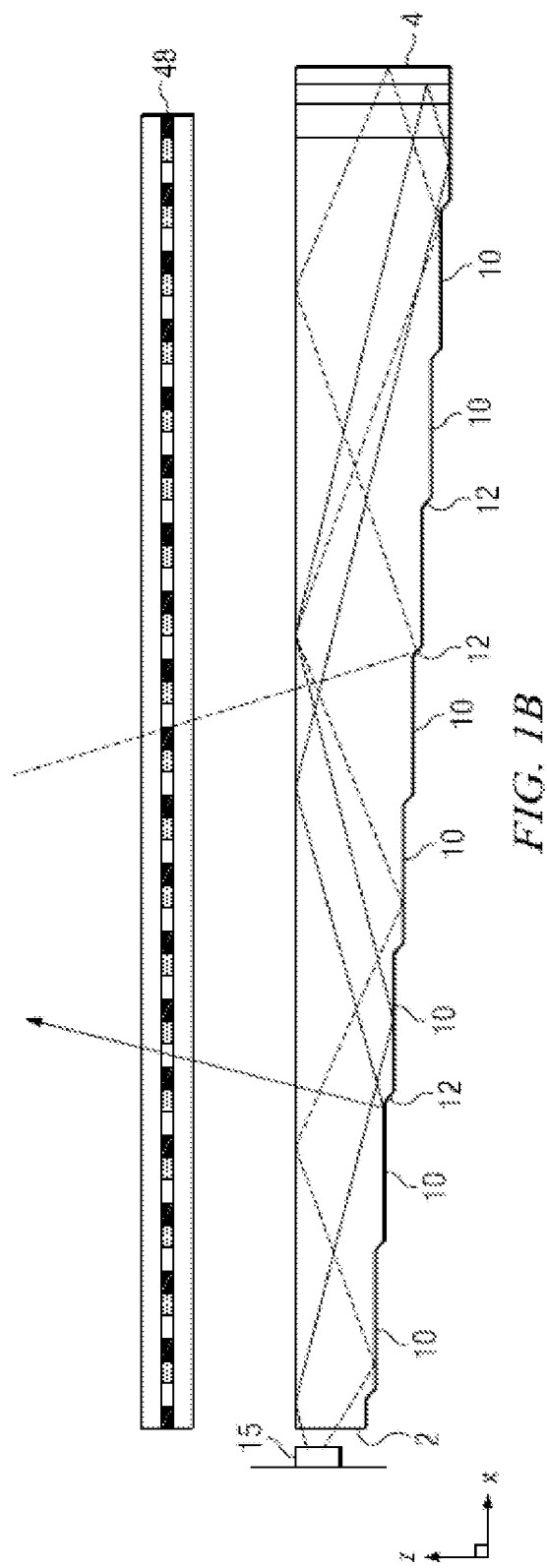
FIG. 1B is a schematic diagram illustrating a side view of light propagation in one embodiment of the directional display device of FIG. 1A, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illumination array through a substantially transparent time multiplexed spatial light modulator using directional optical elements, wherein the directional optical elements substantially form an image of the illumination array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illumination elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illumination elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kalil Kalantar—et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (which is sometimes referred to as a "light valve"). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side guide surface and a first second guide surface comprising a set plurality of light extraction features and intermediate regions. As the light travels along the length of the stepped waveguide, the light may not substantially change angle of incidence with respect to the first and second guide surfaces and so may not reach the critical angle of the medium at these internal surfaces. Light extraction may be advantageously achieved by a second set of surfaces light extraction features which may be facets of the second guide surface (the step "risers") that are inclined to the first set of surfaces intermediate regions (the step "treads"). Note that the second set of surfaces light extraction features may not be part of the light guiding operation of the stepped waveguide, but may be arranged to provide light extraction from the structure. By contrast, a wedge type imaging directional backlight may allow light to guide within a wedge profiled waveguide having continuous internal surfaces. Thus the stepped waveguide (optical valve) is thus not a wedge type imaging directional backlight.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of an optical valve, and includes an illumination array 15 which may be used to illuminate a stepped waveguide 1. Illumination array 15 includes illumination elements 15a through illumination element 15n (where n is an integer greater than one). In one example, the stepped waveguide 1 of FIG. 1A may be a stepped, display sized waveguide 1. Illuminator elements 15a through 15n constitute light sources and may be light emitting diodes (LEDs). Although LEDs are discussed herein as illumination elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illumination array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illumination array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illumination elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape consisting of the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illumination elements 15a-15n may be selectively operated to direct light into a selectable optical window.

In the present disclosure an optical window may correspond to the image of a single light source in the window plane, being a nominal plane in which optical windows form across the entirety of the display device. Alternatively, an optical window may correspond to the image of a groups of light sources that are driven together. Advantageously, such groups of light sources may increase uniformity of the optical windows of the array 121.

By way of comparison, a viewing window is a region in the window plane wherein light is provided comprising image data of substantially the same image from across the display area. Thus a viewing window may be formed from a single optical window or from plural optical windows, under the control of the control system.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illumination array 15, such as an array of illumination elements 15a through 15n, located at different positions, y, along the surface of input end 2, x=0, of the stepped waveguide 1. The light may propagate along +x in a first direction, within the stepped waveguide 1, while at the same time, the light may fan out in the xy plane and upon reaching the reflective end 4 that is curved to have positive optical power, may substantially or entirely fill the reflective end 4. While propagating, the light may spread out to a set of angles in the xz plane up to, but not exceeding the critical angle of the guide material. The extraction features 12 that link the guiding features 10 of the second guide surface of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the reflective end 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illumination element 15a-15n in illumination array 15 from the input edge center. Having independent illumination elements 15a-15n along the input end 2 then enables light to exit from the entire first guide surface 6 and propagate at different external angles, as illustrated in FIG. 1A.

Figure 2A:
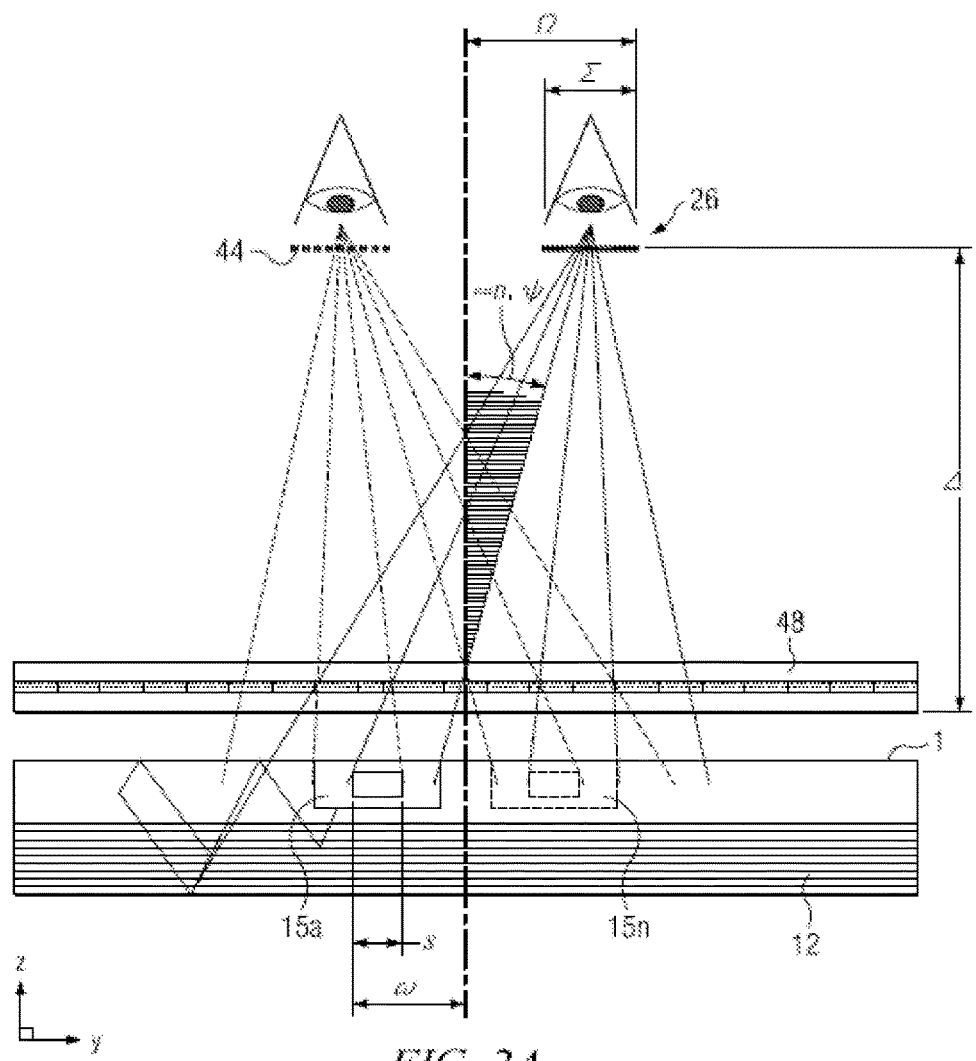
FIG. 2A is a schematic diagram illustrating in a top view of light propagation in another embodiment of a directional display device, in accordance with the present disclosure.
Figure 2B:
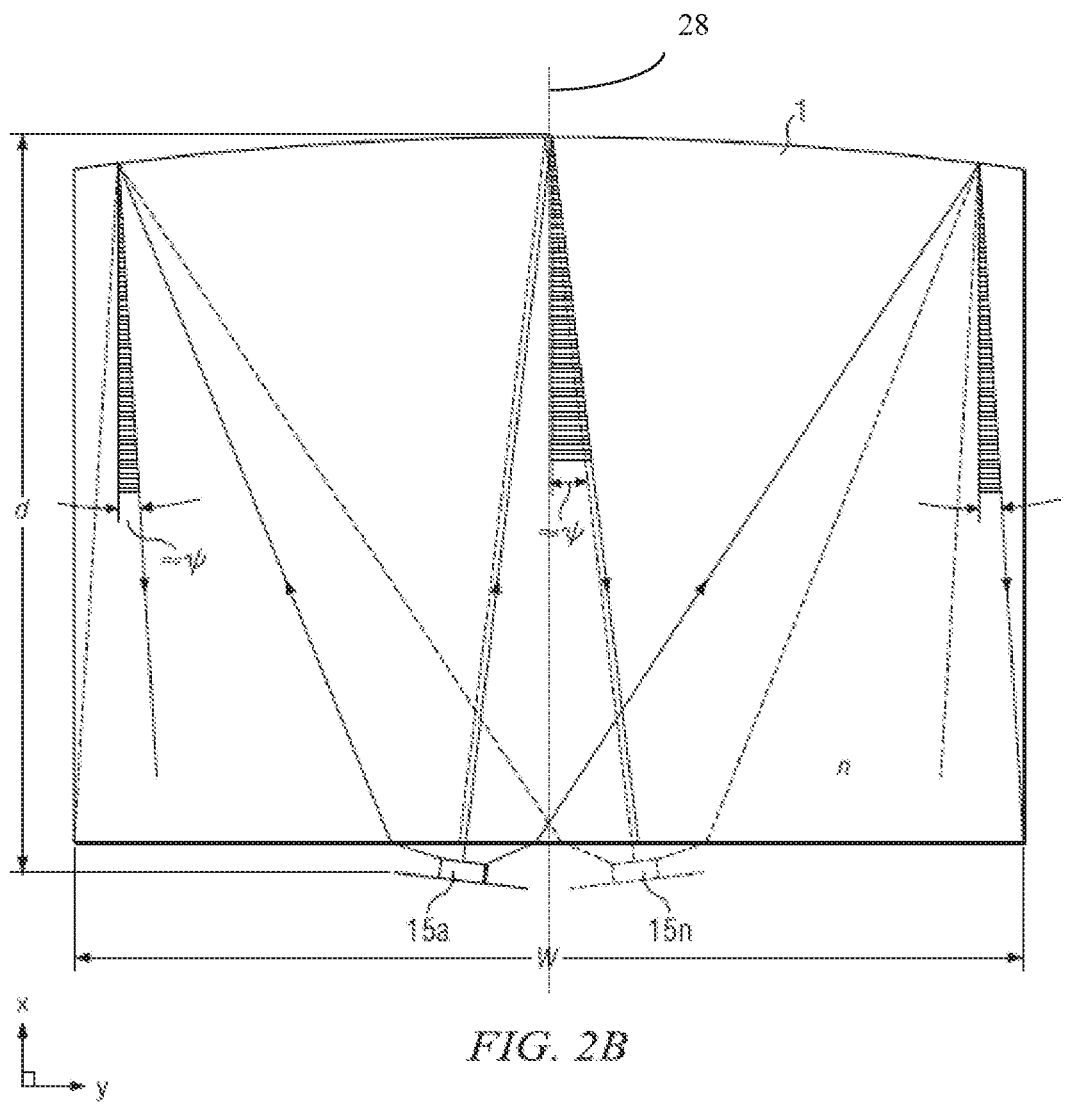
FIG. 2B is a schematic diagram illustrating light propagation in a front view of the directional display device of FIG. 2A, in accordance with the present disclosure.
Figure 2C:
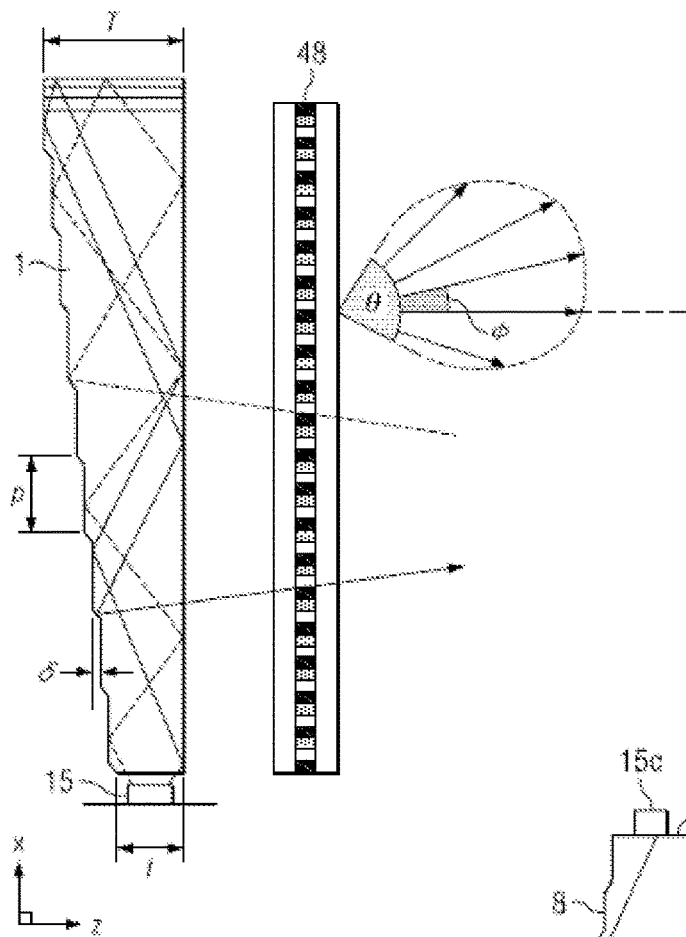
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illumination array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illumination elements 15a through 15n of illumination array 15 (where n is an integer greater than one) may be selectively turned on and off, providing illuminating light that enters right and left eyes substantially independently by virtue of the system's directionality. In the simplest case, sets of illumination elements of illumination array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 28 is typically coincident with the mechanical axis of the waveguide 1. In the present embodiments that typically comprise a substantially cylindrical reflecting surface at end 4, the optical axis 28 is a line that passes through the center of curvature of the surface at end 4 and coincides with the axis of reflective symmetry of the side 4 about the x-axis. The optical axis 28 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
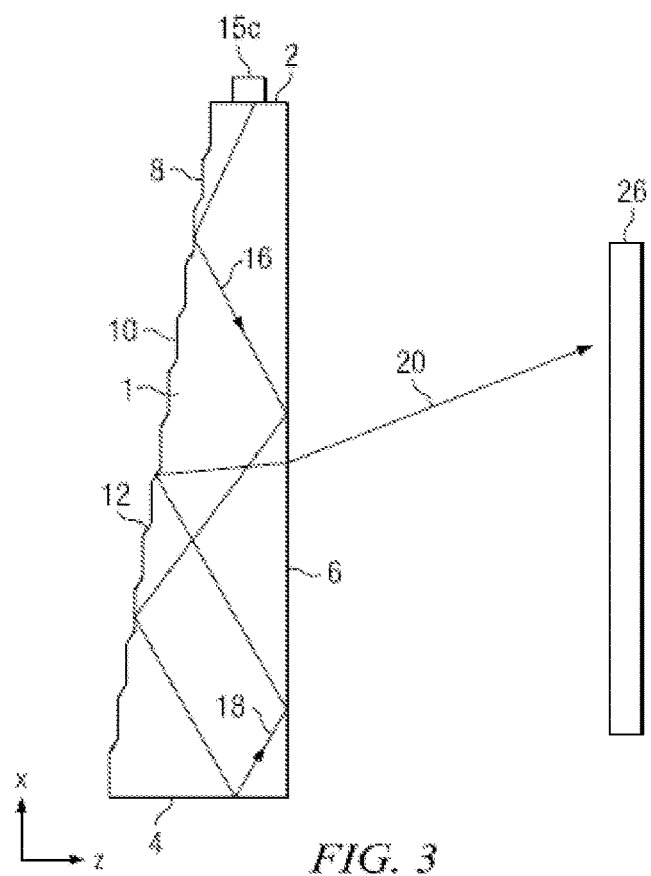
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an input end 2, a reflective end 4, a first guide surface 6 which may be substantially planar, and a second guide surface 8 which includes guiding features 10 and light extraction features 12. In operation, light rays 16 from an illumination element 15c of an illumination array 15 (not shown in FIG. 3), that may be an addressable array of LEDs for example, may be guided in the stepped waveguide 1 by means of total internal reflection by the first guide surface 6 and total internal reflection by the guiding features 10 of the second guide surface 8, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the first guide surface 6 to an optical pupil that may form a viewing window 26 of an autostereoscopic display. The width of the viewing window 26 may be determined by at least the size of the illuminator, output design distance and optical power in the reflective end 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the SLM 48 that intersect with a plane at the nominal viewing distance.

Figure 4A:
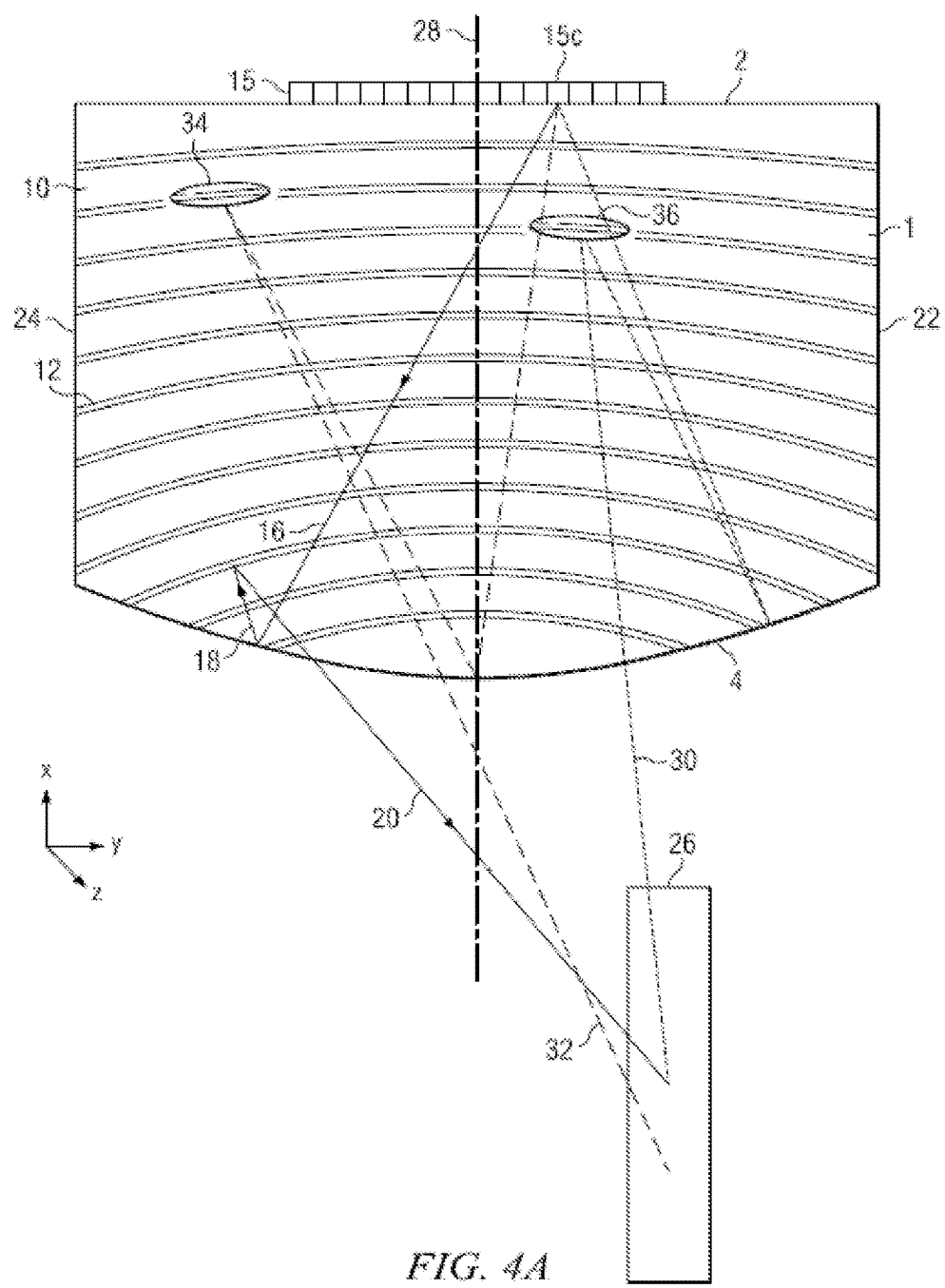
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illumination element and including curved light extraction features. In FIG. 4A, the directional backlight may include the stepped waveguide 1 and the light source illumination array 15. Further, FIG. 4A shows in front view further guiding of light rays from illumination element 15c of illumination array 15, in the stepped waveguide 1. Each of the output rays are directed towards the same viewing window 26 from the respective illumination element 15c. Thus light ray 30 may intersect the ray 20 in the window 26, or may have a different height in the window as shown by ray 32. Additionally, in various embodiments, sides 22, 24 of the optical valve may be transparent, mirrored, or blackened surfaces. Continuing the discussion of FIG. 4A, light extraction features 12 may be elongate, and the orientation of light extraction features 12 in a first region 34 of the light directing second guide surface 8 (which second guide surface 8 is shown in FIG. 3, but not shown in FIG. 4A) may be different to the orientation of light extraction features 12 in a second region 36 of the guide surface 8.

Figure 4B:
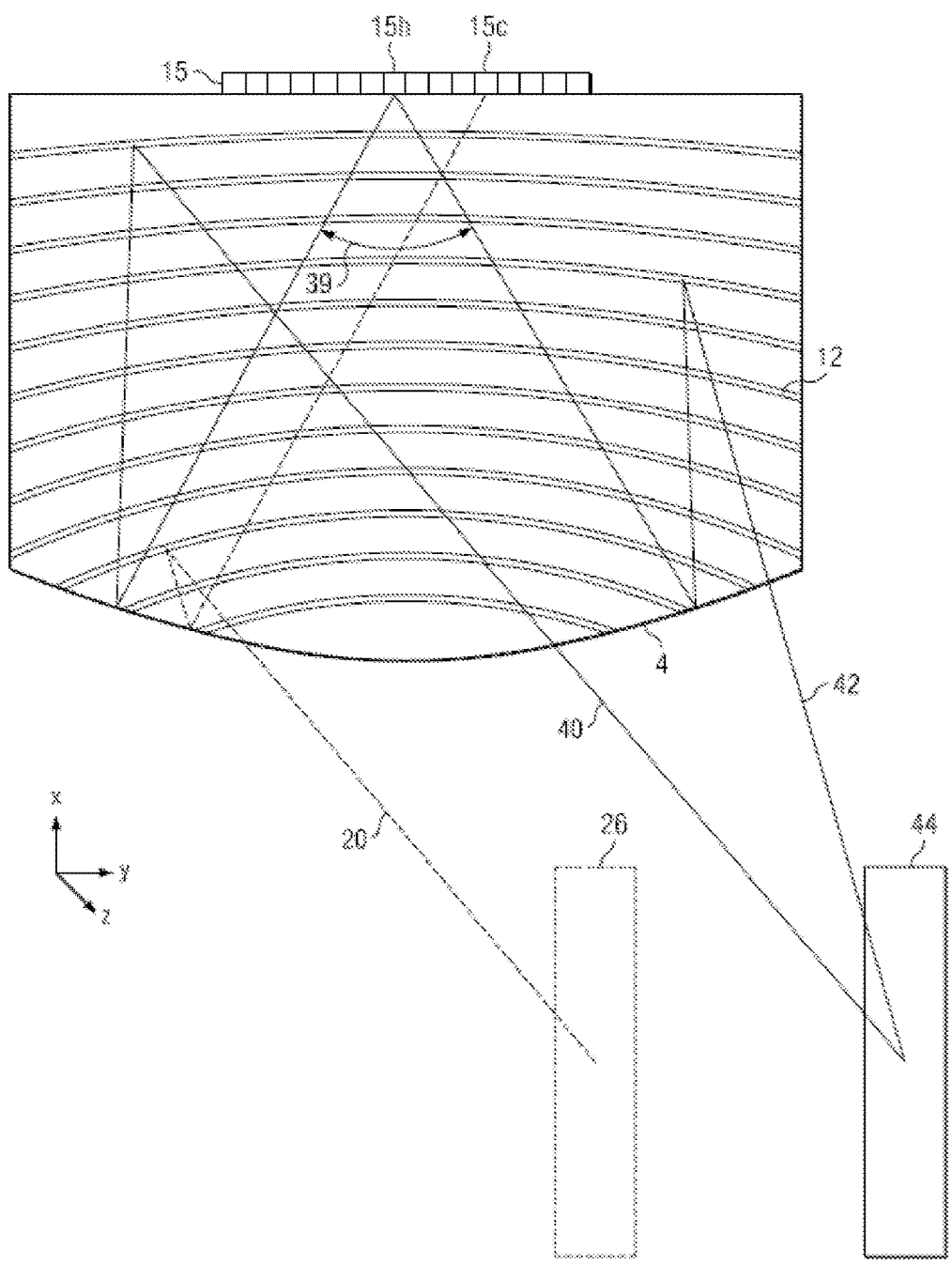
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illumination element. Further, FIG. 4B shows the light rays 40, 42 from a second illumination element 15h of the illumination array 15. The curvature of the reflective surface on the reflective end 4 and the light extraction features 12 cooperatively produce a second viewing window 44 laterally separated from the viewing window 26 with light rays from the illumination element 15h.

Advantageously, the arrangement illustrated in FIG. 4B may provide a real image of the illumination element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illumination element 15c to lateral positions in viewing window 26. Improved aberrations may achieve an extended viewing freedom for an autostereoscopic display while achieving low cross talk levels.

Figure 5:
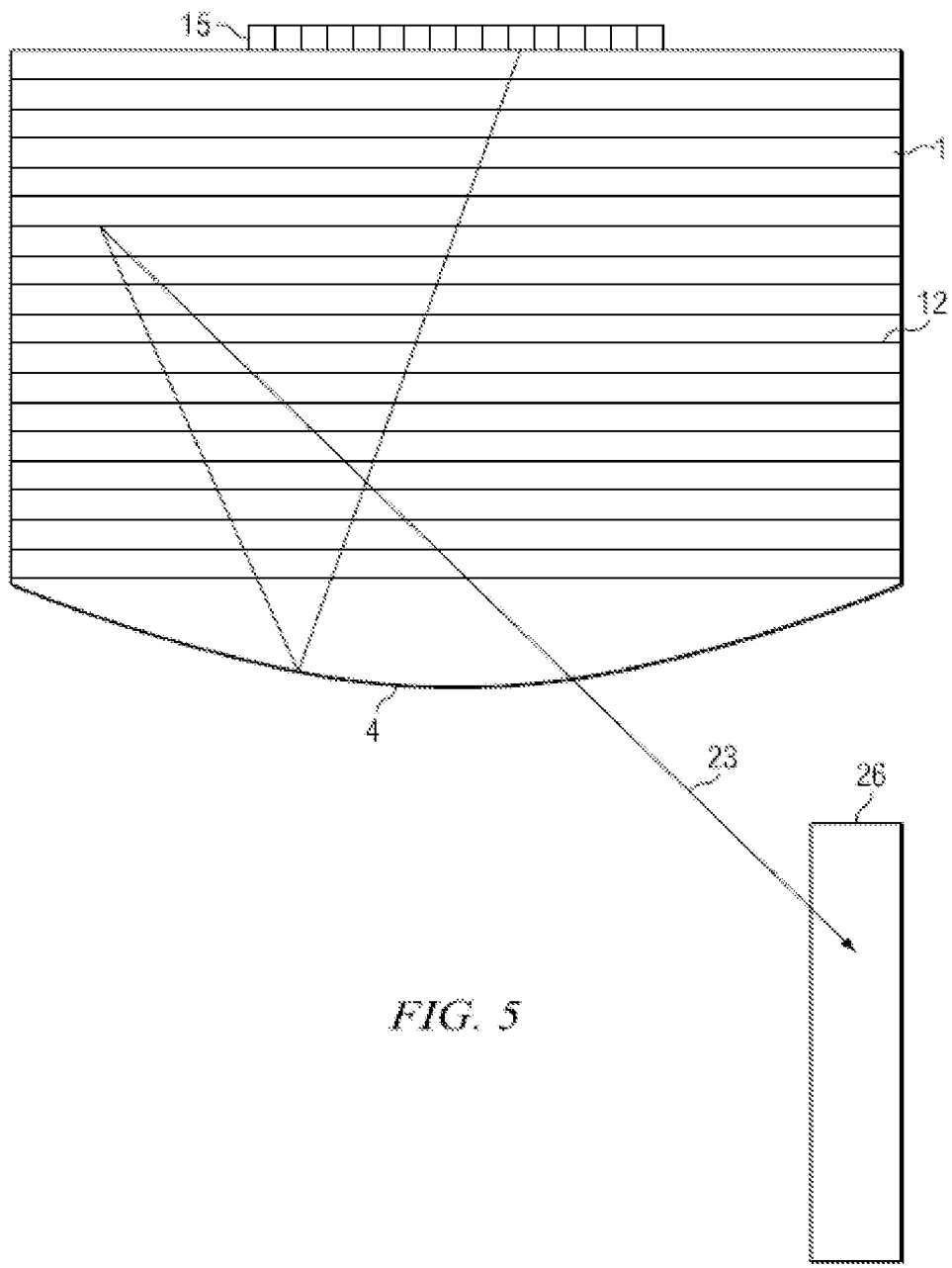
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device comprising a waveguide 1 having substantially linear light extraction features 12. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
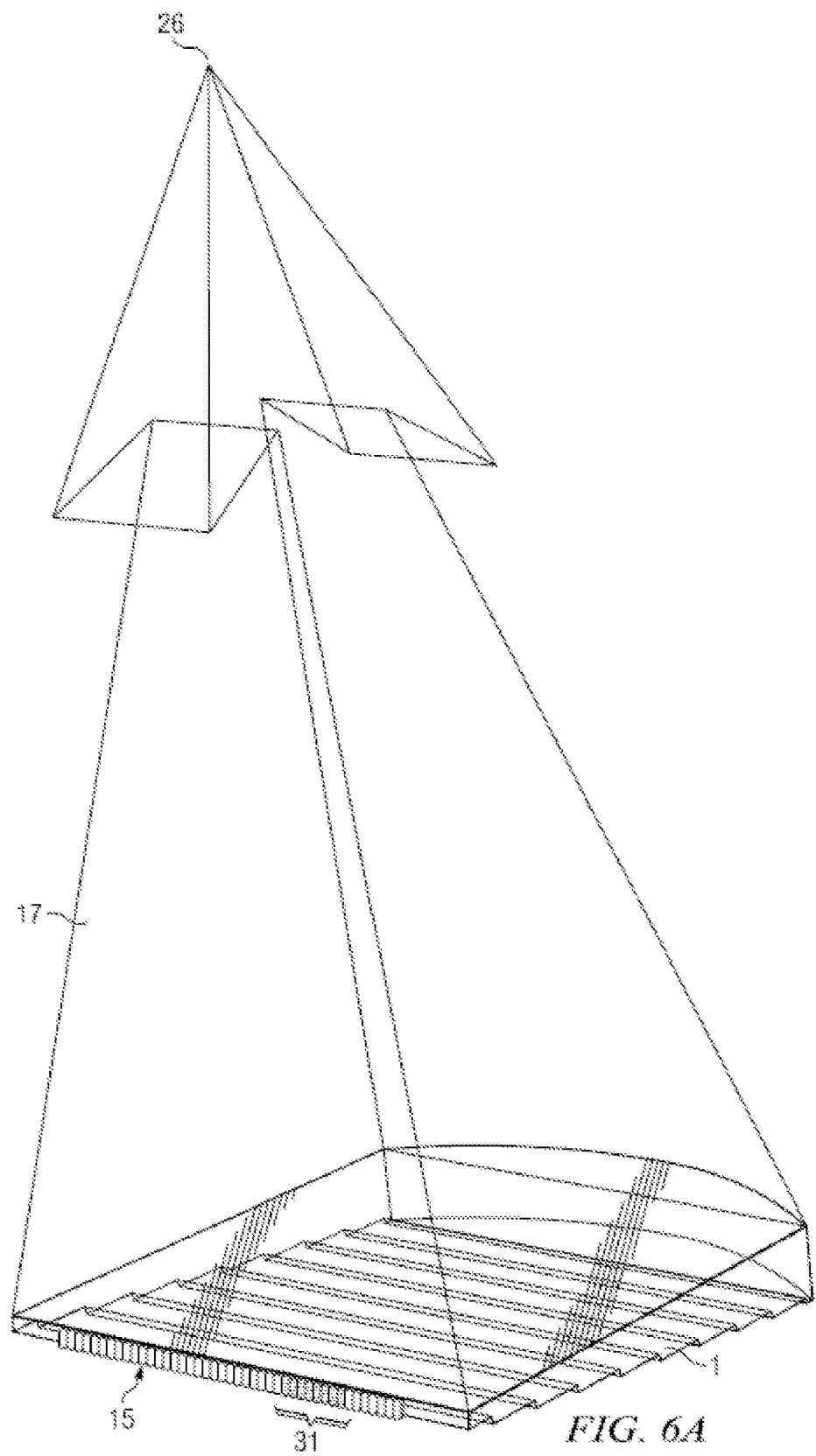
FIG. 6A is a schematic diagram illustrating one embodiment of the generation of a first viewing window in a time multiplexed imaging directional display device in a first time slot, in accordance with the present disclosure.
Figure 6B:
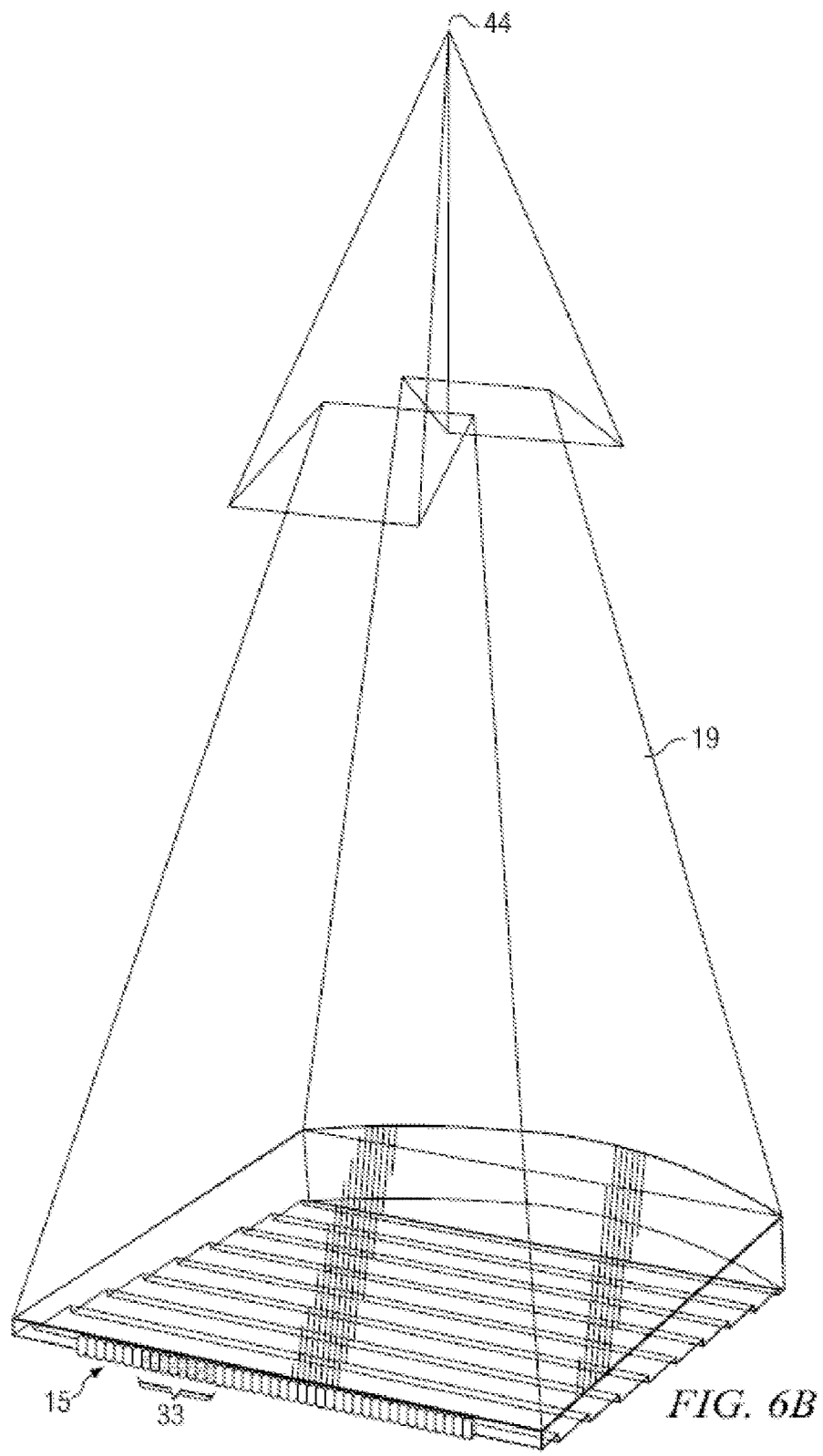
FIG. 6B is a schematic diagram illustrating another embodiment of the generation of a second viewing window in a time multiplexed directional display device in a second time slot, in accordance with the present disclosure.
Figure 6C:
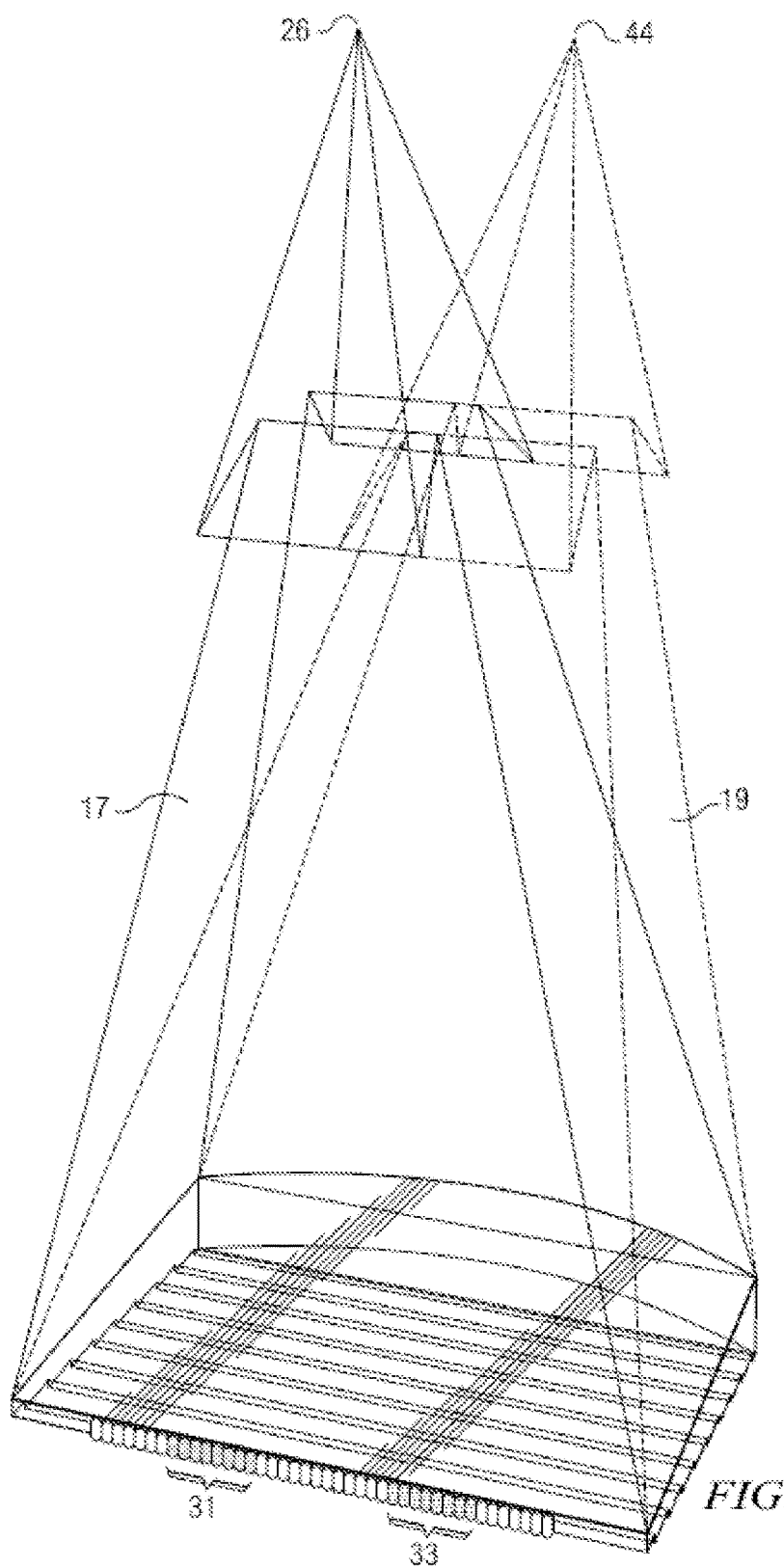
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed directional display device in a first time slot, FIG. 6B is a schematic diagram illustrating another embodiment of the generation of a second viewing window in a time multiplexed directional display device in a second time slot, and FIG. 6C is a schematic diagram illustrating another embodiment of the generation of a first and a second viewing window in a time multiplexed directional display device. Further, FIG. 6A shows schematically the generation of illumination window 26 from stepped waveguide 1. Illumination element group 31 in illumination array 15 may provide a light cone 17 directed towards a viewing window 26. FIG. 6B shows schematically the generation of illumination window 44. Illumination element group 33 in illumination array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all directional backlights and directional display devices described herein. Note that illumination element groups 31, 33 each include one or more illumination elements from illumination elements 15a to 15n, where n is an integer greater than one.

Figure 7:
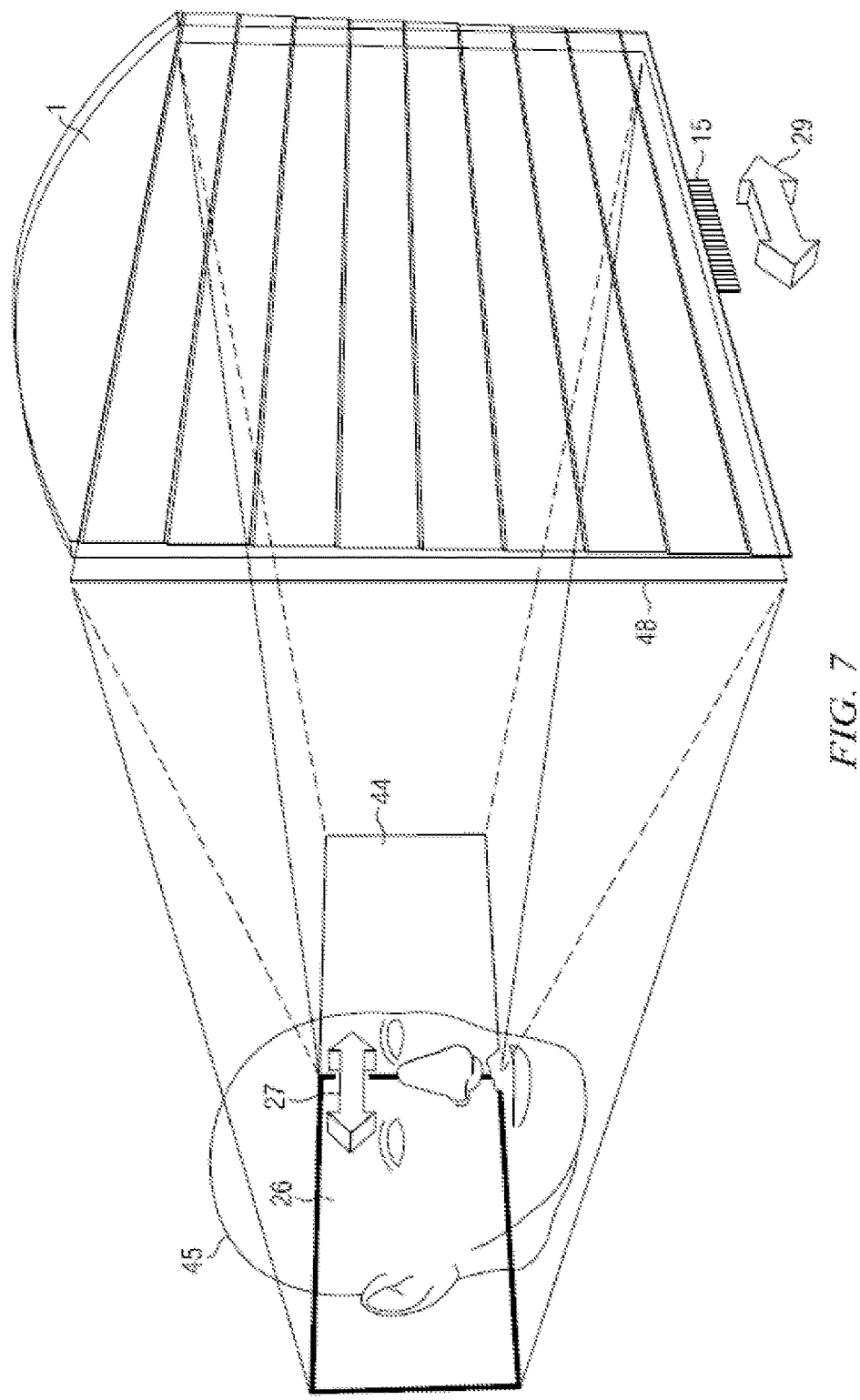
FIG. 7 is a schematic diagram illustrating an observer tracking autostereoscopic display device, in accordance with the present disclosure.

FIG. 7 is a schematic diagram illustrating one embodiment of an observer tracking autostereoscopic directional display device. As shown in FIG. 7, selectively turning on and off illumination elements 15a to 15n along optical axis 28 provides for directional control of viewing windows. The head 45 position may be monitored with a camera, motion sensor, motion detector, or any other appropriate optical, mechanical or electrical means, and the appropriate illumination elements of illumination array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights and directional display devices described herein.

Figure 8:
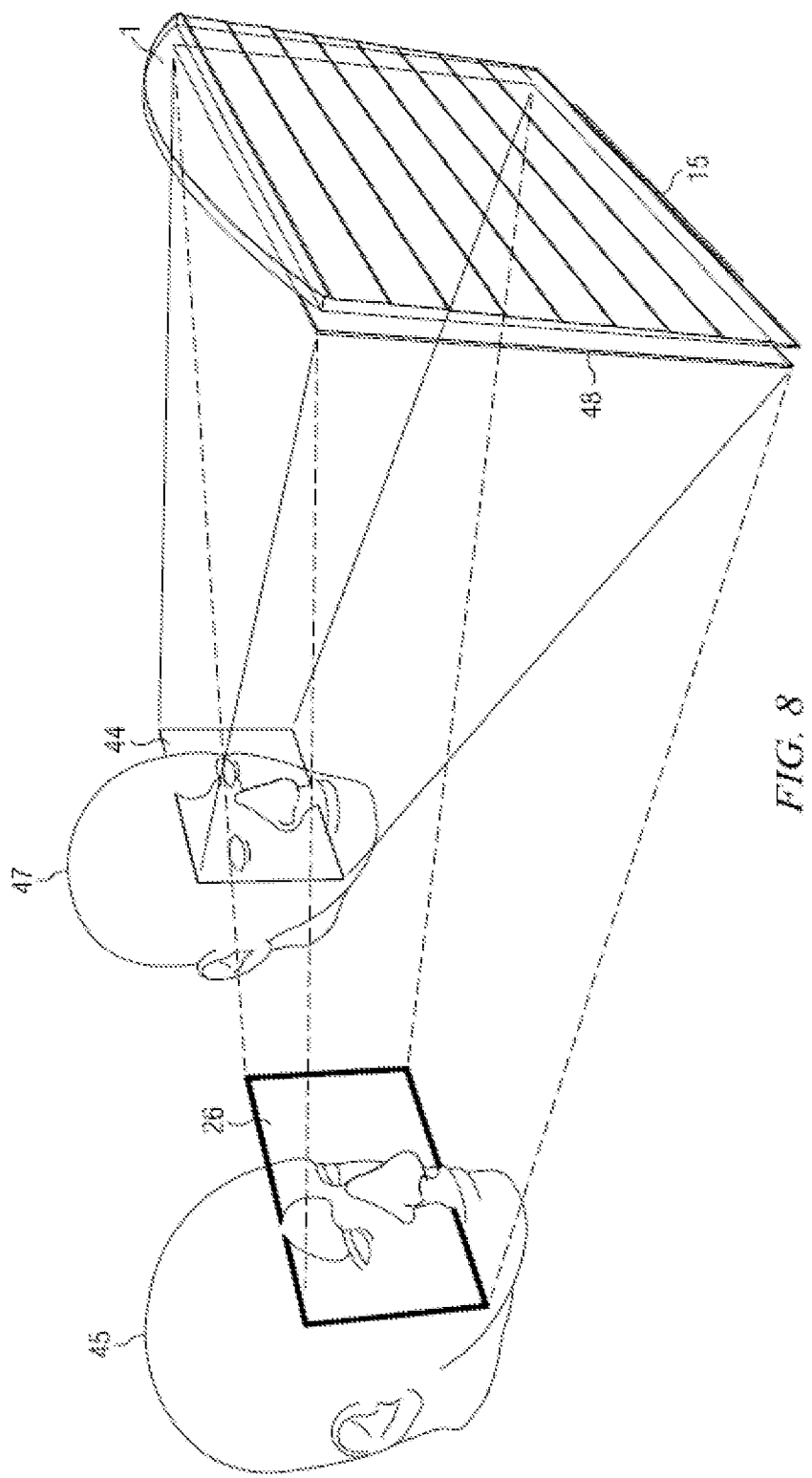
FIG. 8 is a schematic diagram illustrating a multi-viewer directional display device, in accordance with the present disclosure.

FIG. 8 is a schematic diagram illustrating one embodiment of a multi-viewer directional display device which includes a directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
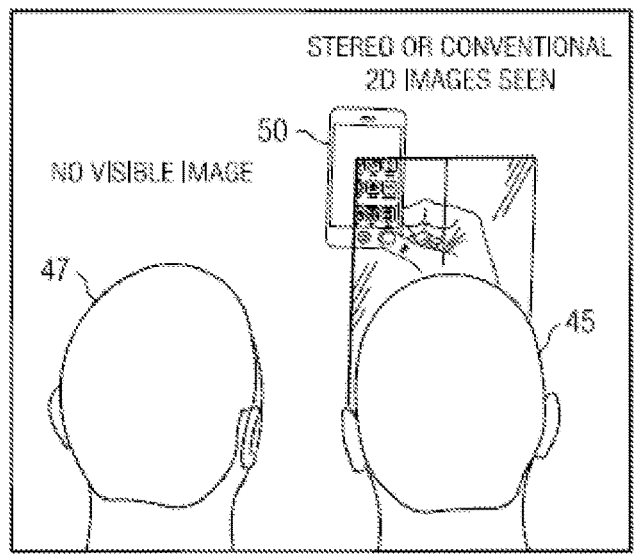
FIG. 9 is a schematic diagram illustrating a privacy directional display device, in accordance with the present disclosure.

FIG. 9 is a schematic diagram illustrating a privacy directional display device which includes a directional backlight. 2D image display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
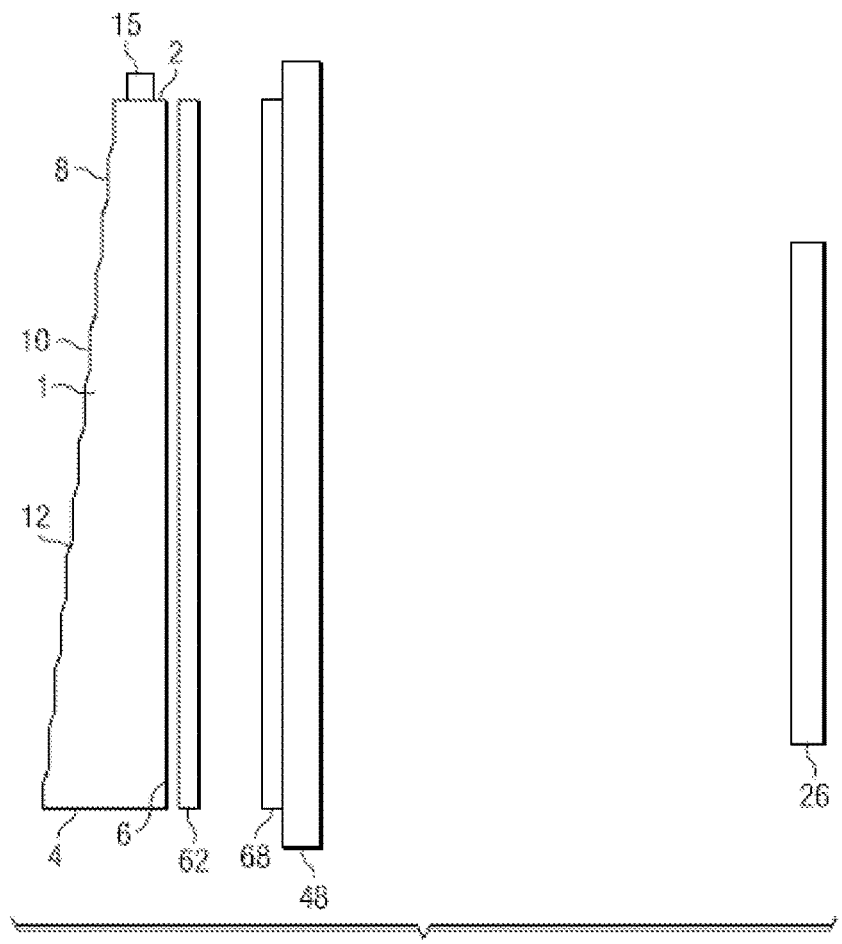
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device which includes a directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the spatial light modulator 48. The illumination array 15 may include light emitting diodes (LEDs) that may, for example, be phosphor converted blue LEDs, or may be separate RGB LEDs. Alternatively, the illumination elements in illumination array 15 may include a uniform light source and spatial light modulator arranged to provide separate illumination regions. Alternatively the illumination elements may include laser light source(s). The laser output may be directed onto a diffuser by means of scanning, for example, using a galvo or MEMS scanner. In one example, laser light may thus be used to provide the appropriate illumination elements in illumination array 15 to provide a substantially uniform light source with the appropriate output angle, and further to provide reduction in speckle. Alternatively, the illumination array 15 may be an array of laser illumination elements. Additionally in one example, the diffuser may be a wavelength converting phosphor, so that illumination may be at a different wavelength to the visible output light.

Thus, FIGS. 1 to 10 variously describe: a waveguide 1; a directional backlight comprising such a waveguide 1 and an illumination array 15; and a directional display device including such a directional backlight and an SLM 48. As such the various features disclosed above with reference to FIGS. 1 to 10 may be combined in any combination.

There will now be described some waveguide arrangements including a waveguide 1 that is directionally-illuminated and an illumination system. As will be described, the following waveguide arrangements may be applied in directional display device including an SLM 48 as described above or in a near-field display device or apparatus in which the SLM 48 is omitted. The waveguide 1 and other components of the waveguide arrangements are arranged as described above, except for the modifications that will now be described. One example of such a modification is the omission of the SLM 48 in the case of the near-field display device or apparatus. Accordingly, the above description applies equally to the following waveguide arrangements and display devices, but for brevity will not be repeated. Similarly, the various features disclosed below with reference to the following FIGURES may be combined in any combination.

Figure 11:
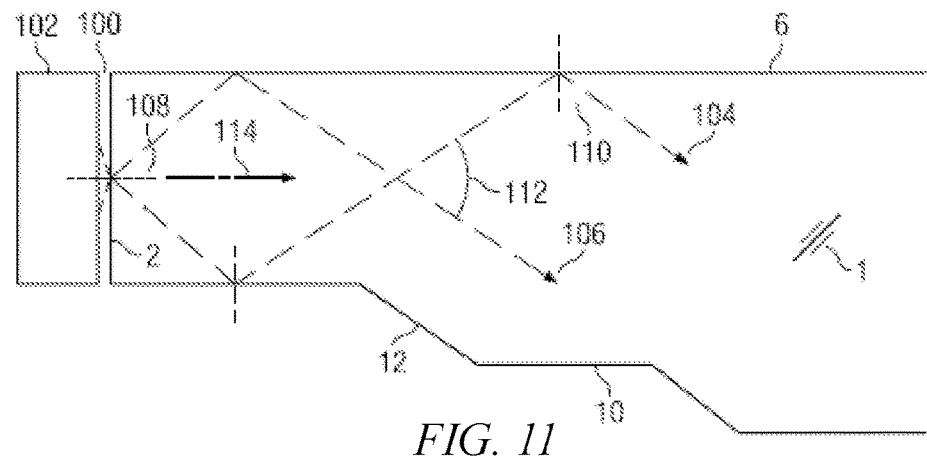
FIG. 11 is a schematic diagram illustrating in side view, light propagation from a illumination element into a directionally-illuminated waveguide arrangement, in accordance with the present disclosure.

FIG. 11 is a schematic diagram illustrating in side view, light propagation from an illumination element into a directionally-illuminated waveguide arrangement. Further, FIG. 11 shows in side view a detail for the propagation of light from a illumination element 102 separated by an air gap 100 into a stepped waveguide 1 with a planar input end 2. FIG. 11 illustrates input light being input through the input end 2 that is directed in different input directions distributed perpendicular to the lateral direction (vertical in FIG. 11) While normally emitted light may provide central rays 114, which may be directed substantially parallel to the guiding surfaces 6, 10, off-axis light rays 104, 106 may be directed into the stepped waveguide with an input angle 108 approximately around or at the critical angle of the air-stepped waveguide material interface. The off-axis rays 104, 106 may then be guided down the stepped waveguide with reflections from the guiding surfaces of 6 and light guiding features 10 at angle 110.

Figure 12:
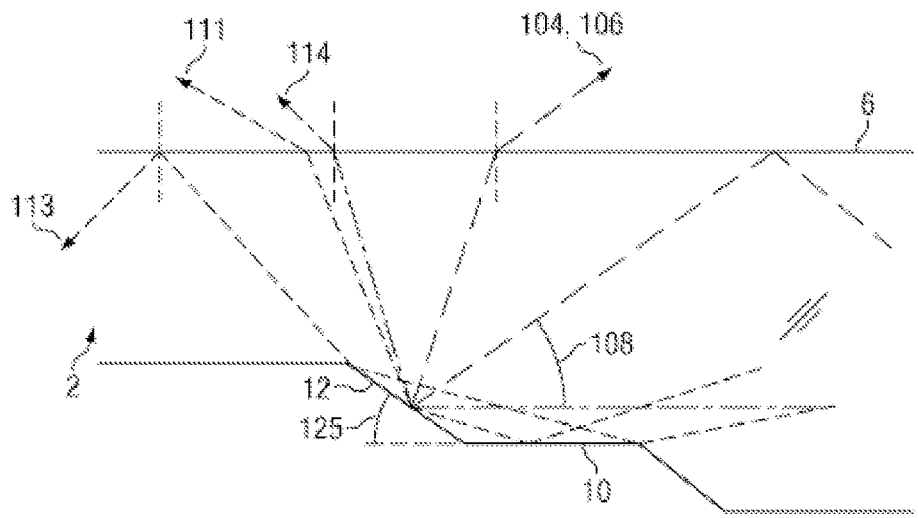
FIG. 12 is a schematic diagram illustrating in side view, the propagation of light from a directionally-illuminated waveguide arrangement to viewing windows, in accordance with the present disclosure.

FIG. 12 is a schematic diagram illustrating in side view, the propagation of light from the directionally-illuminated waveguide arrangement of FIG. 11 to viewing windows. Further, FIG. 12 shows in side view the counter-propagating rays after reflection at surface of side 4 of the stepped waveguide. FIG. 12 illustrates the input light that is input through the input end 2 being output through the first guide surface 6. Central ray 114 may be directed on output in a different direction to edge rays 104, 106. Further rays 111, 113 may be directed at higher angles than ray 114 after reflection at light guiding feature 10. In this arrangement, all of the rays 104, 106, 111, 113, 114 come from a single illumination element 102. Thus, FIG. 12 shows the output light this is output through the first guide surface being directed in output directions that are distributed with respect to a normal to the first guide surface 6 in a perpendicular direction to the lateral direction (the perpendicular direction being horizontal in FIG. 12) in dependence on the input direction of the input light, as illustrated in FIG. 11.

Although as discussed with respect to FIG. 12, the light comes from a single illumination element, the single illumination element is used for discussion purposes only, as light may come from more than a single illumination element. The output directionality in the direction perpendicular to the lateral direction that may be primarily determined by respective rays 104, 106, 111, 113, 114 may thus be modulated by the respective illumination element 102, and the stepped waveguide may have a vertically extended viewing window 26. Thus, in this arrangement, vertical regions of the window 26 may not be independently modulated.

Thus, as described in more detail below, the waveguide 1 may be directionally-illuminated by an illumination system that is selectively operable to provide the input light directed (a) from different lateral positions distributed in the lateral direction (as for example is the case in FIGS. 1 to 10) and (b) in different input directions distributed perpendicular to the lateral direction (as is the case in FIGS. 11 and 12). In that case, the input light output through the first guide surface 6 is directed in output directions that are (a) distributed with respect to a normal to the first guide surface in the lateral direction in dependence on the lateral position of the input light (as described above with reference to FIGS. 1 to 10). Furthermore, the input light output through the first guide surface 6 is directed in output directions that are (b) distributed with respect to a normal to the first guide surface in a perpendicular direction to the lateral direction in dependence on the input direction of the input light (as described above with reference to FIGS. 1 to 10). This allows the light two be directed into a two dimensional array of viewing windows.

Figure 13:
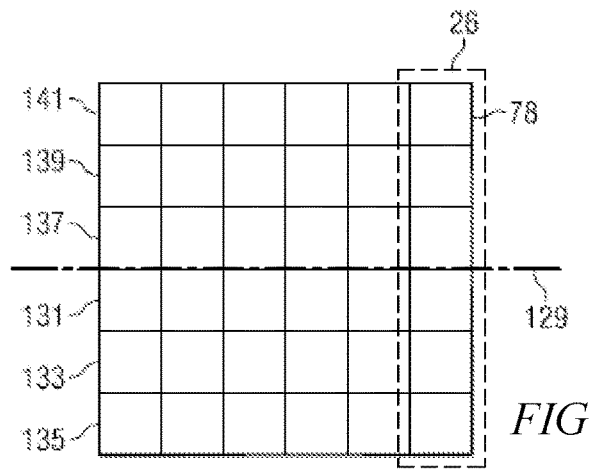
FIG. 13 is a schematic diagram illustrating a two dimensional array of viewing windows, in accordance with the present disclosure.

FIG. 13 is a schematic diagram illustrating an example of such a two dimensional array of viewing windows. Further, FIG. 13 shows an array of viewing windows that may be achieved if the angular output profile of the illumination elements of the illumination array 15 is independently modulated so that the input light input through the input end 2 is directed in different input directions distributed perpendicular to the lateral direction, as will be described in embodiments below. Such independently modulated rays may achieve a duplicated set of viewing windows, each substantially relating to a respective ray cone. Light ray 114 may then be directed to the horizontal axis 129 of the viewing windows 78 of a two dimensional array of viewing windows in the window plane. Light rays approximately parallel to ray 114 from adjacent illumination elements of the illumination array 15 may be deflected laterally on the line 129. The one dimensional viewing window 26 is formed from viewing windows 26; thus the vertical extent of an individual viewing window 78 is more limited than the one dimensional viewing window 26.

Continuing the discussion of FIGS. 12 and 13, light rays reflected on the same side as rays 104, 106 may be directed below the axis 129, while light rays that are directed on the same side as ray 111 may be directed above the axis 129. Thus viewing windows 131, 133, 135 may be below the axis 129 and viewing windows 137, 139, 141 may be above the axis, with the modulated data in windows 131, 137 being substantially the same; 133, 139 being substantially the same; and 135, 141 being substantially the same. Thus the reflection of rays at feature 10 adjacent the feature 12 may create a reflected set of windows about axis 129.

Further to the discussion of FIGS. 12 and 13, if light extraction feature 12 tilt angle 125 is sufficiently small then the high angle rays may be arranged to be internally reflected in the light guide. For example, a tilt angle of approximately 24 degrees in a material with an approximate refractive index of 1.5 may achieve total internal reflection for light rays 114, thus light rays 111, 113 may be totally internally reflected and advantageously repeating windows 137, 139, 141 may be at least in part removed from the output.

In an alternative embodiment, a higher angle 125 may be employed in the present embodiments, and a sensor system that detects the position of an observer may be used to address these windows according to observer position. Thus advantageously the vertical viewing freedom of the display may be extended.

There will now be described some specific waveguide arrangements in which the illumination system that is selectively operable to provide the input light directed (a) from different lateral positions and (b) in different input directions distributed perpendicular to the lateral direction.

Figure 14A:
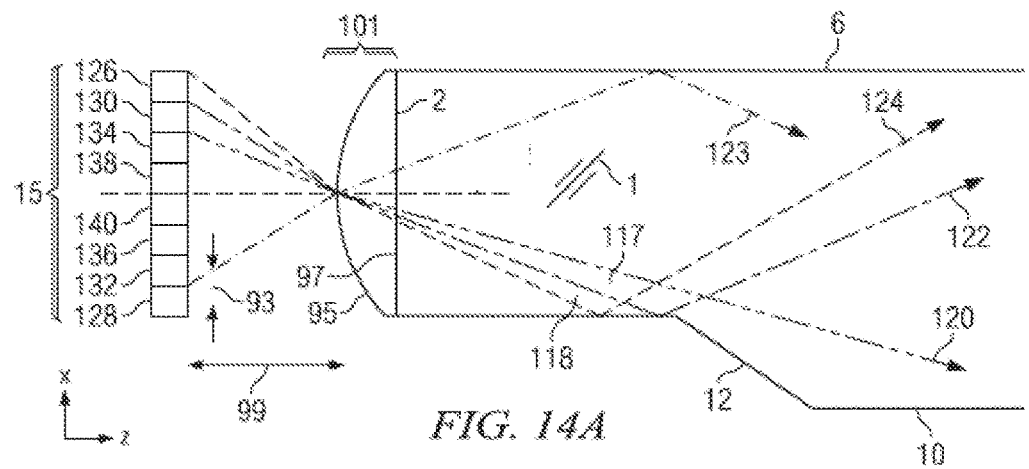
FIG. 14A is a schematic diagram illustrating in side view, the propagation of light from a illumination element into a stepped waveguide of a directionally-illuminated waveguide arrangement by means of a focusing optical element, in accordance with the present disclosure.

FIG. 14A is a schematic diagram illustrating in side view, the propagation of light from a two-dimensional array of illumination elements into a stepped waveguide 1 of a directionally-illuminated waveguide arrangement by means of a focusing optical element. Further, FIG. 14A shows in side view, a first embodiment which may include an illumination array 15 of illumination elements that are discrete, further provided as an array of vertically distinct illumination elements 126, 128, 130, 132, 134, 136, 138, 140. Thus, the illumination elements are distributed across the input end 2 of the waveguide 1 in the lateral direction. Therefore they provide the input light from different lateral positions distributed in the lateral direction. Further, the illumination elements are distributed in the perpendicular direction so that the emitted light is similarly distributed.

A focusing optical element 101 having positive optical power in a direction perpendicular to the lateral direction is provided between the illumination array 15 and the waveguide 1. In this example, the focusing optical element 101 is formed by a cylindrical curved profile lens element with a planar output surface 97 which may be attached to the input end 2 and may thus be substantially elongate parallel to the surface of the input end 2. The focusing optical element 101 may for example be formed on the end of the stepped waveguide 1, attached to it, or may be integrated into the structure during a molding process. Alternatively an air gap, optical filters including color filters, diffusers or other optical structures may be arranged between the stepped waveguide 1 and the focusing optical element 101. As the focusing optical element 101 has positive optical power in the direction perpendicular to the lateral direction, it directs the light from different illumination elements distributed in the perpendicular direction, as the input light in the waveguide 1, into the different input directions distributed perpendicular to the lateral direction.

The illumination array 15 may be arranged in a focal plane of the focusing optical element 101 so that the focusing optical element 101 has a nominal focal length 99. As a result, light from the individual illumination elements may be substantially directed with a defined cone angle within the stepped waveguide. Thus light rays 124, 122 from illumination element 126 may be collected by the optical element 101 and substantially collimated or providing a directional distribution with cone angle 118, so that they may be guided within the stepped waveguide 1. Continuing the discussion of FIG. 14A, similarly light from illumination element 130 may be directed between rays 120 and 122 to provide an adjacent directional distribution. Due to the reflections within the stepped waveguide 1, light from the boundary of illumination elements 128 and 132 may be directed along ray 123 that may be substantially parallel to rays 122 from the boundary between illumination elements 126 and 130. The input aperture of the surface 95 may be arranged to collect light efficiently from the illumination element illumination array 15. Deflection films (not shown in FIG. 14A) such as prismatic films may be further arranged to shift the vertical pointing direction of the output to a viewing angle for the display.

In one illustrative embodiment, a stepped waveguide 1 which may include an input end 2 having a height of approximately 3 mm may be arranged with a focusing optical element 101 arranged to image a illumination element illumination array 15 of a total approximate height of 3.6 mm at an approximate distance of 3 mm, achieving a total cone angle within the stepped waveguide of approximately +/−20 degrees. The illumination array 15 may include illumination elements with an approximate separation of 0.3 mm, achieving a total of twelve addressable illumination elements and six addressable light cones. Light extraction features 12 may be metallized and arranged with an approximately 45 degree angle 125 so that twelve vertical windows 78 may be produced at the window plane, in two groups of six windows, reflected about a horizontal axis 129. At a nominal viewing distance of approximately 500 mm, the vertical window pitch may be approximately 45 mm, with a total window height of approximately 540 mm. Advantageously such an arrangement may achieve horizontal and vertical look-around and head tilt capabilities as will be described below.

In a further illustrative embodiment, a stepped waveguide may be arranged with an input aperture height of approximately 3 mm. An illumination array 15 with sixteen illumination elements with separation 93 in the x direction of approximately 200 micrometers may be arranged at a distance of approximately 4.5 mm from the input surface 95.

The feature 12 may be arranged to couple light rays 111, 113 within the stepped waveguide. A total cone angle of approximately +/−13 degrees may be produced within the stepped waveguide, thus producing an approximately +/−10 degree cone angle on output from eight output windows in the vertical direction. Each window in the vertical direction may be separated by approximately 2.5 degrees. At a viewing distance of approximately 500 mm, this may provide a vertical separation of viewing windows of approximately 22 mm. Advantageously such an arrangement may not require silvered light extraction features 12, as such a cone angle may be delivered by total internal reflection from the tilted facets, thus reducing cost and complexity.

As shown for example in FIG. 4B a Lambertian illumination element in air may typically be directed with a cone angle 39 equal to approximately twice the critical angle in the stepped waveguide in the xy plane, while the focusing optical element may achieve a cone angle 118 in the xz plane. The directional distribution of the output in the stepped waveguide may be referred to as the distribution of rays within a solid angle defined by cone angles 39, 118. Thus, illumination elements 126, 128 may form a first illumination pair for a first directional distribution, illumination elements 130, 132 may form a second directional distribution, illumination elements 134, 136 may form a third directional distribution and illumination elements 138, 140 may form a fourth directional distribution. Each has a cone angle 39 within the xy plane.

Figure 14B:
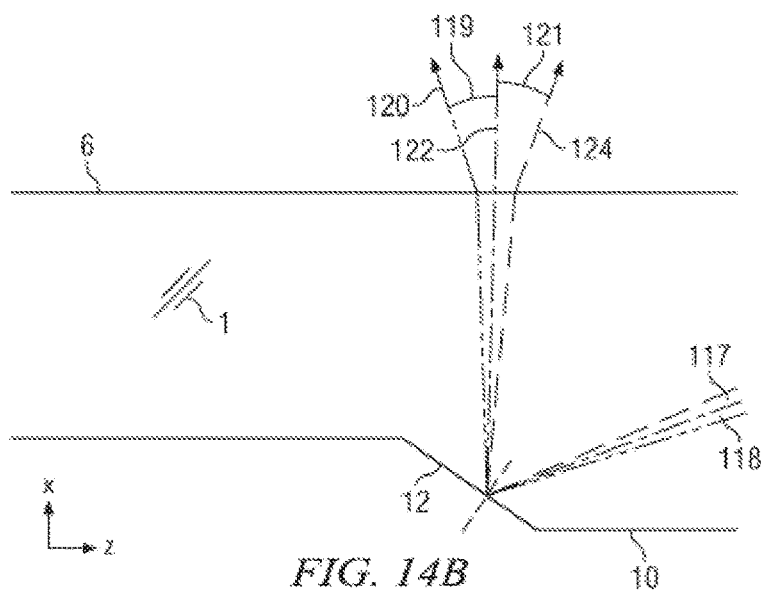
FIG. 14B is a schematic diagram illustrating in side view, the propagation of light from a single illumination element in a focusing stepped waveguide of a directionally-illuminated waveguide arrangement to viewing windows, in accordance with the present disclosure.

After incidence with the end mirror side 4, counter propagating light rays 120, 122, 124 may be incident on a reflective light extraction feature 12 as shown in FIG. 14B. FIG. 14B is a schematic diagram illustrating in side view, the propagation of light from a single illumination element in a focusing directional display device to viewing windows. It can be seen that light cone 118 from illumination elements 126, 128 may be directed into a first light cone 119 in air after exiting the stepped waveguide whereas light cone 117 from illumination elements 130, 132 may be directed into a second light cone 121, different from cone 119. The lateral cone angle may be determined by the optical function of the end mirror surface and curve radii on light extraction features 12. Thus, the position of the illumination element 126 with respect to the focusing optical element 101 may determine the output cone directional distribution of the stepped waveguide. Advantageously the present embodiments can achieve a two dimensional array of addressable viewing windows that may achieve advantageous display properties as will be described herein.

Figure 14C:
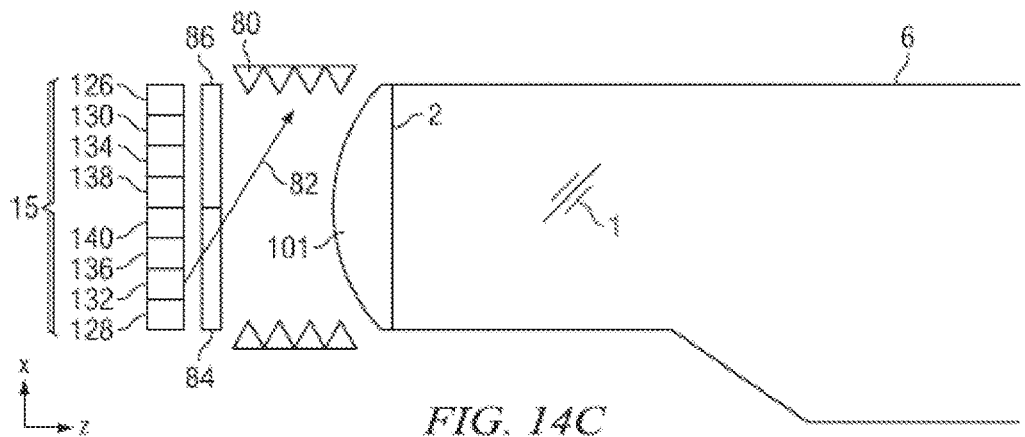
FIG. 14C is a schematic diagram illustrating in side view, a illumination element aligned to a stepped waveguide and a focusing optical element of a directionally-illuminated waveguide arrangement, in accordance with the present disclosure.

FIG. 14C is a schematic diagram illustrating in side view, a illumination element aligned to a stepped waveguide of a directionally-illuminated waveguide arrangement and a focusing optical element. The embodiment of FIG. 14C is the same as the embodiment of FIG. 14A but further including a light baffle 80 between the edges of the illumination element illumination array 15 and the focusing optical element 101. Advantageously off-axis light rays 82 from the illumination element array that are not coupled into the input aperture of the focusing optical element 101 may be absorbed in this baffle.

Continuing the discussion of FIG. 14C, optical filter elements 84, 86 may be arranged in approximate alignment with the respective portions of the illumination element illumination array 15. The elements 84, 86 may be polarizer elements or may be provide different transmission wavelengths. For example the elements 84 and 86 may be different phosphors so that red and green wavelengths may be produced in different parts of the illumination element, and combined by the reflection in the stepped waveguide. Advantageously such an arrangement may achieve higher efficiency. Alternatively element 84 may be a yellow phosphor for blue emitting elements 128, 132, 136, 140 while element 86 may be transparent for red emitting elements 126, 130, 134, 138. Advantageously the color gamut of the output can be improved. Alternatively the elements 84, 86 may be, but are not limited to, polarizers, different diffusers, or other optical elements.

Figure 15A:
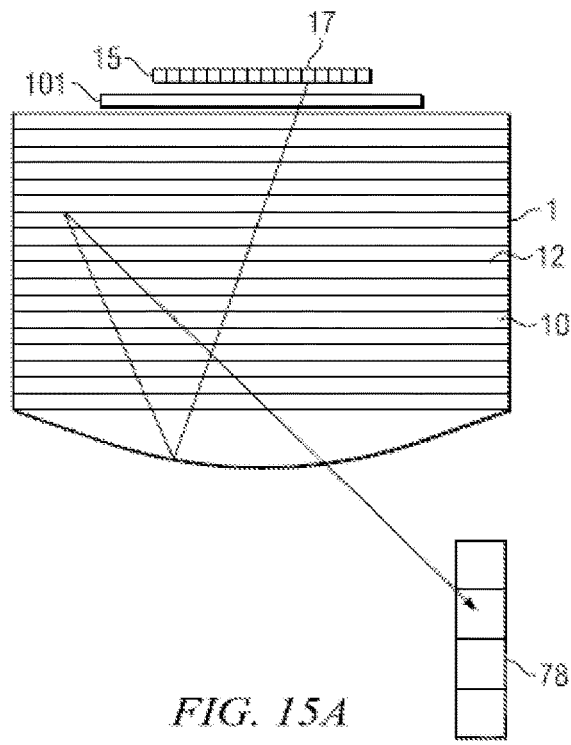
FIG. 15A is a schematic diagram illustrating formation of a column of viewing windows in a directionally-illuminated waveguide arrangement by means of a further focusing optical element, in accordance with the present disclosure.

FIG. 15A is a schematic diagram illustrating formation of a column of viewing windows in a directionally-illuminated waveguide arrangement by means of a further focusing optical element 101. Further, FIG. 15A shows schematically in front view, the formation of a single column of viewing windows 78 by a single column 17 of illumination elements 14 of the illumination array 15 for example as shown in FIG. 14A. Thus advantageously, an autostereoscopic display can provide directionality in first and second directions. Thus rows of windows may be produced by the imaging of reflective end 4 in combination with light extraction features 12, and optionally any further optics such as Fresnel lenses. In this embodiment, consistent for example with FIG. 5, this is achieved by the reflective end 4 having positive optical power in the lateral direction, so the light extraction features 12 that extend across the lateral direction may be linear.

Figure 15B:
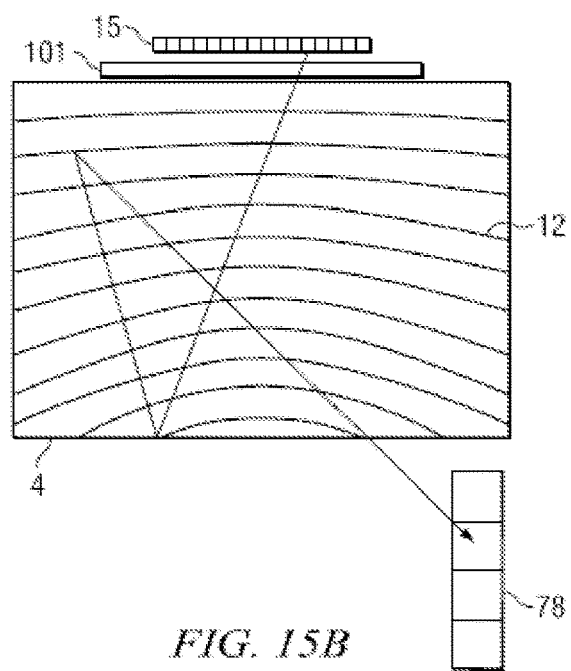
FIG. 15B is a schematic diagram illustrating formation of a column of viewing windows in a directionally-illuminated waveguide arrangement by means of a further focusing optical element, in accordance with the present disclosure.

FIG. 15B is a schematic diagram illustrating formation of a column of viewing windows in a directionally-illuminated waveguide arrangement by means of a further focusing optical element 101. Further, FIG. 15B shows a further embodiment wherein the reflective end 4 is planar, and light extraction features 12 extend across the lateral direction, but instead of being linear are curved so that they have positive optical power in the lateral direction.

Figure 16:
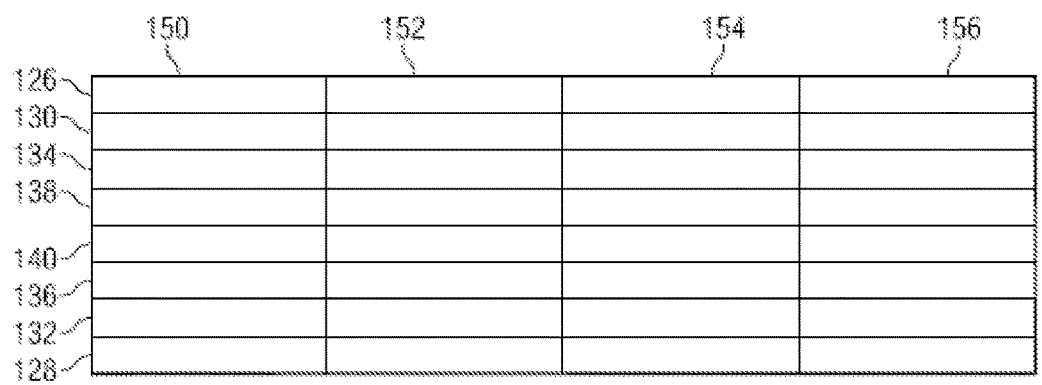
FIG. 16 is a schematic diagram illustrating an array of illumination elements, in accordance with the present disclosure.
Figure 17:
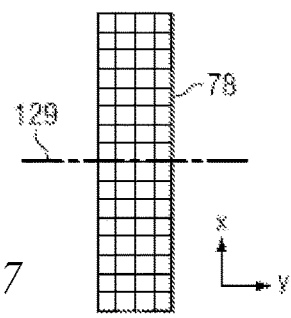
FIG. 17 is a schematic diagram illustrating an array of viewing windows, in accordance with the present disclosure.

FIG. 16 shows an example of a two dimensional illumination array 15 viewed in the x-y plane, including columns 150, 152, 154, 156 of the illumination elements 126, 128, 130, 132, 134, 136, 138, 140 as shown in FIG. 14A. When used with the focusing optical element 101 that provides directionality in the x-z plane, and the optics of the reflective end 2 (or in other embodiments other optics) provides directionality in the x-y plane, then the output window shape may typically have a different aspect ratio. Thus the two dimensional illumination array 15 may be provided with different pitches in the lateral direction and in the direction perpendicular to the lateral direction. This may be illustrated by the two dimensional window array 78 in FIG. 17, further showing axis 129 and repeating windows as described in FIG. 12. Furthermore, the reflection optics may be provided by end surface of side 4 and extraction features 12. FIG. 17 is a schematic diagram illustrating an array of viewing windows. The highly asymmetric light emitting element can provide square or elongate vertical window profiles, as appropriate for the particular embodiment.

Some alternative forms of the focusing optical element 101 will now be described.

Figure 18:
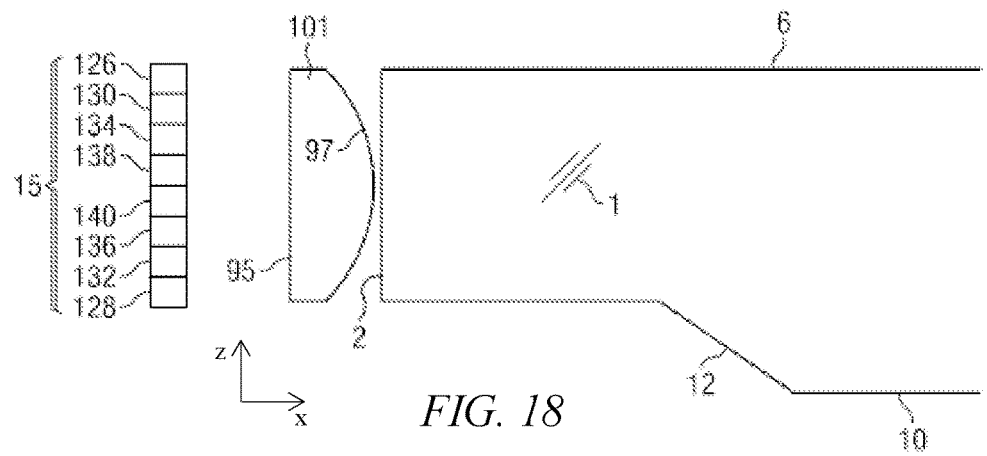
FIG. 18 is a schematic diagram illustrating in side view, a directionally-illuminated waveguide arrangement including a stepped waveguide and a further focusing optical element, in accordance with the present disclosure.
Figure 19:
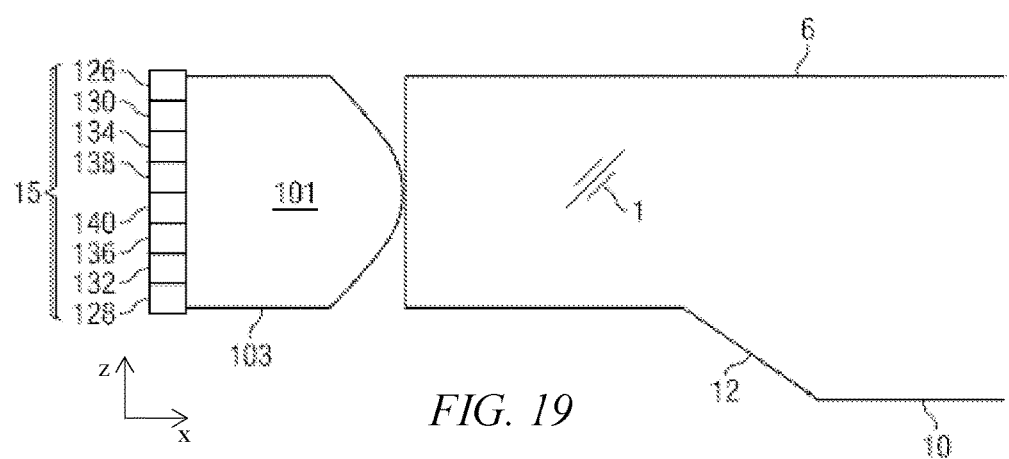
FIG. 19 is a schematic diagram illustrating in side view, a directionally-illuminated waveguide arrangement including a stepped waveguide and a further focusing optical element, in accordance with the present disclosure.
Figure 20:
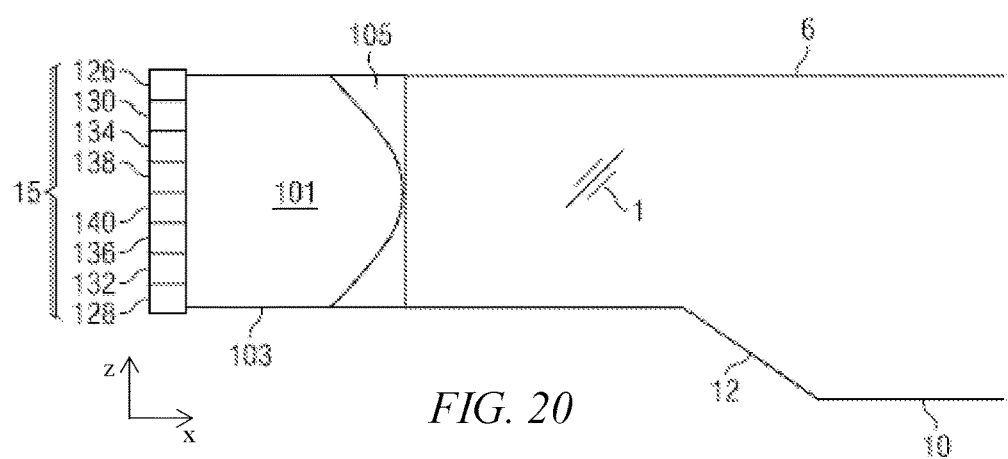
FIG. 20 is a schematic diagram illustrating in side view, a directionally-illuminated waveguide arrangement including a stepped waveguide apparatus and a further focusing optical element, in accordance with the present disclosure.

FIGS. 18 to 20 illustrate examples where the focusing optical element 101 is an additional lens element from the waveguide 1.

An alternative focusing optical element 101 is shown in FIG. 18 in which the elongate curved surface is approximately inverted so as to face a plane surface of side 2 of the stepped waveguide 1. FIG. 18 is a schematic diagram illustrating in side view, a waveguide arrangement and a further focusing optic. Advantageously such an embodiment may provide improved aberration performance compared to the embodiment of FIG. 14A. Thus the vertical separation of the viewing windows may be less blurred and the cross talk between the two may be reduced.

FIG. 19 is a schematic diagram illustrating in side view, a directional display device including a waveguide arrangement including a stepped waveguide and a further focusing optical element. Further, FIG. 19 shows a further embodiment in which the focusing optical element 101 may include an elongate lens that may be bonded to the illumination element illumination array 15. Advantageously such an arrangement can be used to tune the aberrations in the system, and may reduce the number of air surfaces thus reducing loss. Further, the edge surfaces 103 may be arranged to provide a specular reflection thus providing side lobe images of the illumination array 15. This can be used to advantageously achieve additional viewing directions in the vertical direction for coupling into the stepped waveguide, increasing viewing freedom in the vertical direction. Further non-waveguiding modes from the illumination element illumination array 15 can be rejected within the focusing section, thus increasing the usable area of the stepped waveguide.

FIG. 20 is a schematic diagram illustrating in side view, a directional display device including a waveguide arrangement including a stepped waveguide and a further focusing optical element. Further, FIG. 20 shows a further embodiment in which the focusing optical element 101 may include a further material 105 that may advantageously reduce losses due to Fresnel reflections at the material-air interfaces of previous embodiments. Material 105 may have a low refractive index compared to the material of the focusing optical element 101 and may be for example a fluorinated material, a silicone, an aerogel or other low refractive index material.

Figure 21:
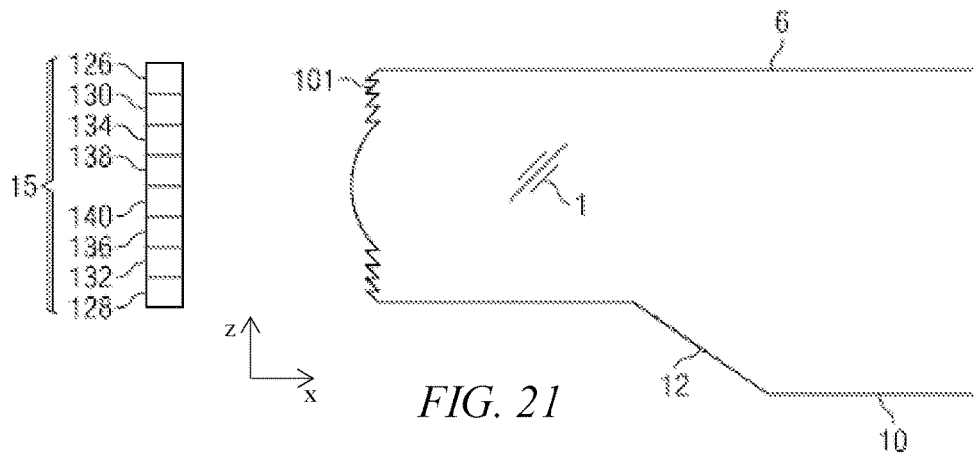
FIG. 21 is a schematic diagram illustrating in side view, a directionally-illuminated waveguide arrangement including a stepped waveguide apparatus and a further focusing optical element, in accordance with the present disclosure.

FIG. 21 illustrates an example where the focusing optical element 101 is formed by shaping the input end 2 itself. FIG. 21 is a schematic diagram illustrating in side view, a directional display device including a waveguide arrangement including a stepped waveguide and a further focusing optical element. Further, FIG. 21 shows a further embodiment which may include a Fresnel lens component advantageously arranged to reduce the thickness of the optical component 101. Advantageously such an element can be formed on a tool, so may be replicated during fabrication of the structure of the stepped waveguide 1.

Figure 22:
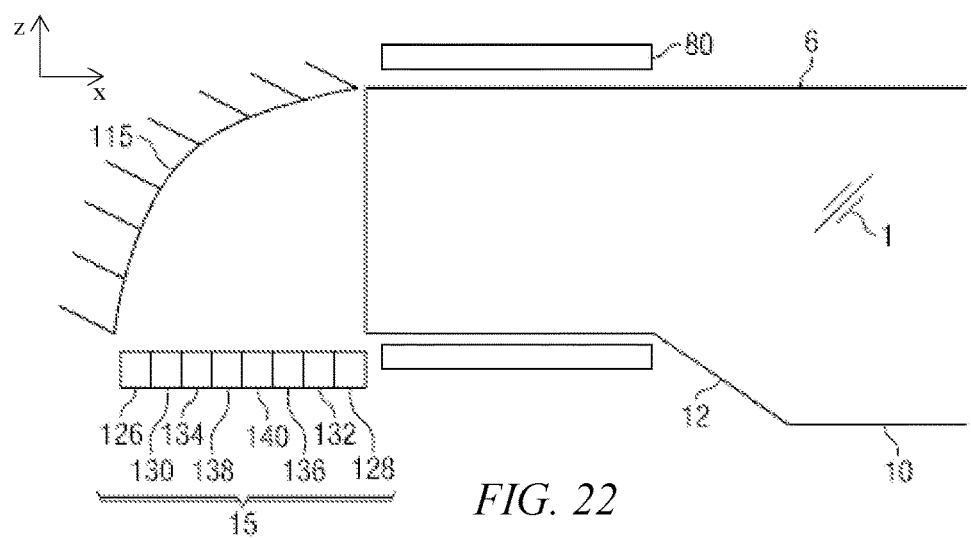
FIG. 22 is a schematic diagram illustrating in side view, a directionally-illuminated waveguide arrangement including a stepped waveguide and a reflective focusing optical element, in accordance with the present disclosure.
Figure 23:
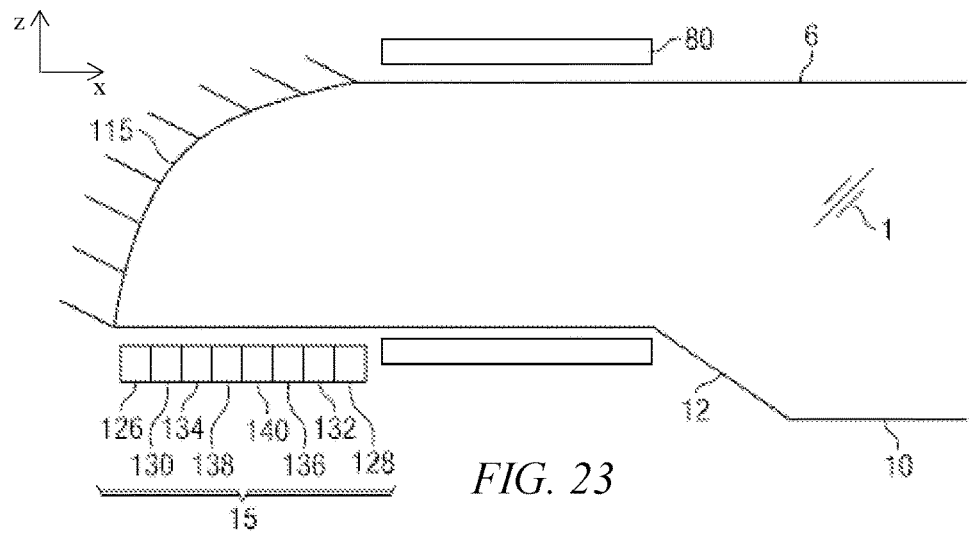
FIG. 23 is a schematic diagram illustrating in side view, a directionally-illuminated waveguide arrangement including a stepped waveguide and a further reflective focusing optical element, in accordance with the present disclosure.

FIGS. 22 and 23 illustrate examples where the focusing optical element 101 is reflective, rather than being a lens element.

FIG. 22 is a schematic diagram illustrating in side view, a directional display device including a waveguide arrangement including a stepped waveguide and a reflective focusing optical element a reflective focusing optic. Further, FIG. 22 shows a further embodiment which may include a reflective focusing optical element 101 including a curved and tilted mirror 115. Advantageously the mirror may reduce chromatic aberrations and may be arranged to direct light substantially from an illumination array 15 arranged to the rear of the valve.

FIG. 23 is a schematic diagram illustrating in side view, a directional display device including a waveguide arrangement including a stepped waveguide and a further reflective focusing optical element. FIG. 23 shows a further embodiment in which for example the mirror 115 may be formed on the end 2 of the stepped waveguide which may be curved. Thus the shape of the mirror may be formed on a tool, so may be replicated during fabrication of the structure of the stepped waveguide 1.

Figure 24:
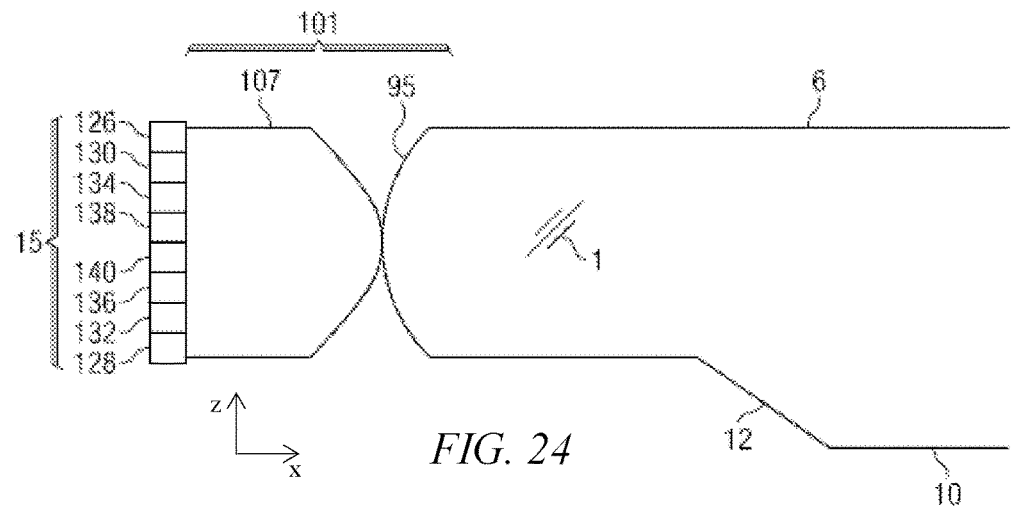
FIG. 24 is a schematic diagram illustrating in side view, a directionally-illuminated waveguide arrangement including a stepped waveguide and a further focusing optical element, in accordance with the present disclosure.
Figure 25:
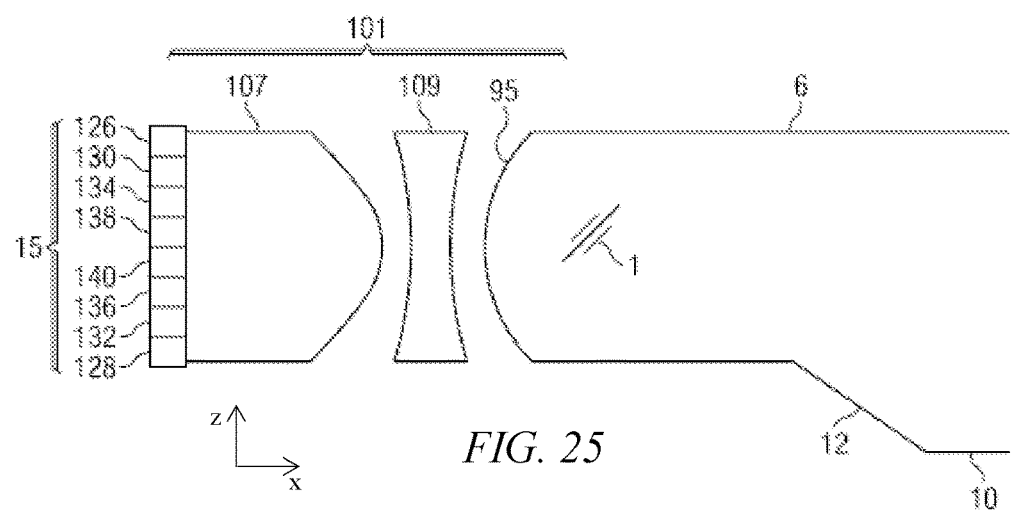
FIG. 25 is a schematic diagram illustrating in side view, a directionally-illuminated waveguide arrangement including a stepped waveguide and a further focusing optical element, in accordance with the present disclosure.

FIGS. 24 and 25 illustrate further examples where the focusing optical element 101 is formed by multiple sections, including the input end 2 of the waveguide and an additional lens element from the waveguide 1.

FIG. 24 is a schematic diagram illustrating in side view, a directional display device including a waveguide arrangement including a stepped waveguide and a further focusing optical element illumination element. Further, FIG. 24 shows a further embodiment in which the focusing optical element 101 may include first and second focusing sections 107, 95, the first focusing section 95 being a lens element formed by shaping the input end of the waveguide 1 and the second focusing section 107 being formed by an additional lens element. Advantageously, such an arrangement can be used to improve aberrations, particularly for off-axis illumination in fast systems, thus improving brightness.

FIG. 25 is a schematic diagram illustrating in side view, a directional display device including a waveguide arrangement including a stepped waveguide and a further focusing optical element illumination element. Further, FIG. 25 shows a further embodiment which is the same as FIG. 26 but the focusing optical element 101 further includes a third focusing section 109 formed by a further, additional lens element. Advantageously, such an arrangement can be used to improve aberrations, particularly for off-axis illumination in fast systems, thus improving brightness and color uniformity in the window plane.

There will now be described some window arrangements in which the focusing optical element 101 is provided predominantly on one side of its optical axis.

Figure 26:
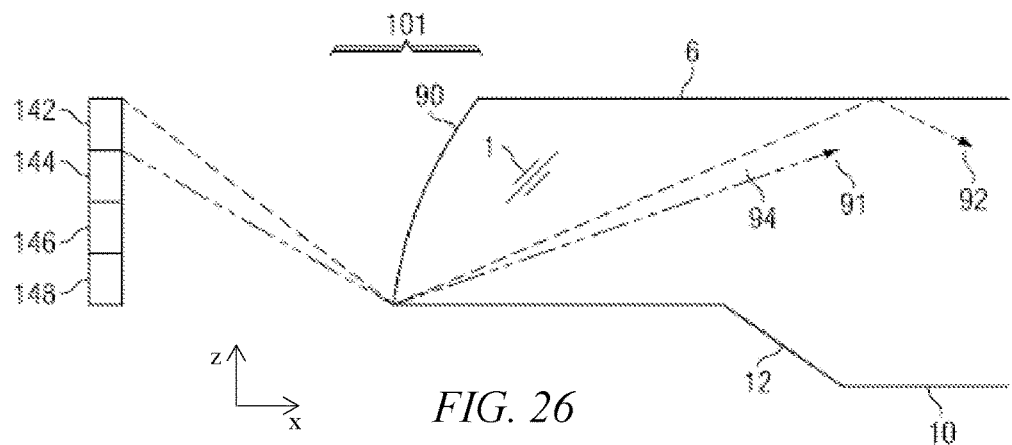
FIG. 26 is a schematic diagram illustrating in side view, the propagation of light from a illumination element into a stepped waveguide by means of a further focusing optical element, in accordance with the present disclosure.

FIG. 26 is a schematic diagram illustrating in side view, the propagation of light from a illumination element into a waveguide 1 by means of a focusing optical element 101. Due to the reflection in the stepped waveguide 1 creating illumination element pairs 126, 128 in FIG. 14A, for example, it may be desirable to have a single illumination element for each vertical viewing window. Thus, the focusing optical element 101 may be formed by a half-lens surface 90 provided entirely on one side of its optical axis, such that illumination element 142 may be imaged to light rays 91, 92 achieving cone angle 94 in the xz plane of the stepped waveguide. Advantageously such an arrangement can be simpler to assemble for a given vertical window structure, thus reducing cost.

Figure 27:
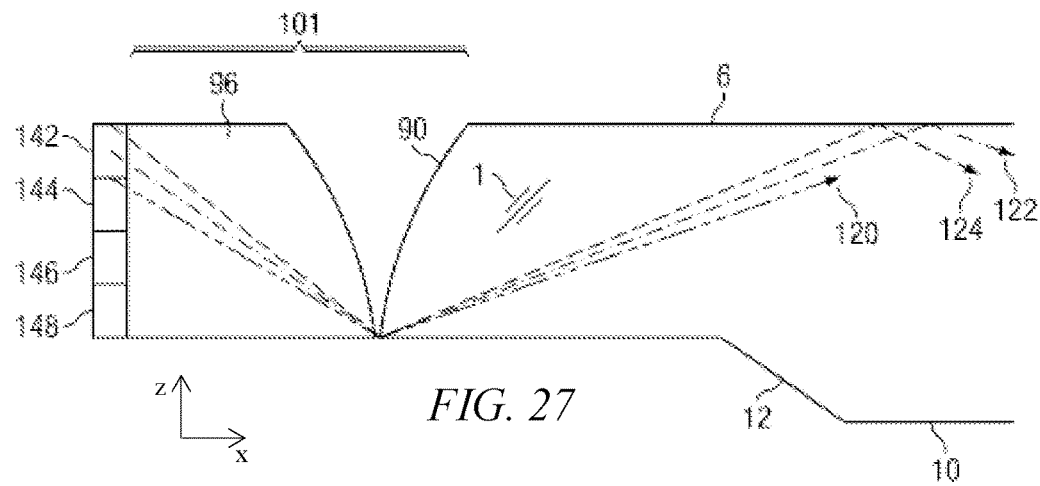
FIG. 27 is a schematic diagram illustrating in side view, the propagation of light from a illumination element into a stepped waveguide by means of a further focusing optical element, in accordance with the present disclosure.

FIG. 27 is a schematic diagram illustrating in side view, the propagation of light from a illumination element into a stepped waveguide by means of a focusing optical element 101 that is the same as that of FIG. 26 except that it includes a further section 96 formed by an additional lens element. As in FIG. 26, the focusing optical element 101 is formed entirely on one side of its optical axis. As previously described, such an embodiment may advantageously reduce the aberrations in the system. Other aberration and brightness improving techniques described here and known in the art can be employed in these half lens embodiments. Similar advantages may be provided by the focusing optical element 101 being provided predominantly, but not necessarily entirely, on one side of its optical axis.

Figure 28:
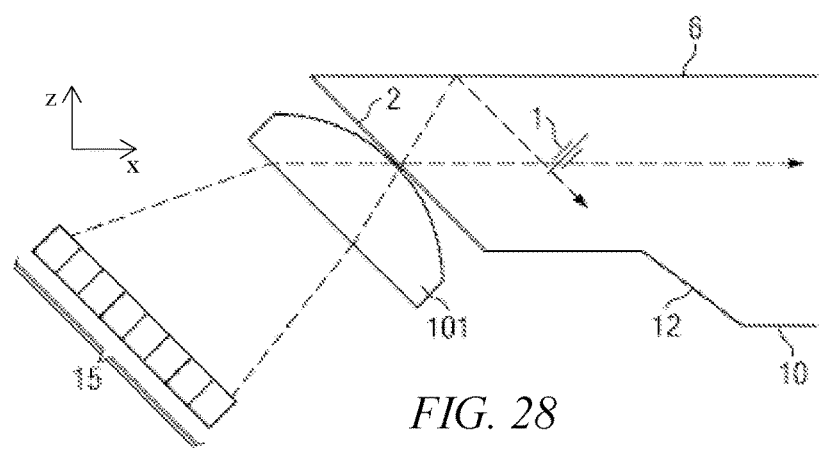
FIG. 28 is a schematic diagram illustrating in side view, the propagation of light from a illumination element into a stepped waveguide with inclined input side by means of a focusing optical element, in accordance with the present disclosure.

FIG. 28 is a schematic diagram illustrating in side view, the propagation of light from a illumination element into a stepped waveguide with inclined input side by means of a focusing optical element 101. Further, FIG. 28 shows a further embodiment in which the input end 2 to is inclined with respect to the surface of the first guide surface 6 and the second guide surface 10 of the stepped waveguide 1. Advantageously, the input to the stepped waveguide 1 may be provided into the half-cone of input, so that the illumination elements of the illumination array 15 may not have the redundancy described with respect to FIG. 14A. Further, the illumination element may be arranged to the rear of the stepped waveguide 1 to improve ease of tiling valves, and cross talk due to reflections from the side 2 of counter-propagating light in the stepped waveguide 1 may be further reduced.

In the above embodiments the illumination elements are distributed across the input end 2 of the waveguide 1 perpendicular to the lateral direction (as well as in the lateral direction) and a focusing optical element is used to direct the input light in the waveguide 1 in the different input directions distributed perpendicular to the lateral direction. In contrast, there will now be described some waveguide arrangements in which the illumination elements are distributed across the input end 2 of the waveguide 1 in the lateral direction only and a deflector element is used to direct the input light in the waveguide 1 in the different input directions distributed perpendicular to the lateral direction.

Figure 29:
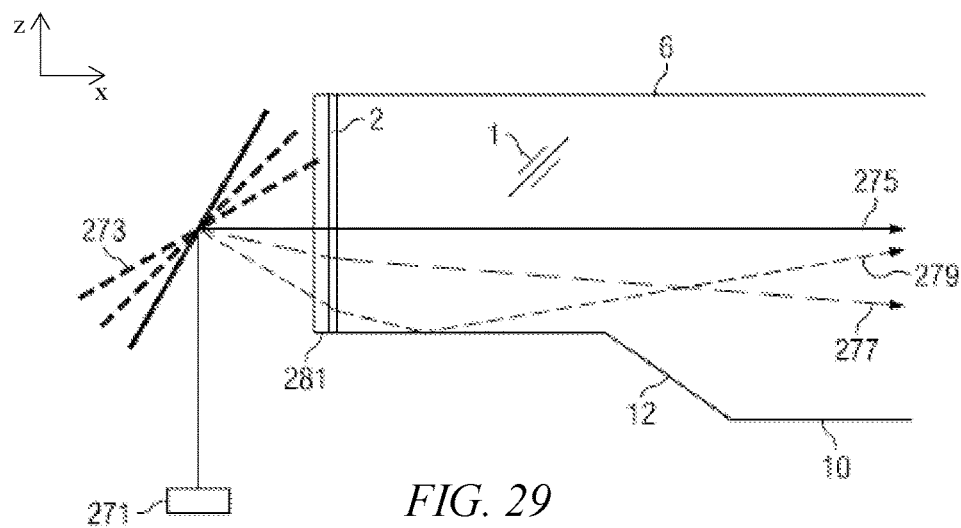
FIG. 29 is a schematic diagram illustrating in side view, the propagation of light from a laser illumination element into a stepped waveguide including a tilting mirror, in accordance with the present disclosure.

FIG. 29 is a schematic diagram illustrating in side view, the propagation of light in a waveguide arrangement from illumination element into a stepped waveguide including a deflector element in the form of a tilting mirror. FIG. 29 shows a further embodiment for directing light with a range of input angles into a stepped waveguide 1. The illumination system comprises a one-dimensional array of illumination elements 271 distributed across the input end 2 of the waveguide 1 in the lateral direction. Therefore they provide the input light from different lateral positions distributed in the lateral direction.

In this embodiment, the illumination elements 271 may output light in a beam, for example being lasers or other highly directional light sources. The light source array may comprise for example an array of edge emitting lasers that may be monolithic, or vertical-cavity surface-emitting lasers (VCSELs).

The illumination elements 271 direct light substantially onto a rotatable mirror 273 which forms a deflector element, arranged between the illumination elements 271 and the input end 2 of the waveguide 1. The mirror 273 deflects the light output by the illumination elements perpendicular to the lateral direction and may be rotated to deflect the light by different amounts. For example, in a first mirror position, light rays 275 may be introduced, in a second mirror position, light rays 277 and in a third position, light rays 279. The input angle between rays 275, 277, 279 thus may provide output light in directions distributed with respect to a normal to the first guide surface 6 in a perpendicular direction to the lateral direction in dependence on the input direction of the input light. This provides the formation of viewing windows 78.

In this manner, a two dimensional array of viewing windows may be achieved. Advantageously such illumination elements 271 may employ a reduced size input aperture 2, increasing stepped waveguide 1 efficiency and reducing cross talk. Further, diffractive optical elements such as holograms may be used, for example holographic reflectors at the side 4. Further, the sources may be provided in addressable arrays to achieve a two dimensional window array.

Additionally, in the above embodiments a diffuser 281 may be provided between the mirror 273 and the waveguide 1, for example on the input end 2 of the waveguide as shown in FIG. 29. The diffuser 281 may be an asymmetric diffuser that is arranged to diffuse light predominantly in the lateral direction, as compared to the direction perpendicular to the lateral direction. The diffuser 281 may be incorporated to increase lateral beam spread in the plane of the stepped waveguide 1, while reducing the visibility of speckle. Limited spreading of light within the guiding portion may be used to achieve blurring between windows 78 in the vertical direction.

Figure 30:
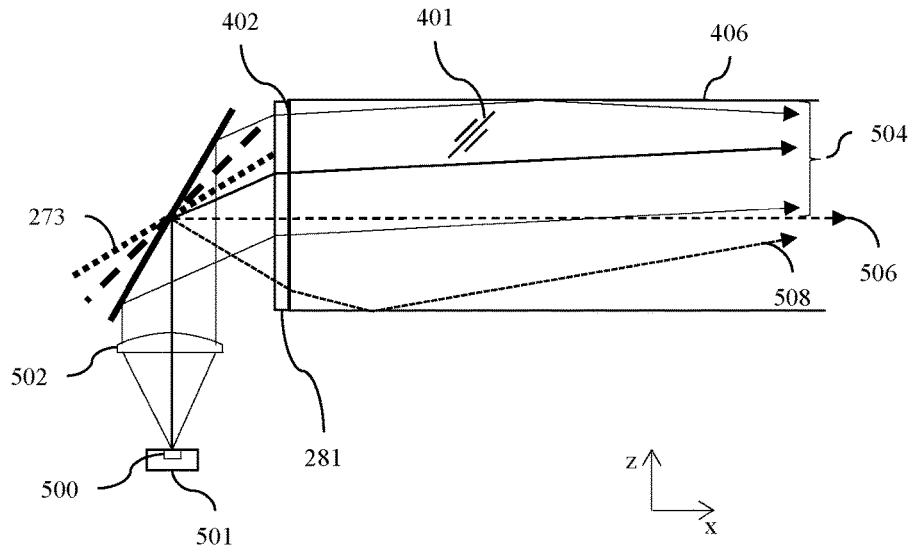
FIG. 30 is a schematic diagram illustrating in a side view, a scanned collimated light source at the input into a stepped waveguide, in accordance with the present disclosure.

FIG. 30 is a schematic diagram illustrating in a side view, the propagation of light in a waveguide arrangement similar to that of FIG. 29 but with the following modifications. Instead of the illumination elements 271 outputting light in a beam, there are used illumination elements 500 in a package 501 that output light in all directions. The waveguide arrangement includes a focusing optical element 502 having positive optical power in a direction perpendicular to the lateral direction provided arranged between the illumination elements 500 and the mirror 273 (although it could more generally be anywhere between the illumination elements 500 and the waveguide 1). The illumination elements 500 arranged to illuminate the focusing optical element 502 to output substantially collimated light. Thus ray bundle 504 and 508, 506 are provided within the waveguide 401 for respective different positions of mirror 273. In comparison with the arrangement of FIG. 29, the operation is substantially the same but the illumination elements 500 may be incoherent light sources and thus may be provided by a white light source.

Figure 31A:
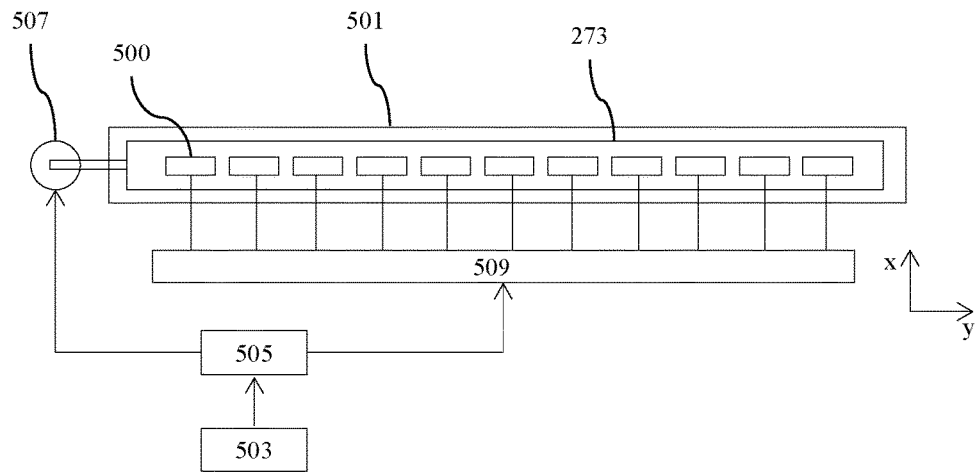
FIG. 31A is a schematic diagram illustrating in a side view a linear light source and control system for a waveguide arrangement, in accordance with the present disclosure.

FIG. 31A is a schematic diagram illustrating in a side view an illumination system that may be used in the waveguide arrangement of FIG. 30, with the illumination elements 500 arranged in the orientation shown in FIG. 30. The illumination elements 500 are shown as a one dimensional array, but may comprise more than one stripe of light sources, to achieve multiple controllable propagating directions within the waveguide from a single position of mirror 273. Controller 505 may be arranged to distribute synchronization signals to mirror 273 controller 507 and pixel data from image source 503 to light sources 500 of the input array. Thus, the supplied image data may be synchronized with the mirror position and the output directions correspondingly modulated in horizontal and vertical angles. In a far field display, such as an autostereoscopic data, the image source 503 provides window illumination data, while in a near-eye display as will be described with reference to FIG. 39A, the image source 503 provides pixel data.

Figure 31B:
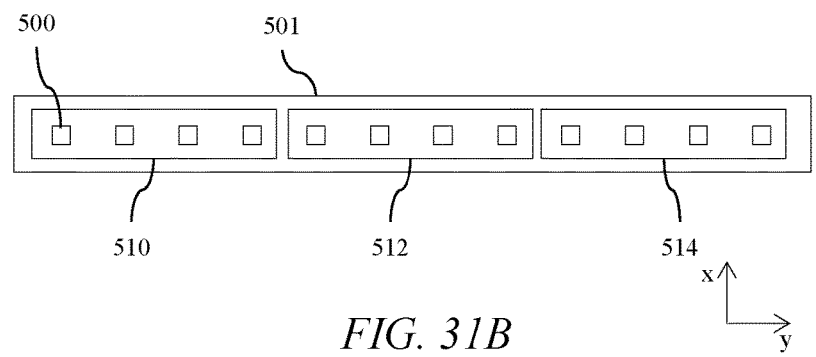
FIG. 31B is a schematic diagram illustrating in a side view a further linear light source for a waveguide arrangement, in accordance with the present disclosure.

FIG. 31B is a schematic diagram illustrating in a side view a further illumination system that may be used in the waveguide arrangement of FIG. 30. The single mirror 273 may be arranged as an array of individually controllable mirrors 510, 512, 514 to achieve increased control of the distribution of window or pixel data to the waveguide, and to reduce mirror mass, reducing cost and complexity of mirror actuators. Mirror actuators may be galvo or MEMS for example. Advantageously, a high resolution directional output can be achieved from a light source with low resolution in the direction orthogonal to the lateral direction. Further, such a display may achieve a fast impulse response function and be well suited to fast moving data.

FIGS. 32 and 33 illustrate alternative arrangements for the input end of the waveguide 1 wherein the input end is an extension of one of the guide surfaces, and a coupler facing the input end is used to deflect input light along the waveguide.

FIG. 32 is a schematic diagram illustrating in side view, the propagation of light into a stepped waveguide including a coupler that is a holographic deflector element in the form of a grating coupling element 287. Illumination array 15 and focusing optical element 101 may be arranged to the rear of the stepped waveguide 1 so that the input end is an extension of one of the guide surfaces to couple light substantially towards grating coupling element 287 arranged opposite on the other one of the guide surfaces. Incident light rays 289 may be incident on the grating coupling element 287 at which time they may be reflected into the input aperture of the stepped waveguide 1 to guide within the waveguide 1. Grating coupling element 287 may include for example a surface relief diffractive reflector or a volume reflection hologram including stacks of holograms to optimize efficiency. Further the function of the optical element 101 may be combined with the deflection function of the grating coupling element 287.

FIG. 33 is a schematic diagram illustrating in side view, the propagation of light into a stepped waveguide including a coupler that is a prismatic deflector element in the form of an array of inclined elongate reflective surfaces 291, 293. Illumination array 15 and focusing optical element 101 may be arranged to the rear of the stepped waveguide 1 so that the input end is an extension of one of the guide surfaces. The reflective surfaces 291, 293 are arranged opposite the illumination array 15 to substantially direct light from illumination array 15 and optical element 101 into the stepped waveguide 1. Thus light rays 283 may be incident on surface 291 and substantially reflected into the stepped waveguide. Light rays 285 incident on surface 293 may be reflected in approximately the opposite direction and may be incident on surface 295 and then may be reflected into the stepped waveguide 1 of the optical valve. The surfaces 291, 293 may be further arranged as an array of prisms to provide a lower height structure that may be more conveniently replicated and coated with a reflective material.

Figure 34A:
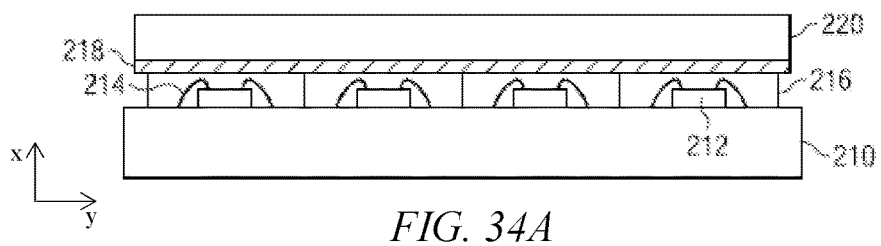
FIG. 34A is a schematic diagram illustrating in side view, an array of LEDs, in accordance with the present disclosure.
Figure 34B:
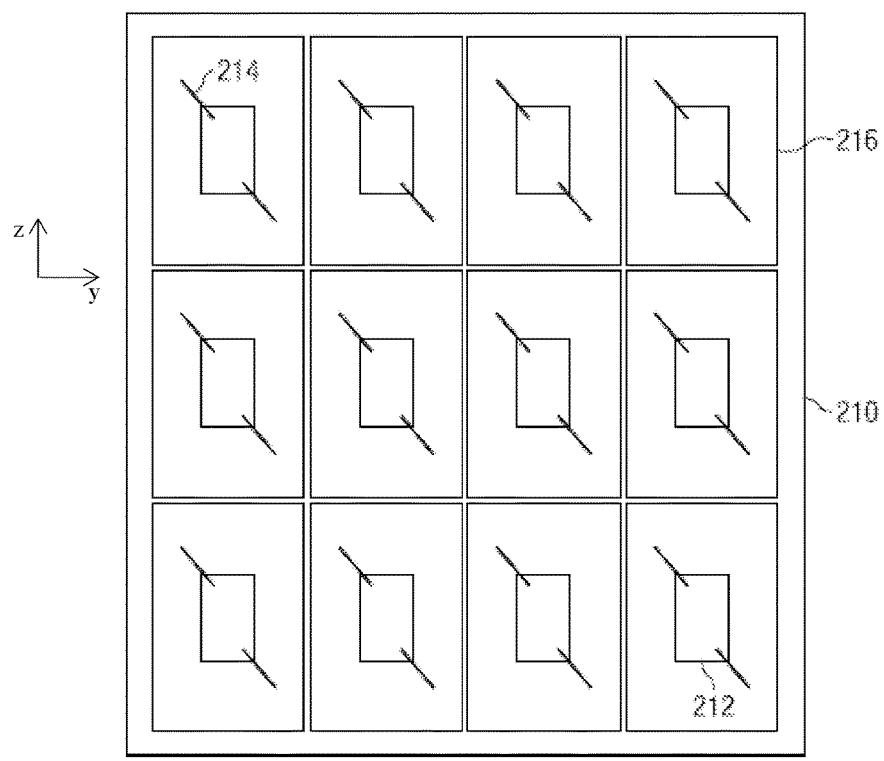
FIG. 34B is a schematic diagram illustrating in front view, an array of LEDs, in accordance with the present disclosure.

FIG. 34A shows in side view, and FIG. 34B shows in front view, an arrangement for a two dimensional illumination array 15 of LEDs as the illumination elements of the present embodiments. The illumination array 15 is arranged as follows. A substrate 210 may have an array of gallium nitride blue emitting LEDs 212 formed thereon and wire bonds 214 arranged to provide controllable electrical connection to the array of LEDs. An array of cavities 216 may be formed around the LEDs 212 to provide optical separation of the blue light and a phosphor plate including a phosphor layer 218 on a carrier plate 220 arranged at the output, to advantageously provide an array of substantially separated but contiguous white illumination elements that are substantially individually controllable.

Figure 34C:
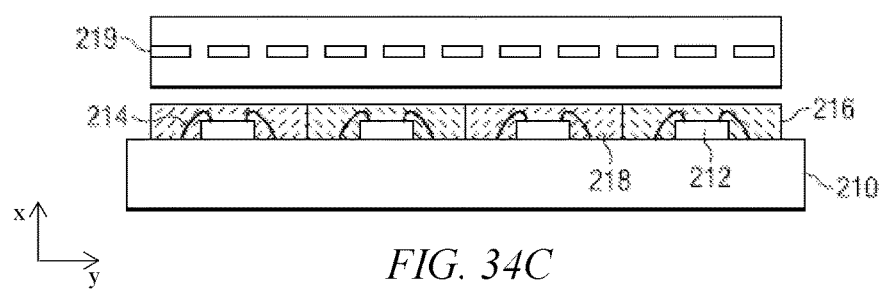
FIG. 34C is a schematic diagram illustrating in side view, a further array of LEDs, in accordance with the present disclosure.

FIG. 34C is a schematic diagram illustrating in side view, an alternative illumination array 15 of LEDs. Further, FIG. 34C shows an alternative arrangement of LEDs in which the phosphor plate is replaced by incorporation of phosphor into the cavities 216. Advantageously such an arrangement may provide further optical discrimination between the LEDs, thus reducing cross talk.

FIG. 34C further shows an optional spatial light modulator 219 that may be aligned with the array of illumination elements 214. Spatial light modulator 219 may have pixels 221 that are arranged with higher resolution than the LEDs 212 and may include a liquid crystal shutter. Advantageously such an arrangement may provide higher illumination element array resolution than can conveniently be achieved with individual LEDs. The LEDs 212 may be continuously illuminated, or may be arranged to be illuminated in cooperation with the pixels of the SLM 219 to advantageously reduce cross talk.

Any of the waveguide arrangements described above with reference to FIGS. 11 to 34C may be used in a directional display device. In this case, a transmissive SLM 48 is arranged to extend across the first guide surface 6 of the waveguide, in a similar manner to the directional display devices of FIGS. 1 to 10. The SLM 48 modulates the light output from the waveguide 1. A display apparatus may comprise such a directional display device and a control system that is arranged to selectively operate the illumination array 15 to direct light into viewing windows corresponding to the output directions. There will now be described an example of such a display apparatus that could be adapted to include any of the waveguide arrangements described above.

Figure 35:
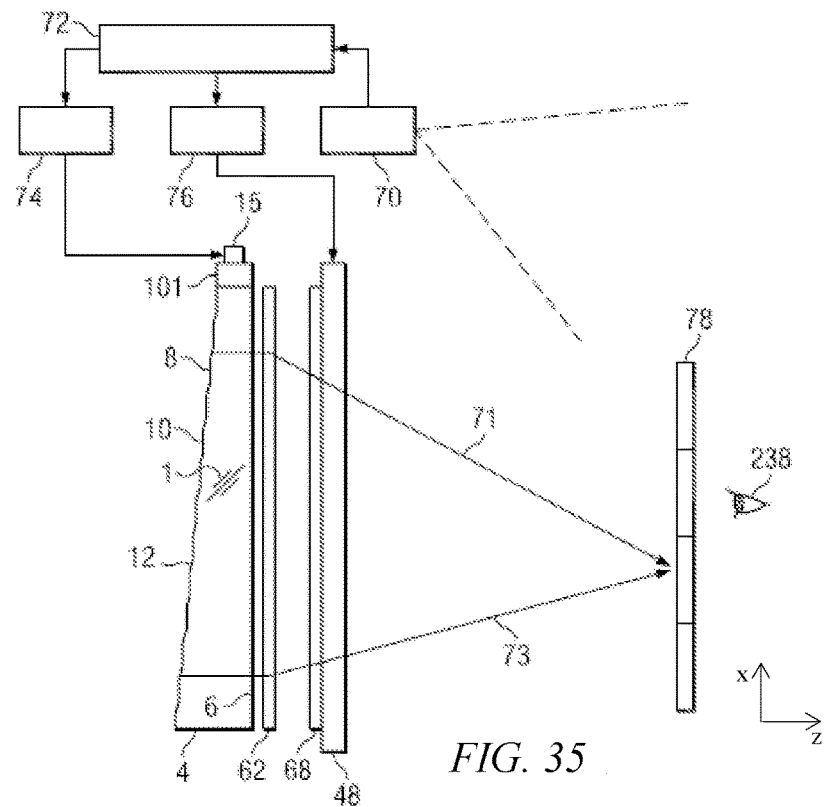
FIG. 35 is a schematic diagram illustrating in side view, the structure of a time multiplexed directional display apparatus including a waveguide arrangement and observer tracking system, in accordance with the present disclosure.

FIG. 35 is a schematic diagram illustrating in side view, the structure of a time multiplexed display apparatus comprising a directional display device and a control system. The directional display device includes a waveguide arrangement that itself includes a stepped waveguide 1 and an illumination array 15. In this example, the focusing optical element 101 is illustrated to provide directional illumination. The focusing optical element 101 may direct the light from the illumination array 15 into the stepped waveguide which may generate a two dimensional set of windows 78, as described above. However, the directional display device could alternatively include one of the other waveguide arrangements described above, for example including the mirror 273.

The stepped waveguide 1 includes a light directing side 8, a reflective end 4, guiding features 10 and light extraction features 12. The directional display device 100 further includes an SLM 48 that extends across the first guide surface 6 of the waveguide 1 and modulates the light output therefrom.

The waveguide 1 is arranged as described above. The reflective end 4 converges the reflected light. A Fresnel lens 62 may be arranged to cooperate with reflective end 4 to direct collimated output light from the stepped waveguide to viewing windows 78 at a viewing plane, thus pupillating the display output across the output of the stepped waveguide 1.

Further a diffuser 68 may be provided to substantially remove Moiré beating between the waveguide 1 and pixels of the SLM 48 as well as the Fresnel lens structure 62. In the illustrative example, with windows of separation of approximately 2.5 degrees, the diffuser 68 may for example have a symmetric diffusion angle (in the lateral direction (y-axis) and perpendicular to the lateral direction (x-axis)) of approximately 1-3 degrees, depending on the appropriate window separation and viewing distance. Alternatively, if the window size is different in horizontal and vertical viewing directions, the diffuser may be asymmetric and may be arranged to blur appropriately to the window cone angle in the particular direction.

FIG. 35 further shows the propagation of light rays 71, 73 from different light extraction features 12 across the side 8 of the stepped waveguide 1. Each of the features 12 may be arranged with the same inclination or tilt, so that light rays 71, 73 may be approximately parallel before incidence onto the Fresnel lens 62, and may be focused towards the windows 78 in the window plane.

The arrangement and operation of the control system will now be described. The control system may comprise a sensor system arranged to detect the position relative to the display device of an observer 238 observing the display from a viewing region. The sensor system comprises a position sensor 70, such as a camera, and a head position measurement system 72 that may for example comprise a computer vision image processing system. The control system may further comprise an illumination controller 74 and an image controller 76 that are both supplied with the detected position of the observer 238 supplied from the head position measurement system 72.

The illumination controller 74 selectively operates the illumination elements of the illumination array 15 to direct light to into selected viewing windows 76 in a two dimensional window array, in cooperation with waveguide 1. The illumination controller 74 selects the illumination elements 15 to be operated in dependence on the position of the observer 238 detected by the head position measurement system 72, so that the viewing windows 78 into which light is directed are in positions corresponding to the left and right eyes of the observer 238. In this manner, the output directionality of the waveguide 1 corresponds with the observer position. The illumination controller 74 determines the correct illumination phase and direction for output given the position of the observer 238 and thus may determine which illumination elements of the illumination array 15 should be illuminated at a given time.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into respective viewing windows 78 in positions corresponding to the left and right eyes of an observer 238 synchronously with the display of left and right eye images. In this manner, an autostereoscopic effect is achieved using a time division multiplexing technique.

Figure 36:
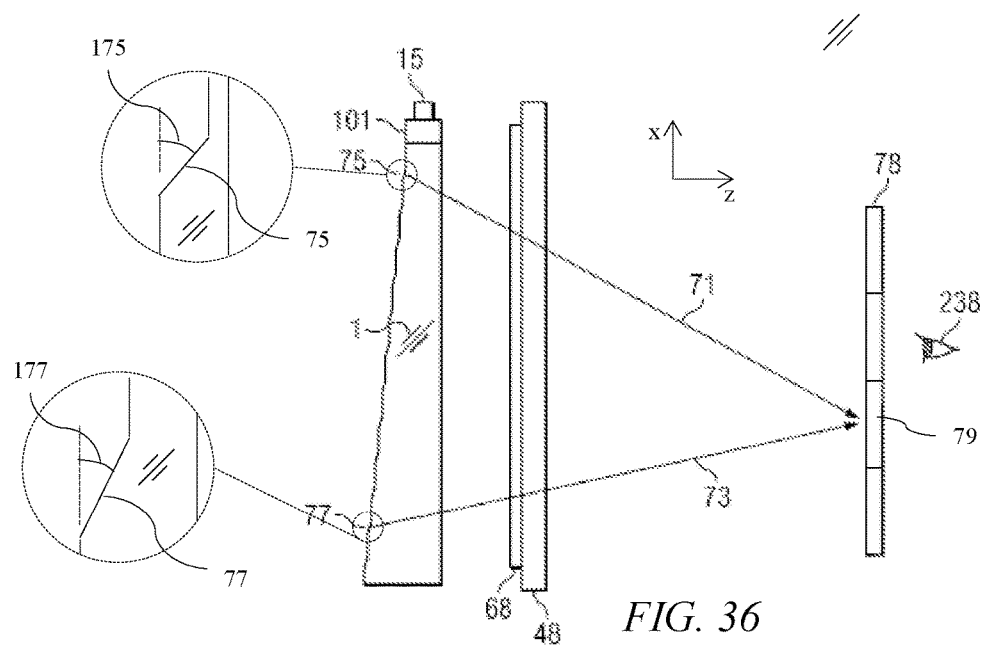
FIG. 36 is a schematic diagram illustrating in side view, the structure of a time multiplexed directional display apparatus including a stepped waveguide including an array of light extraction features that vary in inclination along the length of the stepped waveguide, in accordance with the present disclosure.

FIG. 36 is a schematic diagram illustrating in side view, the structure of a time multiplexed directional display device which is the same as that of FIG. 35 except for the following modification. In this example, the stepped waveguide includes an array of light extraction features 12 that have inclinations that vary along the optical axis of the waveguide 1. For example, light extraction feature 75 may be provided with an inclination angle 175 that is greater than the inclination angle 177 of light extraction feature 77. The inclinations of features 75, 77 may be arranged to provide a pupillation function, providing imaging of rays 71, 73 substantially towards the same window 79 in the window plane for a given row of light sources in the array 15. Advantageously, the Fresnel lens 62 may be omitted, reducing cost and bulk of the apparatus.

Figure 37:
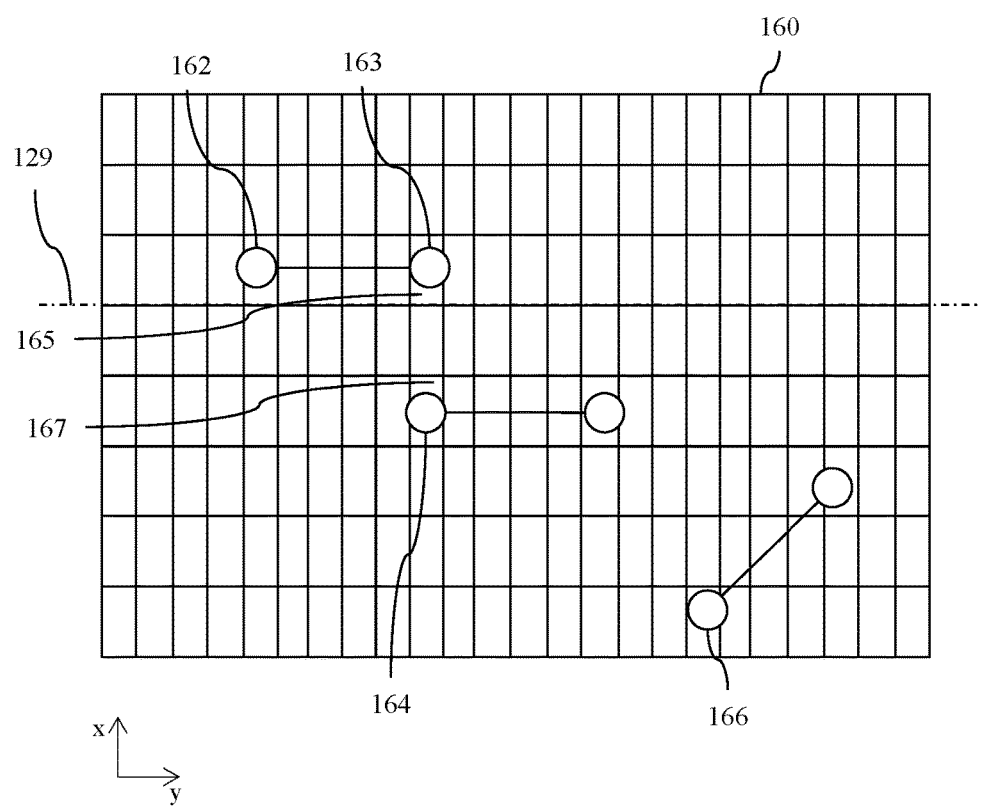
FIG. 37 is a schematic diagram illustrating an array of viewing windows and observer positions, in accordance with the present disclosure.

FIG. 37 is a schematic diagram showing a two-dimensional array of viewing windows 160 and observer positions to illustrate a possible type of control implemented by the control system of FIG. 35. Further, FIG. 37 shows part of the output of the display apparatus when the control system implements a multiple observer tracking autostereoscopic display. The two-dimensional array may include elongate vertical windows 160, so that the pitch in the vertical direction is greater than the pitch in the horizontal direction. Viewer eye positions are indicated by left eye pupil positions 162 and 164, and right eye pupil positions 163. Advantageously such an embodiment may achieve the right eye pupil position 162 of a one observer to be aligned approximately directly under the left eye pupil position 164 of a different observer. Thus window 165 is illuminated in the right eye image phase while window 167 is illuminated in the left eye image phase. Further the present embodiments may enable pupil positions 166 of an observer with tilted eye orientations, such as may occur when an observer is looking at the display from a skewed position. In this case, the image data may be adjusted for the tilted base line direction of the eye separation, which may be achieved by means of the image controller 76.

Continuing the discussion of FIG. 37, during addressing of image data on the display 48, identical left and right eye data may be provided to respective eyes of observers with the same head tilt. Thus the window approximately aligned with left eye pupil position 162 may be illuminated at substantially the same time as the window approximately aligned with the left eye pupil position 164 of the different user. However, an observer having pupil positions 166 may be located at a tilt angle, so that the view data may not be best aligned to their eye orientation. In a further embodiment, the right and left eyes of the observer having pupil positions 166 may be illuminated at different times to the other observers, and correct image data for that observer presented. Advantageously, such a display can correctly track multiple observers with different eye orientations.

Advantageously the vertically extended windows may provide a higher vertical viewing range in the x direction, from a small number of vertically separated illumination light emitting elements in the illumination array 15 to provide discrimination between multiply positioned viewers. The narrower lateral separation in the y direction of viewing windows may enable low cross talk lateral tracking with low levels of flicker to be achieved.

Figure 38A:
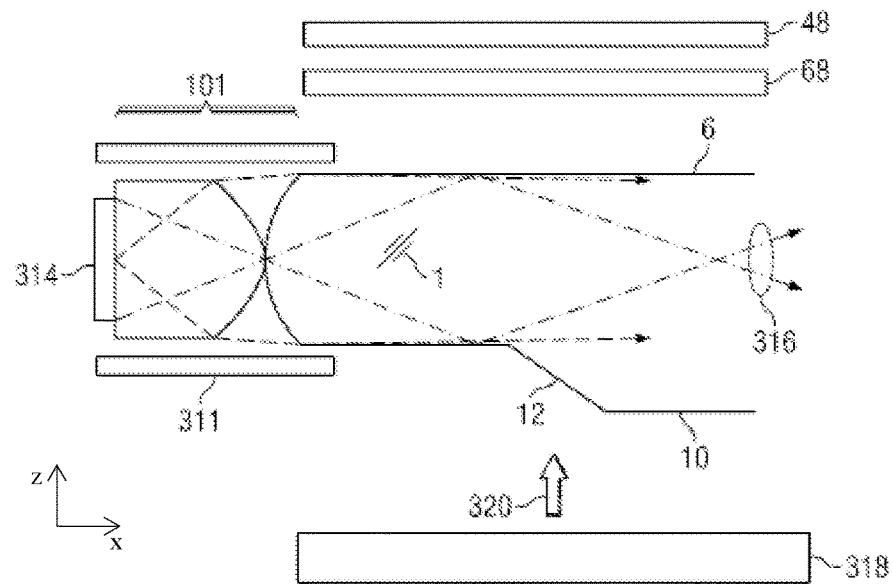
FIG. 38A is a schematic diagram illustrating in side view, a waveguide arrangement arranged to limit output viewing directions, in accordance with the present disclosure.

FIG. 38A is a schematic diagram illustrating in side view, a waveguide arrangement arranged to limit output viewing directions. The waveguide arrangement includes illumination element 314, focusing optical element 101 and stepped waveguide 1. Further, FIG. 38A shows a further embodiment in which the input illumination array 15 includes a single illumination element 314 in the vertical direction, combined with focusing optical element 101. The present embodiment may achieve a narrow illumination cone 316 within the stepped waveguide. This may provide a small range of angles incident on the mirror surface of side 4 and light extraction features 12 in the counter propagation direction, so that the window field curvature may be reduced compared to a full cone angle illumination. The output can be diffused in the vertical direction by means of vertical diffuser 68. Further, the light cone 316 may be efficiently directed by the light extraction features 12 without employing silvering, thus reducing cost and increasing efficiency. Advantageously this embodiment may achieve reduced cross talk due to the reduced leakage of light to the rear of the stepped waveguide by reducing refraction at the light extraction features 12.

Further to the discussion of FIG. 38A, additional optical components 318 may be arranged to the rear of the stepped waveguide 1 such as, but not limited to, valves, 2D backlights, reflectors, polarization recirculation optical elements, and so forth. Advantageously the present embodiment may enable the light extraction features 12 to be unmetallized, relying on total internal reflection without light substantially escaping towards the component 318. By way of comparison, if light did escape towards component 318 then the light may be recirculated within the optical system, propagating in the direction 320, creating unwanted cross talk and image artifacts. Further, the present embodiments may not employ metallized features 12 so that advantageously the Moiré between the features 12 and structure in the component 318 may be reduced or removed.

Figure 38B:
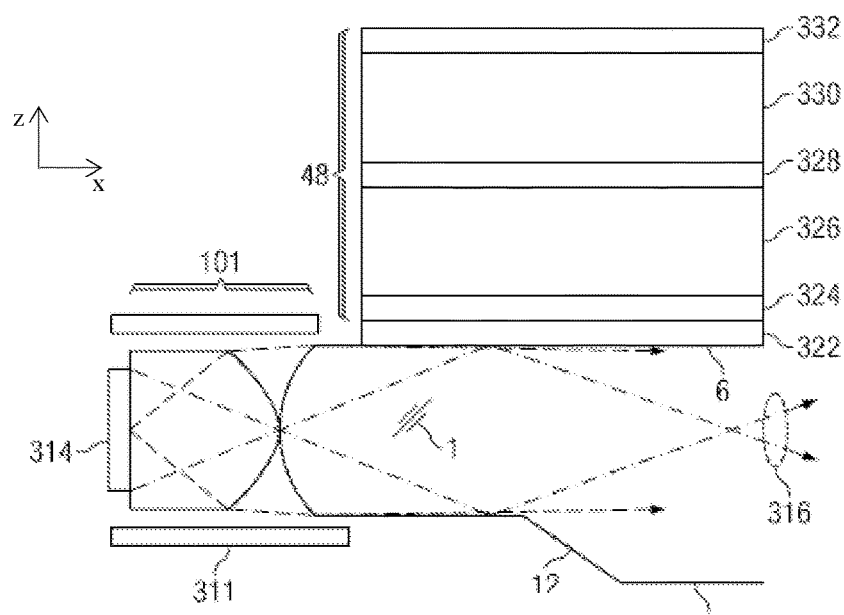
FIG. 38B is a schematic diagram illustrating in side view, a stepped waveguide integrated with a spatial light modulator, in accordance with the present disclosure.

FIG. 38B is a schematic diagram illustrating in side view, a display device including a waveguide arrangement integrated with a spatial light modulator 48. Further, FIG. 38B shows a further embodiment including the apparatus of FIG. 38A arranged at the input surface of a spatial light modulator 48 including a liquid crystal display comprising polarizers 324, 332, substrates 326, 330 and switchable liquid crystal layer 328. The limited cone angle 316 propagating within the stepped waveguide may increase the critical angle that can be provided by the stepped waveguide at the side 4. In an illustrative example, a total cone angle 316 of approximately 26° may be guided by a stepped waveguide with the critical angle at the surface interface of side 6 of less than approximately 77°. Such an interface may for example be provided by a bulk refractive index of the stepped waveguide 1 of approximately 1.5, with a low index coating layer 322 of refractive index of approximately 1.4, providing a critical angle of approximately 71°. For example, material of layer 322 may include, but may not be limited to, a silicone, an aerogel, a fluorinated polymer, and so forth. Advantageously such an arrangement may provide a reduced thickness device that may be mechanically stabilized by the liquid crystal panel. Further light losses due to Fresnel reflections may be minimized for the output light from the features 12, thus reducing cross talk in the display system.

Any of the waveguide arrangements described above with reference to FIGS. 11 to 34C may be used to provide near-eye display of images. In this case, the illumination system may be operated in accordance with the image to be displayed so that the output light represents the image as a collimated image. That is the different directions of the output light directed in the lateral and perpendicular directions are modulated in accordance with the image. Thus, in a near-eye display apparatus, the waveguide arrangement may be combined with a control system that operates the illumination system to provide input light in accordance with image data representing the image to be displayed. In particular, the illumination system is controlled to direct (a) the different lateral positions that provide distribution of the output light in the different lateral directions and (b) in the different directions perpendicular to the lateral direction that provide distribution of the output light in the different directions perpendicular to the lateral direction, in accordance with the rows and columns of the image data.

As the light rays are collimated, when an observer views the waveguide 1, the eye of the observer focuses the image onto the retina and is thus perceived as a distant image. The term "collimated" is used to mean that the light is sufficiently collimated to be focused by the observer's retina including light that is strictly parallel or has some degree of divergence.

There will now be described examples of such a near-eye display apparatus that could be adapted to include any of the waveguide arrangements described above.

Figure 39A:
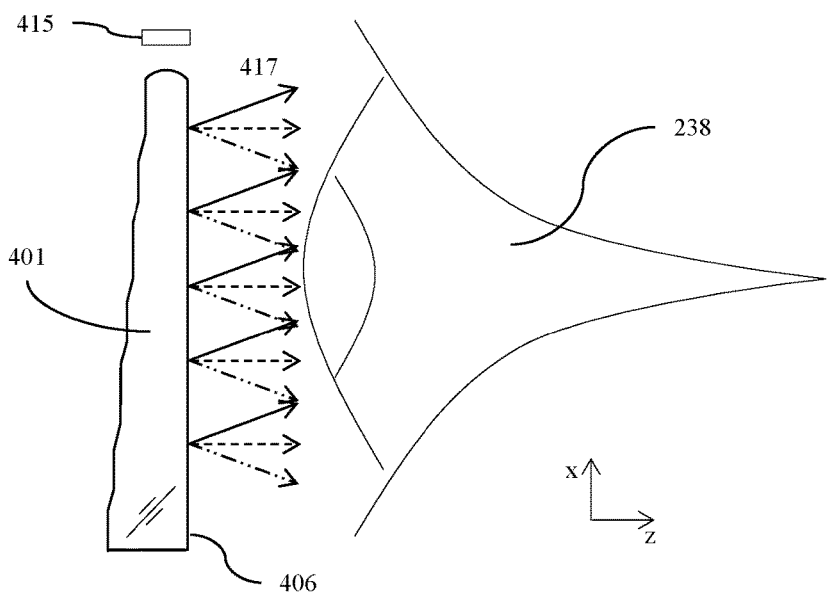
FIG. 39A is a schematic diagram illustrating in side view the light output from a near-eye display apparatus coupled into an observer's eye, in accordance with the present disclosure.

FIG. 39A is a schematic diagram illustrating in side view the light output from a near-eye display apparatus coupled into an observer's eye. FIG. 39A is illustrates the imaging of light rays 417 by an eye of an observer 238 close to the first guide surface 406 of the directionally-illuminated waveguide 401. The illumination array 415 includes is a two-dimensional array of illumination elements. In order to provide the desired resolution, the illumination array 415 may be formed by a backlight and a spatial light modulator as will be described by example embodiments with reference to FIGS. 39B-E.

Rays from each pixel are directed into respective angular output windows 78 in respective output directions to achieve a magnified image of the illumination array 415 for an observer 238. Thus each angular output window 78 provides a magnified pixel of the observed image.

As an alternative to the illumination array 415 including a two-dimensional array of illumination elements, the illumination array may include a one-dimensional array of illuminator elements distributed across the input end 2 of the waveguide 1 in the lateral direction only and a deflector element, for example arranged as shown in FIG. 31A and operating as described above. In this case, the control system operates the operate the illuminator elements to display successive lines of image data and operates the deflector element in synchronization therewith to direct the light of those successive lines in the different directions perpendicular to the lateral direction.

In an illustrative embodiment the waveguide 401 may have a 1 mm thick input end 2 and a 3 mm thick reflective end 4. The length of the waveguide 401 may be 40 mm and the width at the reflective end may be 20 mm, and may be substantially filled in the lateral direction by an illumination system such as that shown in FIG. 31A. The angular field size in air in the lateral direction may thus be approximately 21 degrees. Thus the near-eye display device may appear to have an equivalent width of 110 mm for a 300 mm viewing distance. The light directing features 412 may be arranged over the entire area of the second guide surface 8, or may be arranged over a smaller area to provide a controlled image area and increase device efficiency, for example a circular region of radius 7 mm. The waveguide 401 may be illuminated by a light cone with a total input angle in air in the z-direction at the input side of +/−12 degrees. Thus the mirror 273 may rotate through a total angle of +/−6 degrees. The illumination array may be arranged as a linear array with a 20 mm length and 10 micrometer height comprising 1920 light sources of size 10×10 micrometers. The mirror 273 may oscillate with a 60 Hz frequency, and the light sources may be updated every 15 microseconds. Thus a 60 Hz image of resolution 1920×1080 may be achieved.

In a further illustrative embodiment the waveguide 401 may have a 1 mm thick input end 2 and a 3 mm thick reflective end 4 further comprising an illumination array 15 as shown in FIG. 16. The length of the waveguide 401 may be 20 mm and the width at the reflective end 4 may be 10 mm, with a illumination array of lateral width 10 mm. The angular field size in air in the lateral direction may thus be approximately 21 degrees. The waveguide may be illuminated by a light cone with a total input angle in air in the z-direction perpendicular to the lateral direction at the input end 2 of 12 degrees. The focal length of the optical focusing element 101 may be 5 mm, and the total height of the illumination elements may be 1 mm. The illumination elements as shown in FIG. 16 may have a resolution of colour pixels of 640×360 pixels so that the individual pixel pitches are approximately 15×3 micrometers. Colour output may be provided by separate red, green and blue pixels of pitch approximately 5×3 micrometers or by time sequential colour operation, further comprising a colour selective switching element aligned with the array of white light sources.

FIGS. 39B-E are schematic diagrams illustrating in side view light input to a stepped waveguide in the near-eye display apparatus of FIG. 39A and illustrate example embodiments of illumination array 415.

Figure 39B:
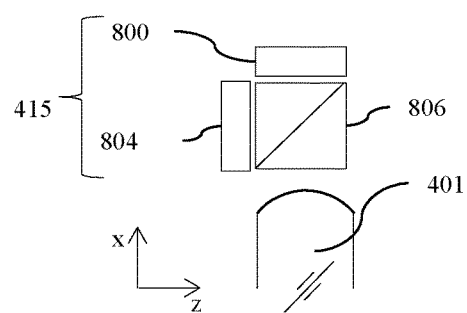
FIGS. 39B-E are schematic diagrams illustrating in side view light input to a stepped waveguide in the near-eye display apparatus of FIG. 39A, in accordance with the present disclosure.

FIG. 39B is a schematic diagram illustrating in side view a reflective SLM 800 such as a liquid crystal on silicon (LCOS). Light source 804 that may comprise red, green and blue LEDs may be arranged to sequentially illuminate the SLM 800 by means of beamsplitter cube 806 or alternatively a beamsplitter plate. Advantageously high resolution pixels can be arranged with colour performance achieved by temporal multiplexing, further increasing the resolution of the image produced in comparison to SLMs comprising separate red, green and blue pixels.

Figure 39C:
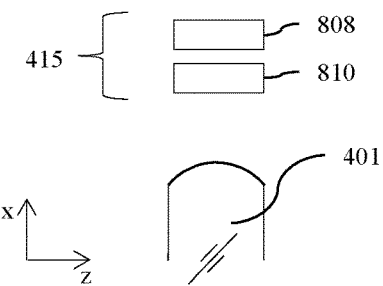

FIG. 39C is a schematic diagram illustrating in side view a transmissive SLM 810 such as an LCD illuminated by backlight 808. Advantageously the beamsplitter 806 of FIG. 39B is removed, reducing cost, bulk and complexity.

Figure 39D:
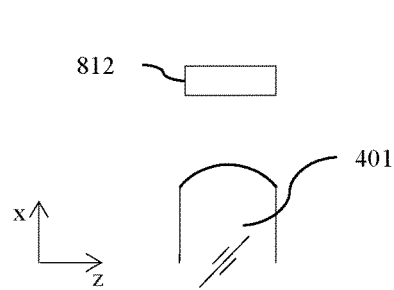

FIG. 39D is a schematic diagram illustrating in side view a emissive SLM 812 such as an OLED on silicon display. Advantageously the beamsplitter 806 of FIG. 39B is removed, reducing cost, bulk and complexity and a further backlight 808 of FIG. 39C is not required.

Figure 39E:
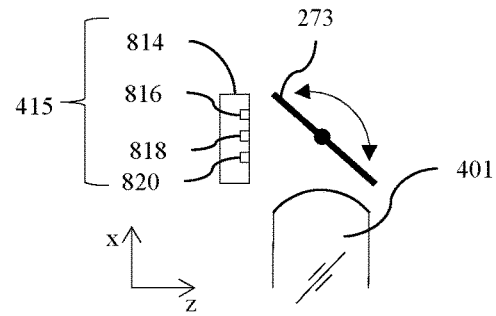

FIG. 39E is a schematic diagram illustrating in side view an emissive SLM 814 such as an LED bar. The SLM 814 may comprise rows 816, 818, 820 of light emitting elements that may be red, green and blue light emitting elements, such that on rotation of mirror 273 the colour and spatial data is synchronized with the mirror position to achieve alignment in angular space within the waveguide. Advantageously the resolution of the array 415 in the direction perpendicular to the lateral direction can be increased in comparison to the arrangements of FIGS. 39B-D.

Such a display may be achieved for example by an organic light emitting diode structure arranged on a silicon backplane, or a liquid crystal on silicon device structure.

Figure 40:
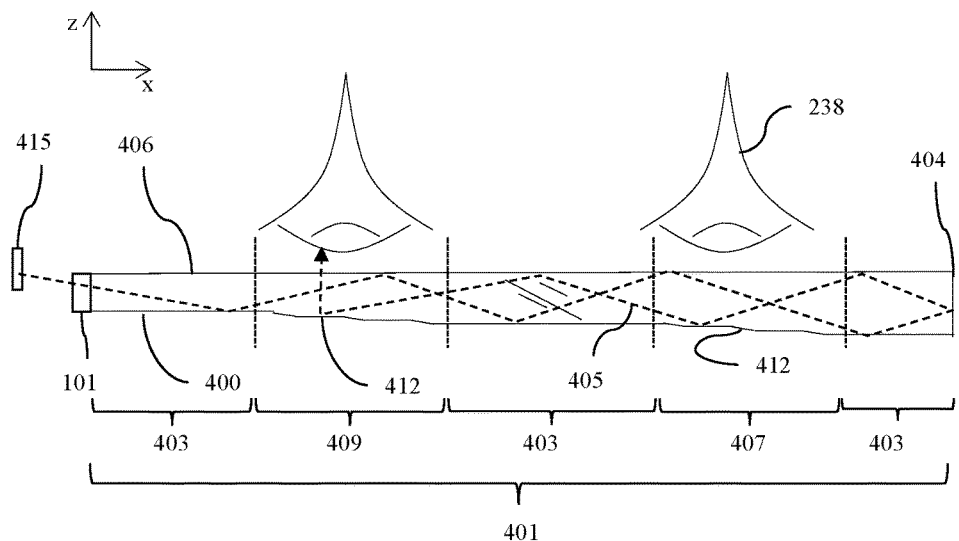
FIG. 40 is a schematic diagram illustrating in side view the operation of a near-eye display apparatus, in accordance with the present disclosure.
Figure 41:
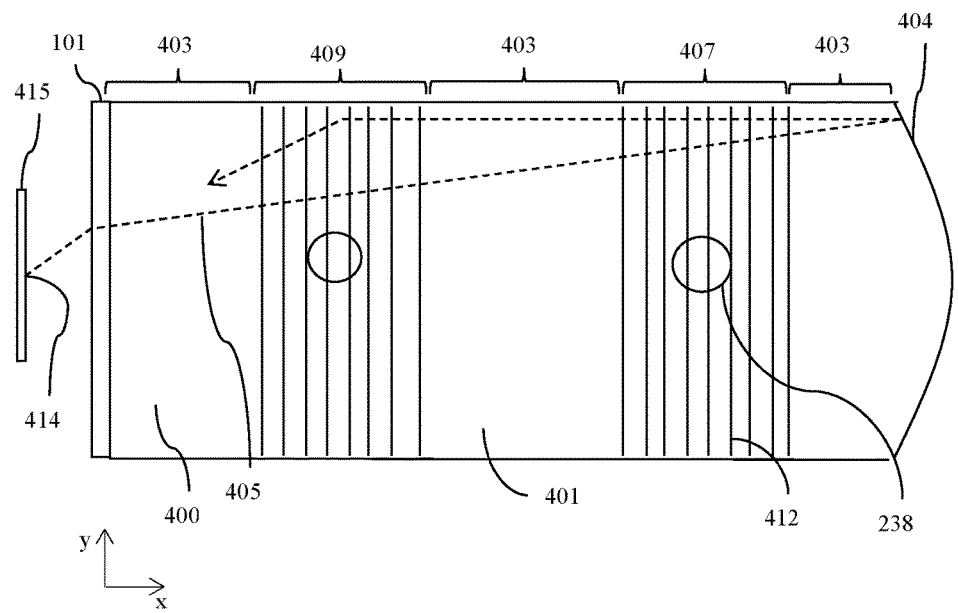
FIG. 41 is a schematic diagram illustrating in front view a near-eye display apparatus, in accordance with the present disclosure.

FIGS. 40 and 41 are schematic diagrams illustrating, in side view and front view respectively, the operation of a near-eye display apparatus including a waveguide 401 directionally-illuminated by an illumination array 415 including a two-dimensional array of illumination elements through a focusing optical element 101.

The waveguide 401 comprises a reflective end 404 arranged to substantially collimate light rays 405 from a pixel 414 in the illumination array 415. The waveguide 401 has three non-extracting regions 403 and two light extracting regions 407 and 409 intermediate the non-extracting regions 403. In the non-extracting regions 403, the second guide surface 400 is planar without any light extracting features, and so comprise the first guide surface 406 and a planar, parallel part of the second guide surface 400. In the light extracting regions 407 and 409, the second guide surface 400 is provided with light extraction features 412 so as to provide a stepped waveguide. Eye pupil positions of the observer 238 are shown aligned to light extracting regions 407 and 409.

In operation, in a first pass, light ray 405 propagates through the non-extracting regions 403; and the second light extracting regions 407, 409 that may provide light extraction in a second (counter propagating) pass. Light is not extracted during the first pass. The light ray 405 is then reflected at side 404 in a similar manner to that described above for reflective end 4 where it may be collimated and returned back down the valve in a second pass. Light passing through non-extracting regions 403 is thus passed substantially without loss until it is incident on light extraction regions 407, 409 where it is directed upwards at light extraction features 412. An observer 238 with eyes positioned in proximity to the light extraction regions 407, 409, will thus receive light from the array 415. The directionality of the light output of the array is preserved, thus the observer may see a magnified image of the array 415 with different magnifications for in orthogonal axes of the array as will be described below. Advantageously the regions 403 do not provide light extraction and thus the device efficiency may be increased. Alternatively regions 403 may be omitted or reduced in size to increase freedom to find the best viewing position.

First and second light extraction regions 407 and 409 may be provided so that the display may be seen by both eyes. Alternatively the display may by monocular.

Figure 42:
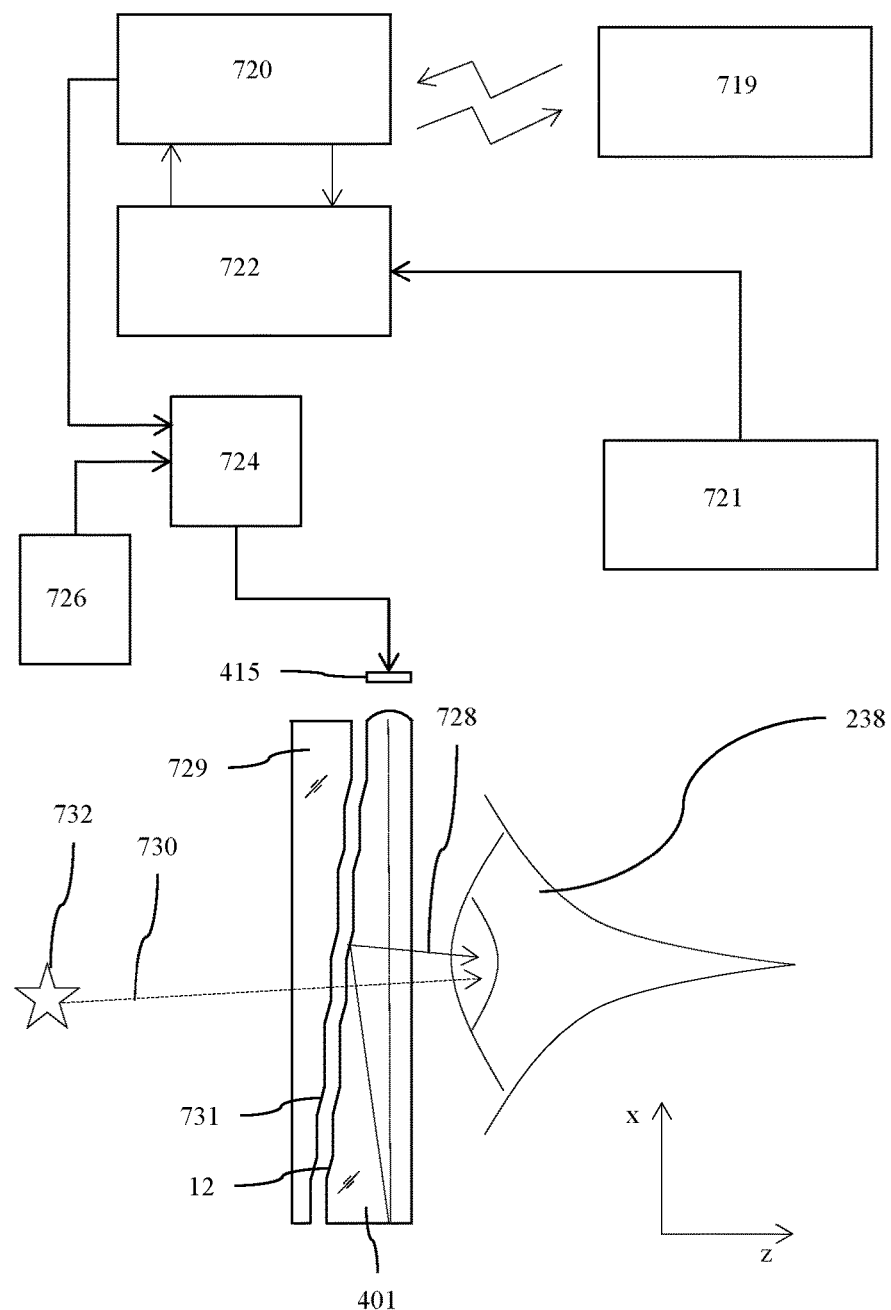
FIG. 42 is a schematic diagram illustrating a side view of a near-eye display apparatus including a near-eye control system, in accordance with the present disclosure.

FIG. 42 is a schematic diagram illustrating a side view of a near-eye display apparatus including a waveguide arrangement as described above and a control system. The control system includes elements and is arranged to operate as follows to control the illuminator array 415.

Device communicator 720, for example a Bluetooth interface to a remote device 719 such as a cell phone may be arranged to communicate image data representing the image to the displayed to the device, and provide control data interface for example from a touch panel 721 and interface controller 722 that may be arranged for example on the arm of a pair of spectacles. Image data may be directed to a display driver 724 arranged to drive the illumination array 415. Image data may be modulated by signals from an ambient light sensor, such as a camera device mounted on the spectacles. If the ambient environment has increased light levels, the output to the display may be modified to compensate accordingly.

Ambient light rays 732 from external sources 730 are substantially passed through the waveguide 401, while light from the array 415 is directed by the light extraction features 12 to the eye of the observer 238. In an illustrative embodiment, light extraction features 12 may have a width in the x-direction of 5 micrometers, and a pitch of 250 micrometers, so that amount of ambient light that is redirected on input is minimal. The light extraction features 12 may serve to provide diffractive blurring of far field images. Such blurring can be reduced in appearance by randomizing the pitch of the light extraction features 12 across the area of the aperture of the pupil of the observer 238, so that the pitch becomes irregular. A further light absorbing layer may be provided between the features 10, 12 and the ambient environment so the observer does not observe such degradations.

Optionally the waveguide arrangement may further include a compensating optical component 729 extending across the second guide surface of the waveguide 401. The compensating optical component 729 has a surface 731 facing the second guide surface that has a shape matching the second guide surface, thus comprising features similar in shape to the light extracting features 12. The compensating optical component 729 may be placed in alignment with the waveguide 401, thus reducing the visibility of stray light seen through the region of the features 12, advantageously reducing loss of contrast for objects seen in the far field of observation. To facilitate viewing by an observer, the waveguide apparatus may incorporated into a head-mounted apparatus that is adapted to be worn on the head of a user. The waveguide is arranged to extend across at least one eye of the user when the head-mounted apparatus is worn. There will now be described some examples of this in which the head-mounted apparatus is a pair of spectacles, although in general other head-mounted apparatuses could be provided, for example goggles or an attachment to a helmet or hat.

Figure 43A:
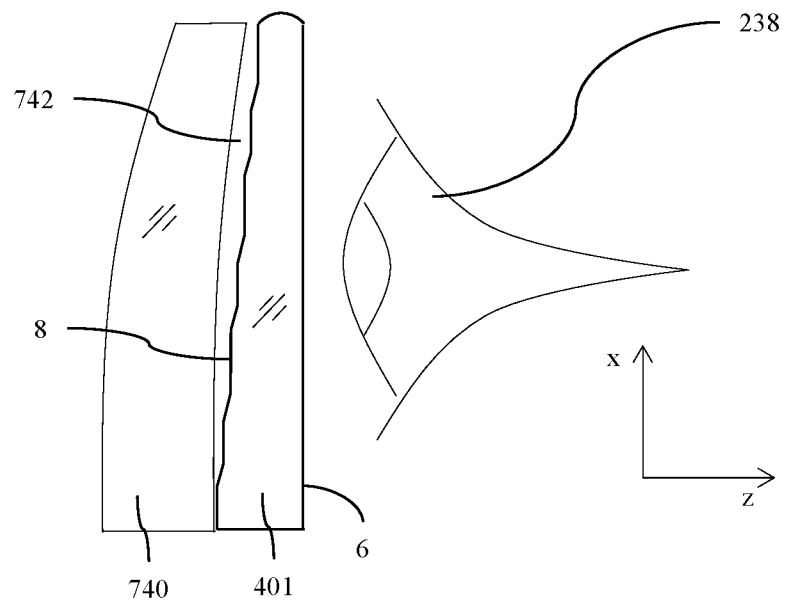
FIGS. 43A-D are schematic diagrams illustrating in top view a near-eye display apparatus incorporated into a pair of spectacles, in accordance with the present disclosure.

FIGS. 43A-D are schematic diagrams illustrating in top view a near-eye display apparatus incorporated into a pair of spectacles. It would be desirable to protect the second guide surface 8 of the waveguide 401 comprising the light extracting features 12 from damage during wear. As shown in FIG. 43A, an additional spectacle component 740 can be applied to the front of the waveguide 1, with an air gap 742 arranged therebetween. The component 740 can be a corrective lens having optical power for correction of eyesight in combination with the display functions achieved by embodiments described herein.

Further, component 740 may have structured side 731 as shown in FIG. 42. Further component 740 may comprise photochromic material, polarizing material or other absorbing material desirable for sunglasses or other material for enhanced spectacle effects. For example, the component 740 for left and right eyes may comprise respective waveplates and polarisers suitable for viewing stereoscopic displays comprising orthogonal polarisation encoded images.

Figure 43B:
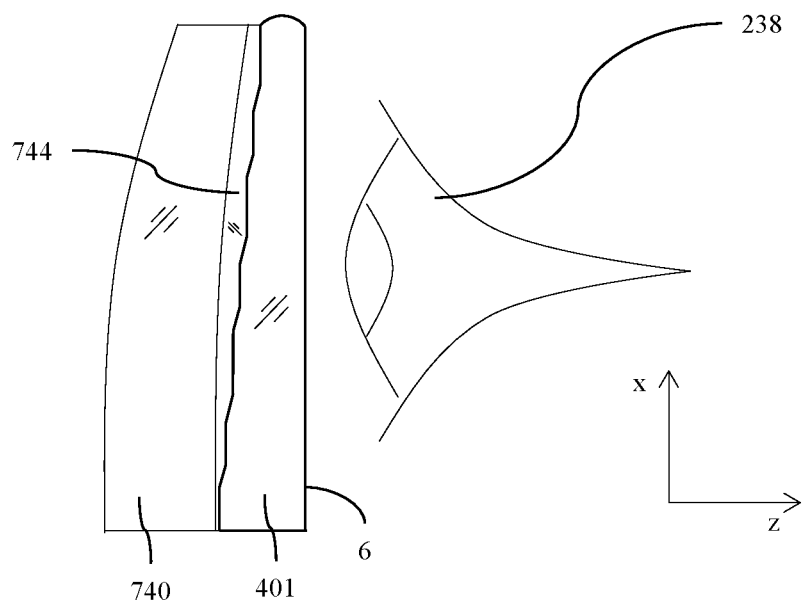

FIG. 43B shows a further embodiment similar to that of FIG. 43B except that a low index material 744 such as a silicone is arranged between the component 740 and the waveguide 401. Light may still be directed within the waveguide 401 due to the refractive index difference between the material of the waveguide 401 and the material 744. Incident light from external light sources 732 undergoes less reflection at the surfaces on each side of the gap 742, improving the contrast of the ambient environment.

Figure 43C:
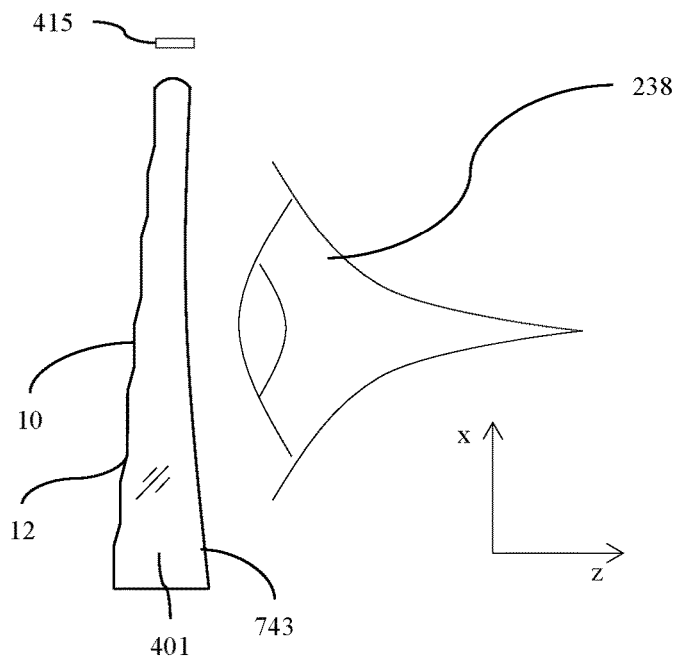
Figure 43D:
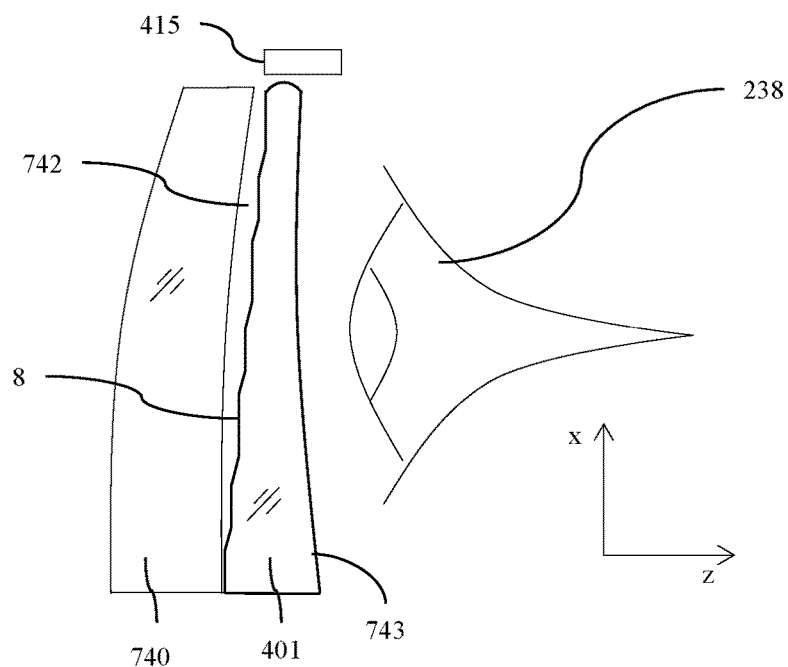

Whereas in FIG. 43A, the component 740 that acts as a corrective lens is a separate element from the waveguide, FIG. 43C shows a further embodiment wherein the first guide surface 743 of the waveguide 401 forms the corrective lens by being arranged with a curvature to provide optical power. Such an arrangement may increase light losses from the waveguide 1, however the observer's pupil integrates across a range of positions from the waveguide so that non-uniformities that may arise may be compensated. FIG. 43D shows that a combination of vision correction can be achieved by curvature of the second guide surface 743 and the component 740. Advantageously the second guide surface 8 may be protected, and the quality of visual correction enhanced.

Figure 43E:
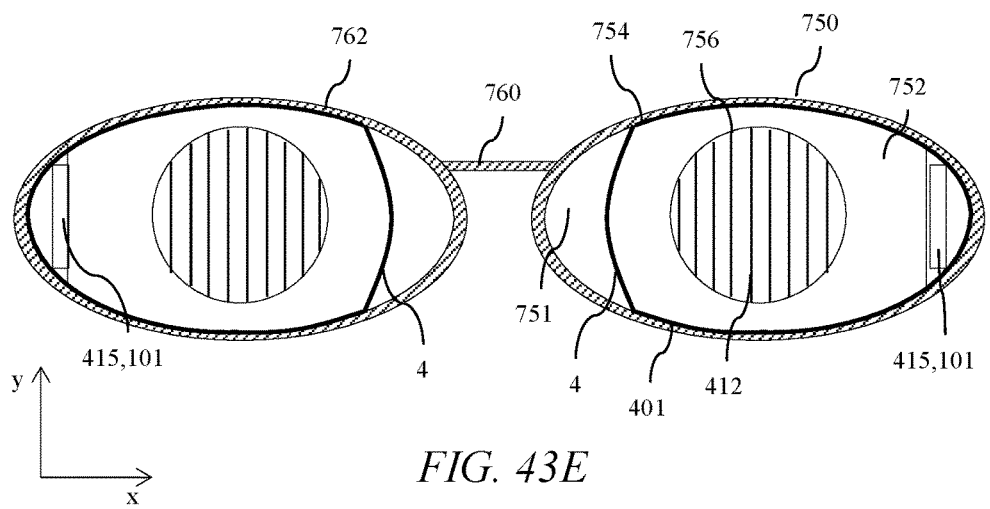
FIGS. 43E-G are schematic diagrams illustrating in front view a near-eye display apparatus incorporated into a pair of spectacles, in accordance with the present disclosure.
Figure 43F:
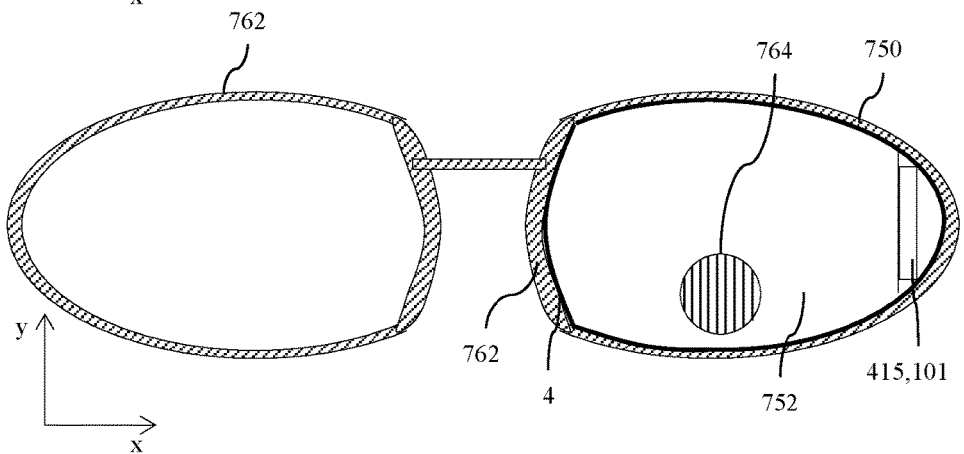
Figure 43G:
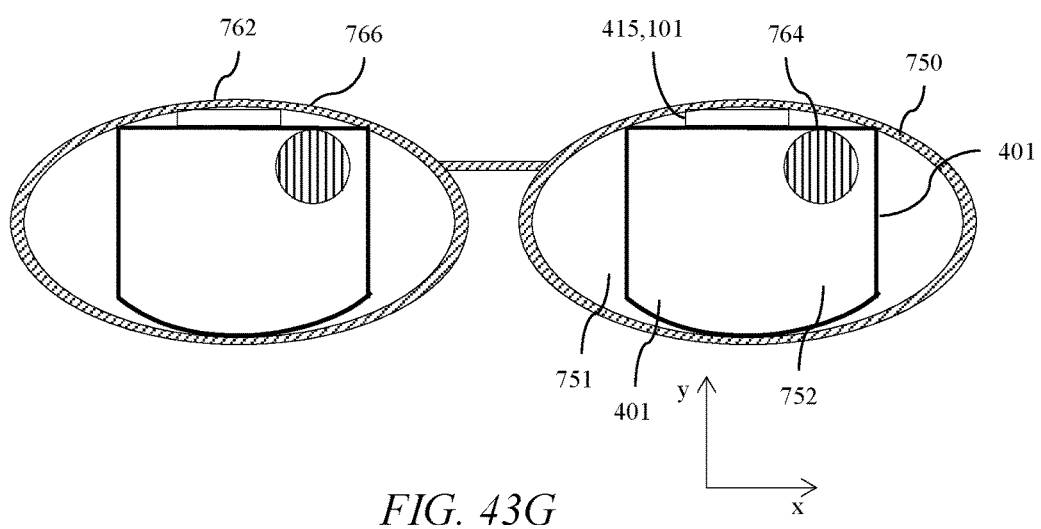

FIGS. 43E to 43G illustrate the incorporation of the waveguide arrangement into a pair of spectacles comprising lenses arranged to extend over both eyes of the user. In each case, any of the arrangements of FIGS. 43A to 43D may be applied.

FIGS. 43E-G are schematic diagrams illustrating in front view a near-eye display apparatus incorporated into a pair of spectacles. FIG. 43E shows a first pair of spectacles with left eye frame 762 and right eye frame 750. Light sources (not shown) are arranged to input light at input end 2, which may be by means of turning mirrors or other optical components as described above. Light passes through the waveguide, is reflected at reflective end 4 and output through light extraction features 12 arranged in regions 756 that may be aligned substantially in the centre of field of the observer without substantially obstructing ambient light as described with reference to FIG. 42. Clear regions 752 are provided outside region 756. The sources for left and right eye spectacles may provide 2D or stereo image pairs. Advantageously the waveguide can have sides 22, 24 that are arranged to match the style of the desired spectacles. Such waveguides may be fabricated by machining reference blanks so that in manufacture a larger blank is provided and cut to a suitable frame size. Advantageously, the cost of integration with desirable spectacle frames may be reduced.

It may be desirable to position the viewing area away from the on-axis viewing position. FIGS. 43F and G show that for single eye and dual eye viewing, light extraction regions 764, 766 may be arranged away from the centre of vision. Such an arrangement may achieve increased efficiency of light extraction and interference of images with ambient light rays.

Further in FIG. 43G the array 415 is arranged towards the top of the spectacles in comparison to the arrangements of FIGS. 43E-F. Regions 751 may be arranged outside the waveguide 401 to complete the frame of the spectacles, and potentially to supply further optical power as described in FIGS. 43A-D. The boundary between the waveguide 401 and region 751 may comprise metallic coating of the respective edges of the waveguide 401. Such an arrangement can advantageously achieve increased number of pixels in the lateral direction, to provide letterbox format type images for the observer. For example images may comprise a ratio of 16 horizontal pixels to 9 vertical pixels with reduced aberrations and light loss compared to the arrangements of FIGS. 43E-F.

Figure 44A:
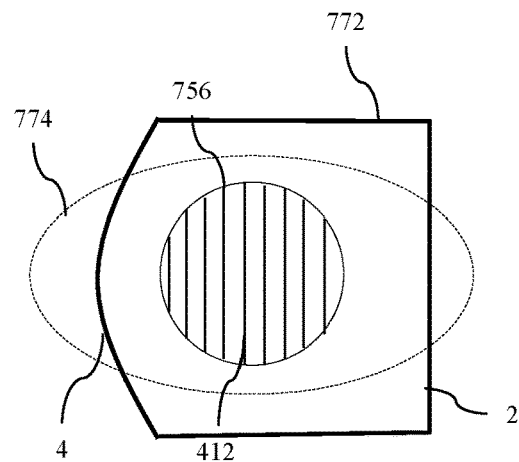
FIGS. 44A-C are schematic diagrams illustrating a front view of a method to form a near-eye display apparatus in a pair of spectacles, in accordance with the present disclosure.
Figure 44B:
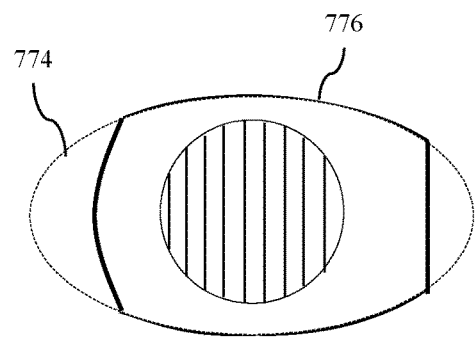
Figure 44C:
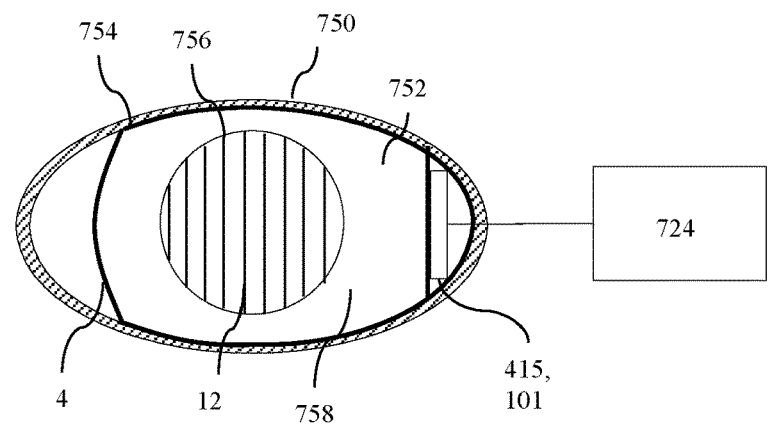

FIGS. 44A-44C are schematic diagrams illustrating a front view of a method to form a near-eye display apparatus in a pair of spectacles. In a first step as shown in FIG. 44A, a waveguide blank 772 is provided comprising input end 2 and reflective end 4 together with light extraction region 756. Desired spectacle shape 774 is arranged as shown, and as shown in FIG. 44B a cutting machine such as a water jet cutter or other known cutting method is used to provide the edge shape 776. The cut waveguide 401 with desired shape 776 may be assembled with the light source 415, focussing optical element 101 and electrical connections to driver 724 to provide the spectacle assembly.

Figure 45:
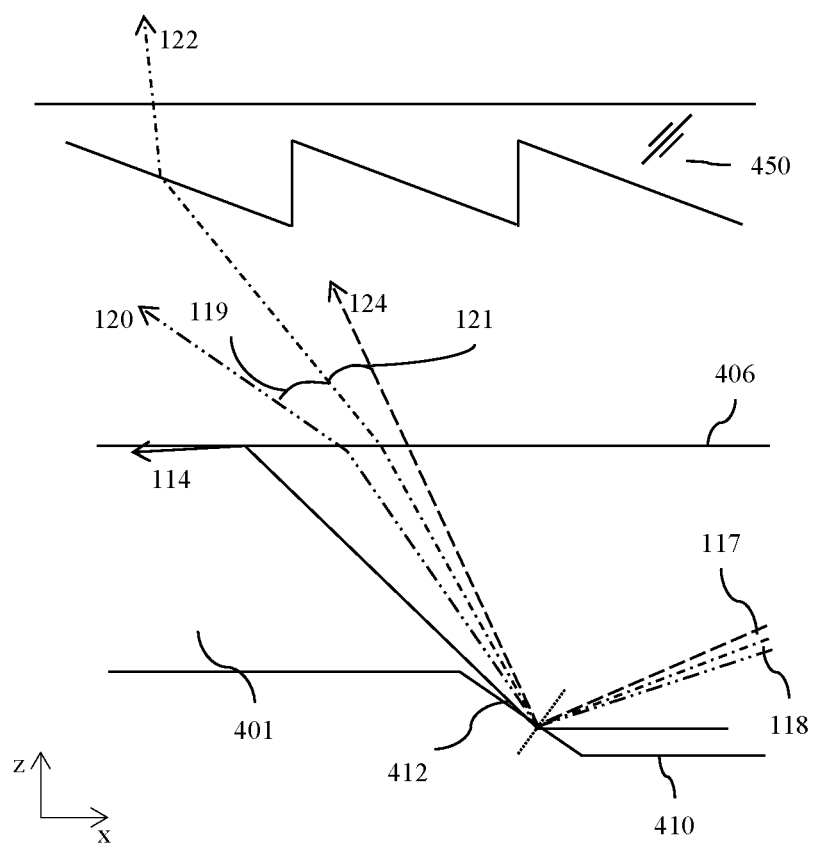
FIG. 45 is a schematic diagram illustrating in side view the output of light from a near-eye display apparatus, in accordance with the present disclosure.

Propagation of light from the waveguide 401 will be further considered. In this regard, FIG. 45 is a schematic diagram illustrating in side view the output of light from a near-eye display apparatus. As shown in FIG. 45, after incidence with the end mirror surface 4, which may provide a collimating function in the xy plane, counter propagating light rays 120, 122, 124 may be incident on a reflective light extraction feature 412. Light cone 118 from illumination elements 126, 128 is directed into a first light cone 119 in air after exiting the optical valve, whereas light cone 117 from illumination elements 130, 132 is directed into a second light cone 121, different from cone 119. The lateral cone angle is determined by the optical function of the end mirror surface and curve radii on light extraction features 412. Thus, the position of the illumination element 126 with respect to the focusing optical element 101 determines the output cone directional distribution of the waveguide 401. Advantageously, the present embodiments can achieve a two dimensional array of addressable angular windows that achieves advantageous display properties as will be described.

Deflection films 450 such as prismatic films may be further arranged to shift the direction of the output to a desired viewing angle for the display. For example, in embodiments where rays 111, 113 are arranged to be guided within the waveguide 401, then deflection films can rotate the output direction to the normal of side 406.

Figure 46A:
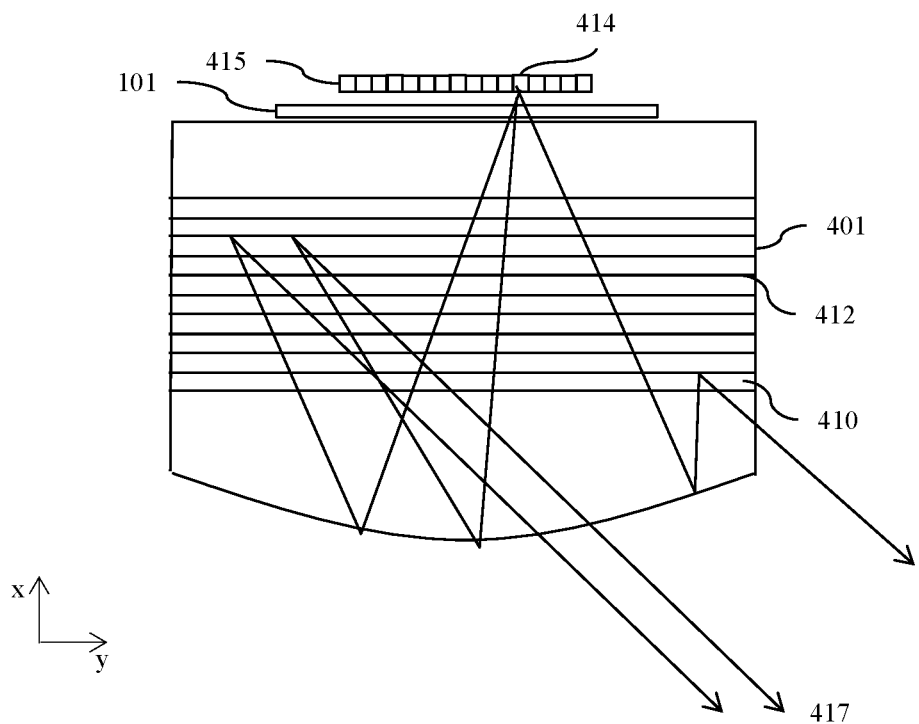
FIG. 46A is a schematic diagram illustrating in front view the output of light from a near-eye display apparatus, in accordance with the present disclosure.

FIG. 46A is a schematic diagram illustrating in front view the output of light from a near-eye display apparatus. FIG. 46A illustrates the formation of an angular window 78 (comprising a single output direction) by a single pixel 414 of the illumination array 415 for example as shown in FIG. 40. In this embodiment, consistent for example with FIG. 5, the reflective end 404 has positive optical power in the lateral direction, so the light extraction features 412 that extend across the lateral direction may be linear. Thus the optical element 101, reflective end 404 and light extraction features 412 cooperate to direct all light rays 417 from pixel 414 into a single direction and thus the same angular window. Adjacent pixels of the illumination array 415 are thus arranged to provide different angular outputs. The optical power of the system may further comprise output lenses such as Fresnel lenses or the device may be incorporated into spectacles as will be described.

Figure 46B:
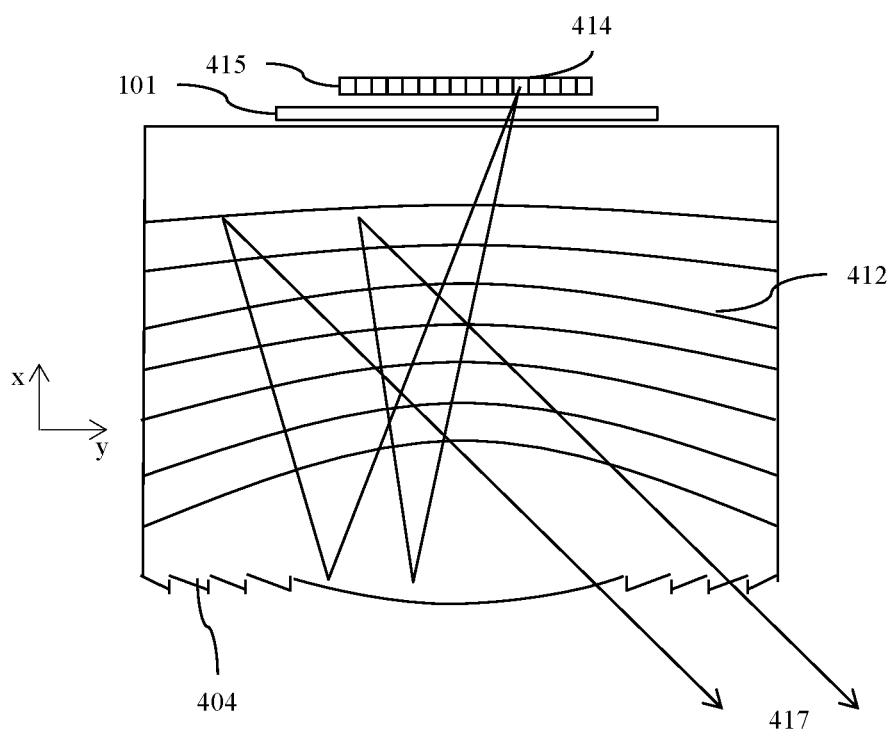
FIG. 46B is a schematic diagram illustrating in front view the output of light from a further near-eye display apparatus, in accordance with the present disclosure.

FIG. 46B is a schematic diagram illustrating in front view the output of light from a further near-eye display apparatus. FIG. 46B illustrates an embodiment comprising focusing optical element 101 combined with the reflective end 404 that may comprise a Fresnel mirror, and light extraction features 412 that extend across the lateral direction, but instead of being linear are curved so that they have positive optical power in the lateral direction. Advantageously, this embodiment substantially reduces the size of the optical element by removing the sag of side 404 compared to the embodiment of FIG. 46A.

Figure 47:
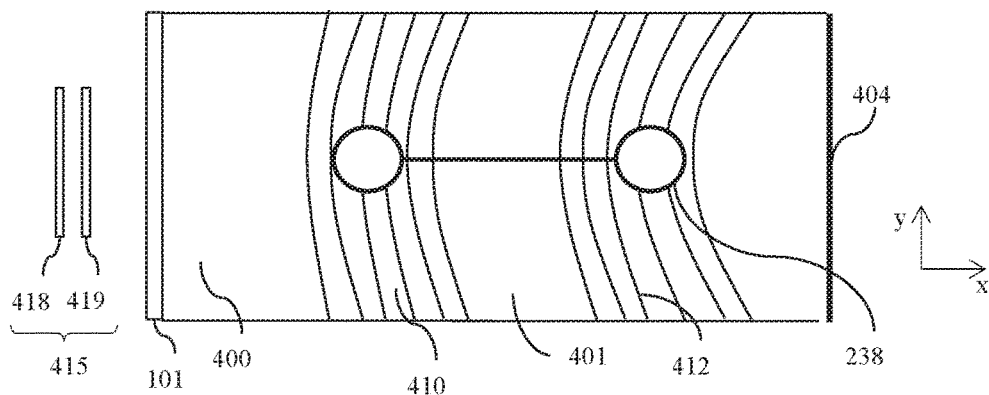
FIG. 47 is a schematic diagram illustrating in front view a further near-eye display apparatus, in accordance with the present disclosure.

FIG. 47 is a schematic diagram illustrating in front view a further near-eye display apparatus. FIG. 47 illustrates an embodiment wherein the reflective end 404 is arranged as a reflective planar surface and the light extracting regions 407, 409 comprise light guiding features 410 and light extraction features 412 that are curved to provide optical power so as to provide imaging of illumination array 415. Advantageously, such an embodiment provides a more compact size.

FIG. 47 further illustrates an illumination array 415 comprising a backlight 418 and an SLM 419. The backlight directs light through the SLM 419 into the imaging directional waveguide 401. The SLM 419 may be a transmissive or reflective spatial light modulator. The backlight 418 may be a simple backlight, or may be a condensing system arranged to direct light into the waveguide from a light source. In other embodiments the illumination array 415 may be provided by an emissive display such as an OLED display.

Figure 48:
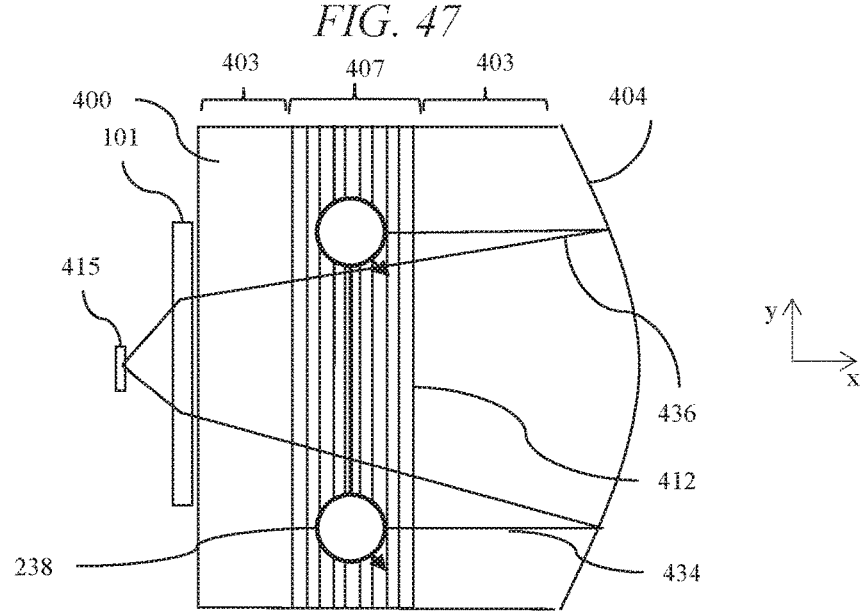
FIG. 48 is a schematic diagram illustrating in front view a further near-eye display apparatus, in accordance with the present disclosure.

FIG. 48 is a schematic diagram illustrating in front view a further near-eye display apparatus. FIG. 48 illustrates an embodiment wherein a single light extraction region 407 is provided, to advantageously provide a landscape orientation of valve planar display imaging directional waveguide 401.

Figure 49:
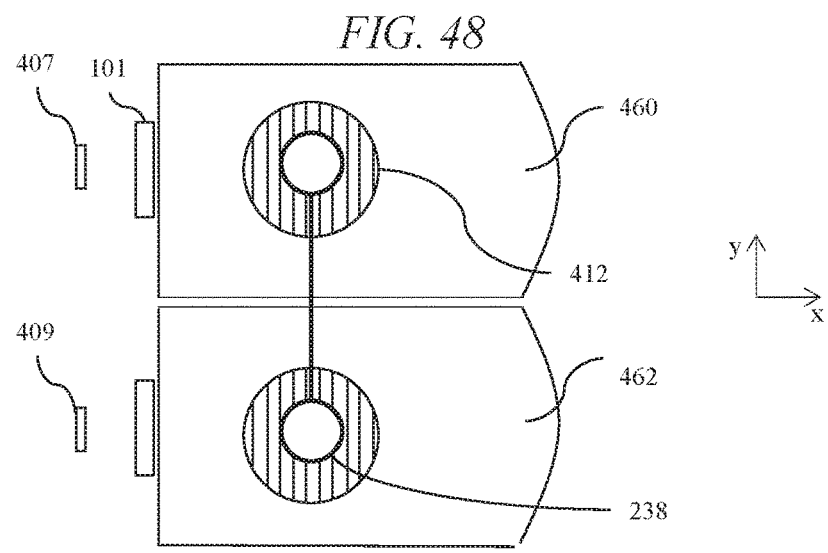
FIG. 49 is a schematic diagram illustrating in front view a further near-eye display apparatus, in accordance with the present disclosure.

FIG. 49 is a schematic diagram illustrating in front view a further near-eye display apparatus. FIG. 49 illustrates an embodiment comprising a landscape orientation waveguide 401 that includes first and second imaging regions 460, 462 aligned to respective pixel arrays 407, 409 and a focusing optical element 101. Advantageously, the aberrations of the output image will be improved compared to the arrangement of FIG. 48. Further, such an embodiment can provide different images for left and right eyes that can be used to achieve a stereoscopic display apparatus. Further, light extraction features 412 may be arranged over a limited area so that pupils of observer 238 may be arranged with the light extraction features 412 for viewing an image, or may achieve high image fidelity for ambient illumination by positioning eyes outside regions comprising features 412.

Figure 50:
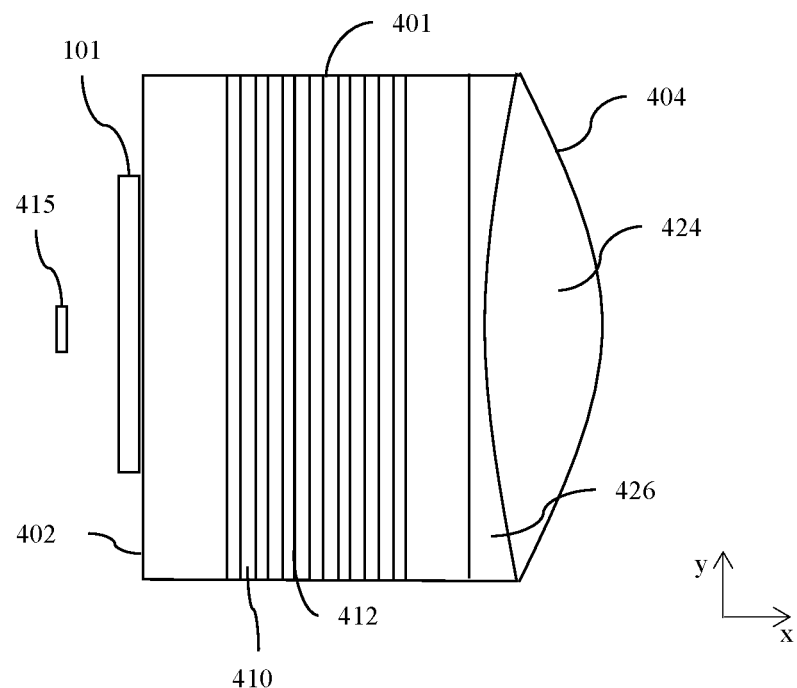
FIG. 50 is a schematic diagram illustrating in front view a further near-eye display apparatus, in accordance with the present disclosure.

FIG. 50 is a schematic diagram illustrating in front view a further near-eye display apparatus. FIG. 50 illustrates an embodiment wherein a compound lens formed by lens elements 424 and 426 is provided in front of the reflective end 404. Thus, optical power of the collimating optical element in the xy plane is determined by reflector at reflective end 404, lens element 424 (comprising a first material) and lens element 426 (comprising a second material with refractive index different to the first material). The second material may be the same as the material used to form the waveguide 401, whereas the lens element 424 may be attached to the waveguide 401. Advantageously, such an arrangement may improve the aberrational performance of the collimating function of the waveguide 401.

Figure 51:
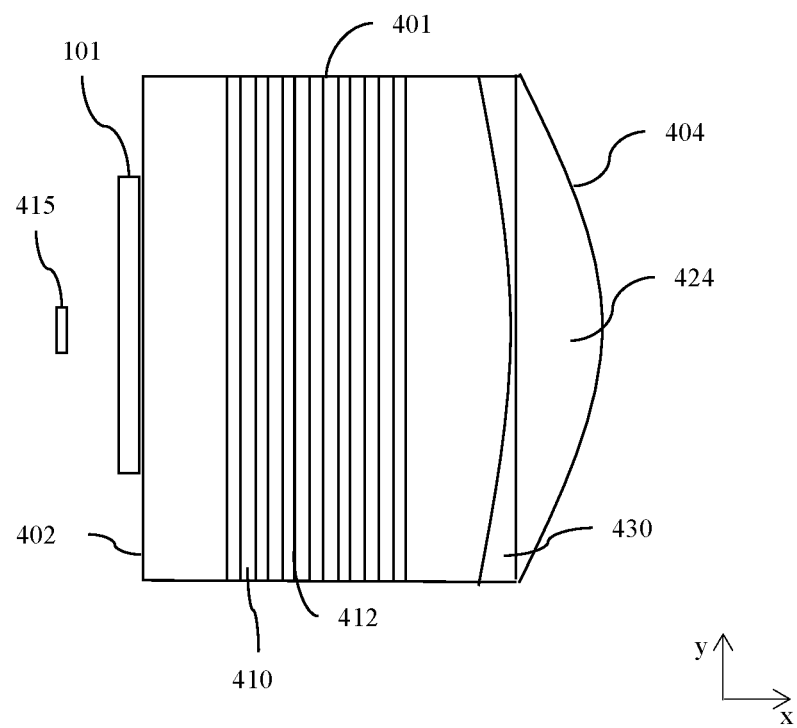
FIG. 51 is a schematic diagram illustrating in front view a further near-eye display apparatus, in accordance with the present disclosure.

FIG. 51 is a schematic diagram illustrating a further embodiment wherein a further optical element 430 is incorporated, thus improving the aberrational performance.

Figure 52A:
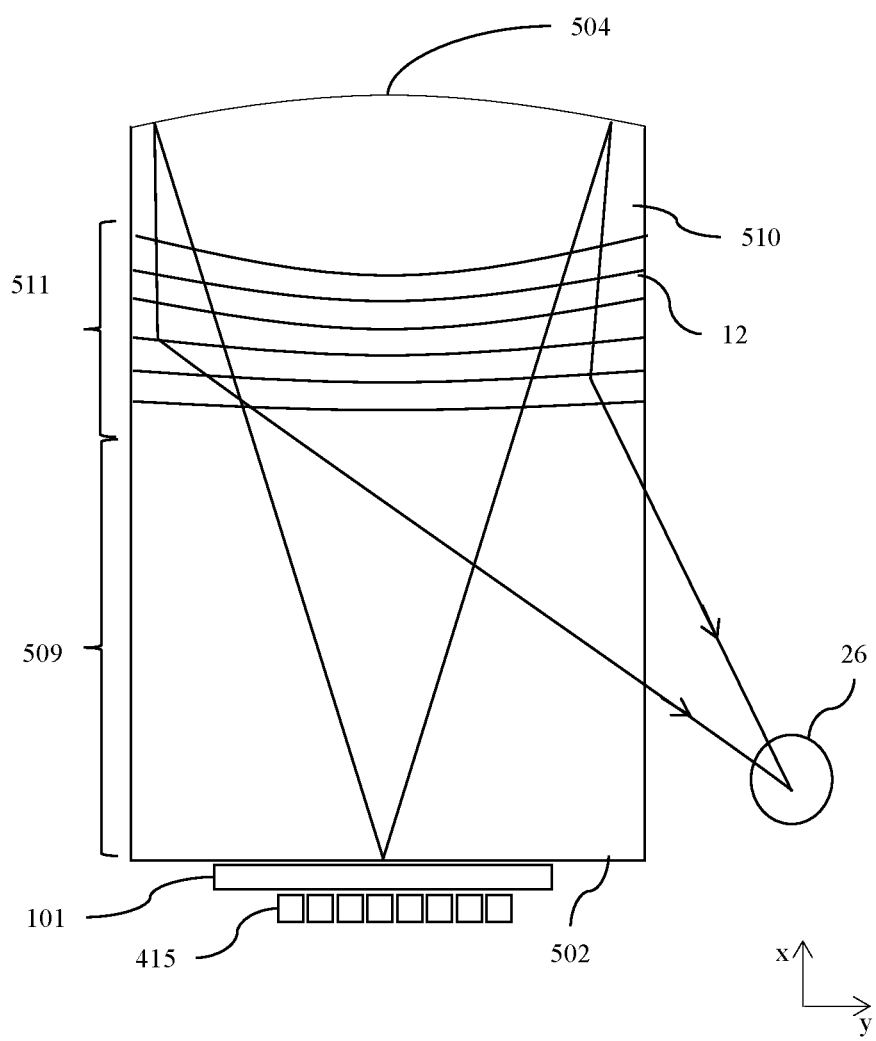
FIG. 52A is a schematic diagram illustrating in front view a further near-eye display apparatus, in accordance with the present disclosure.

FIG. 52A is a schematic diagram illustrating in front view a further near-eye display apparatus. FIG. 52A illustrates an embodiment wherein an extended length input section 509 without any light extraction features 12 is provided between the reflective end 504 and light extraction region 511 where the light extraction features 12 are provided. Further, a non-extracting section 510 may be provided between the light extraction region 511 and the reflective end 504 to further increase the length of the waveguide 510. Advantageously, the back working distance of the reflective end 504 is increased, so that the off-axis imaging performance of the reflective end 504 is improved, and the image fidelity is increased, particularly for off-axis pixels.

Figure 52B:
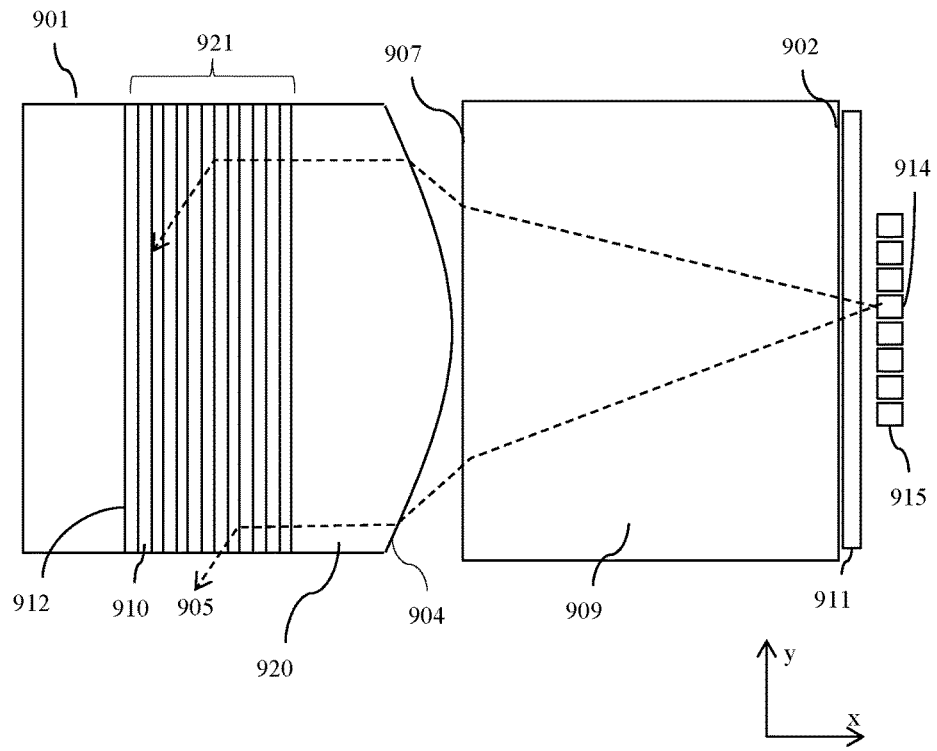
FIGS. 52B-C are schematic diagrams illustrating in front view further near-eye display apparatuses including alternative forms of waveguide arrangement, in accordance with the present disclosure.
Figure 52C:
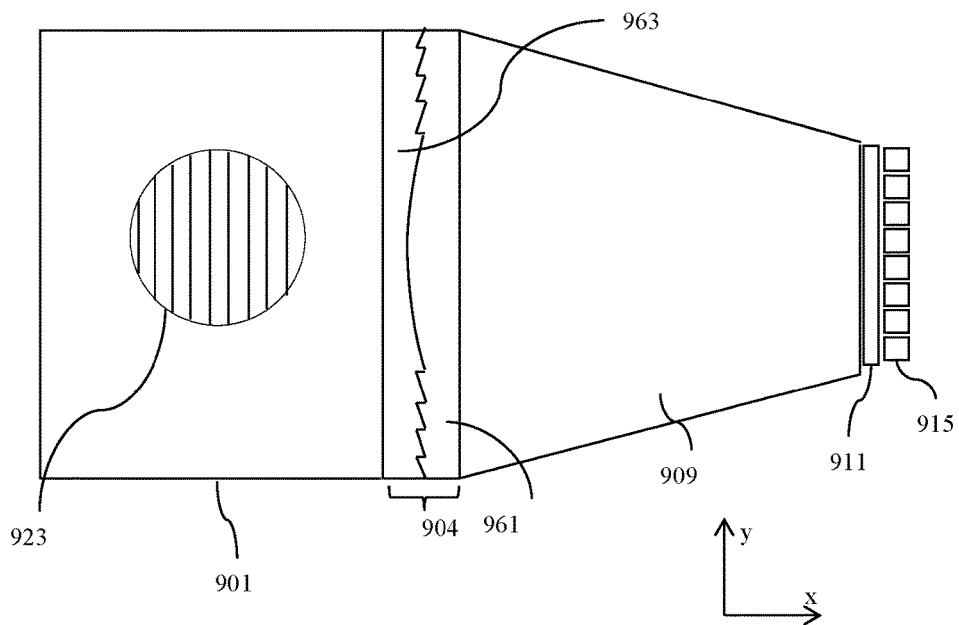

FIGS. 52B-C are schematic diagrams illustrating in front view further near-eye display apparatuses comprising alternative forms of waveguide arrangement. In each case, the waveguide 901 is arranged with the light extraction features 912 facing the input end 902 so that light is extracted by the light extraction features 912 without being reflected inside the waveguide 901 by a reflective end. In addition, a light-expansion waveguide 909 is provided between the illumination array 15 and the input end 904 to guide light from the illumination array 15 into the waveguide 901 through the input end 904.

As illustrated schematically in front view in FIG. 52B, light rays 905 are emitted from an illumination element 914 of the illumination array 915 located at different lateral positions, along the input end 902 of a light expansion waveguide 909 and further comprising focussing optical element 911. Light rays 905 propagate along the direction perpendicular to the lateral direction (x-axis) within the light-expansion waveguide 909 while at the same time fanning out in the x-y plane until upon reaching the output end 907 of the light-expansion waveguide 909 and propagate into air before incidence on the input end 904 of the waveguide 901. The input end 904 is provided with positive optical power in the lateral direction and may be arranged to substantially collimate the light from the illumination elements 914 in the waveguide 901. The waveguide has a non-extracting region 920 adjacent the input end 904 where light is not extracted, and a light extraction region 921 having light extraction features 912 that direct light rays 905 out of the waveguide 901 in the z direction. As for the waveguides described previously, the waveguide 901 comprises light extraction features 912 and light guiding features 910. In comparison to the arrangement of FIG. 52A, advantageously the waveguide 901 does not provide reflection from a reflective end, and so can be more conveniently fabricated.

FIG. 52C is a schematic diagram illustrating a further embodiment similar to that of FIG. 52B except that the arrangement at the input end 904 is modified as follows. In particular, there is arranged between the light-expansion waveguide 909 and the waveguide 901 a first body 961 and second body 963 with different refractive indices and a cylindrical curved surface such as a Fresnel lens therebetween, so as to provide the input end 904 with positive optical power giving the same optical function as the embodiment of FIG. 52B. The first body 961 may be provided by the same material as the light-expansion waveguide 909, whereas second body 963 may be a material of a lower refractive index such as silicones, fluorinated materials or aerogels.

Further, the light-expansion waveguide 909 may be tapered to reduce the material cost and bulk, as the light expands towards the aperture of the input end 904, and light outside this region may be lost. Advantageously the light transmission of this embodiment may be improved as light does not propagate into air as in the embodiment of FIG. 52B between the output end 907 of the light-expansion waveguide 909 and the input end 904 of the waveguide 901. Also, the thickness of input end 904 can be reduced, reducing cost. Further, similar to the embodiment of FIG. 43E for example, the light extraction region 923 can be reduced in size, reducing the area over which degradation artefacts from viewing the ambient environment through the waveguide 901 through the region 923 can be seen.

Figure 52D:
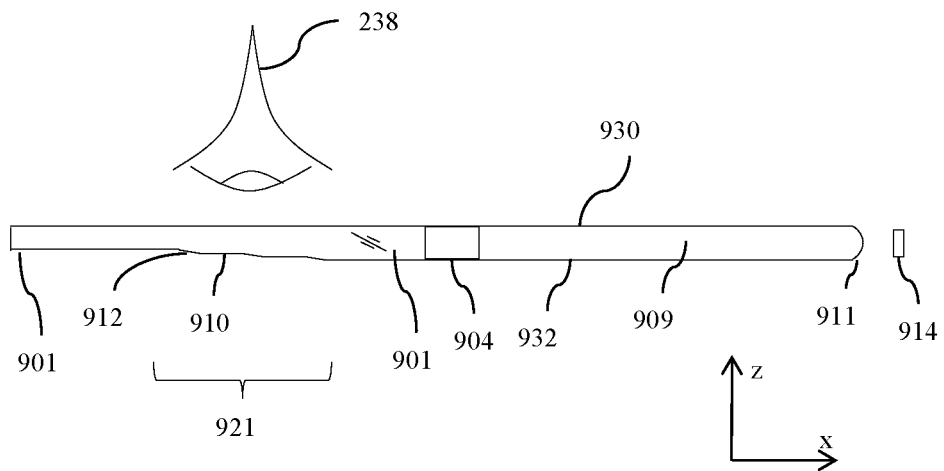
FIGS. 52D-E are schematic diagrams illustrating in side view further near-eye display apparatuses including alternative forms of waveguide arrangement, in accordance with the present disclosure.
Figure 52E:
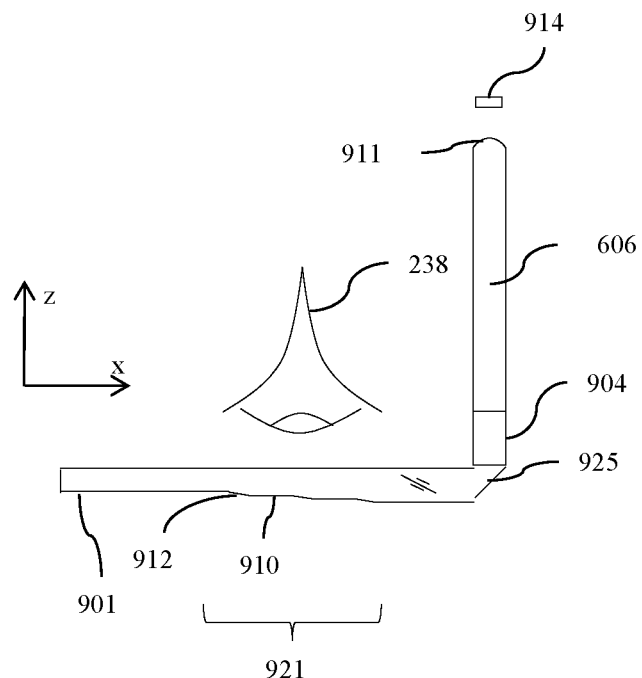

FIGS. 52D-E are schematic diagrams illustrating in side view further near-eye display apparatuses comprising alternative forms of waveguide arrangement. Similar to the embodiments of FIGS. 52B-C, in each case the waveguide 901 is arranged with the light extraction features 912 facing the input end 902 and a light-expansion waveguide 909 is provided between the illumination array 15 and the input end 904.

FIG. 52D shows that the light guiding surfaces 932, 930 of the light-expansion waveguide 909 may be parallel and planar so light loss within the light-expansion waveguide 909 is minimised.

FIG. 52E shows a folded arrangement comprising a turning mirror 925. The light-expansion waveguide 909 may for example be arranged along the arm of a pair of spectacles in a similar manner to that shown in FIG. 57.

Figure 53:
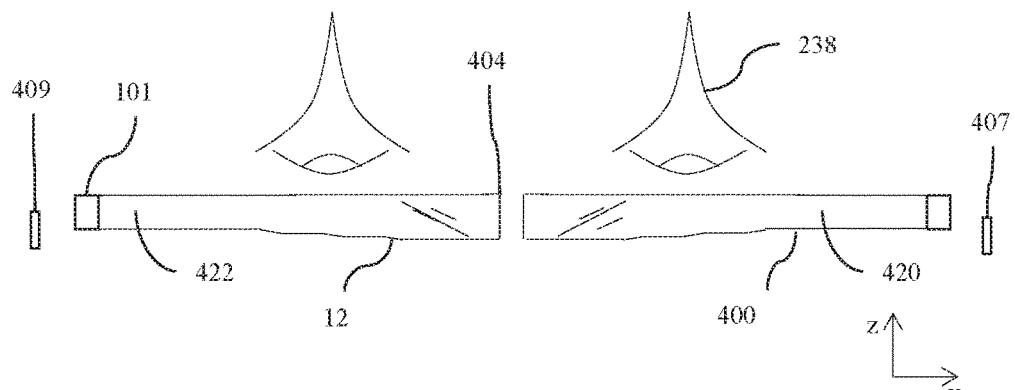
FIG. 53 is a schematic diagram illustrating in side view a near-eye stereoscopic display apparatus, in accordance with the present disclosure.

FIG. 53 is a schematic diagram illustrating in side view a tiled array of near-eye display apparatuses comprising respective independently illuminated waveguides 420, 422. Advantageously, such an embodiment can provide separate images to left and right eyes, reducing image cross talk and increasing brightness, and achieving stereoscopic display function.

Figure 54:
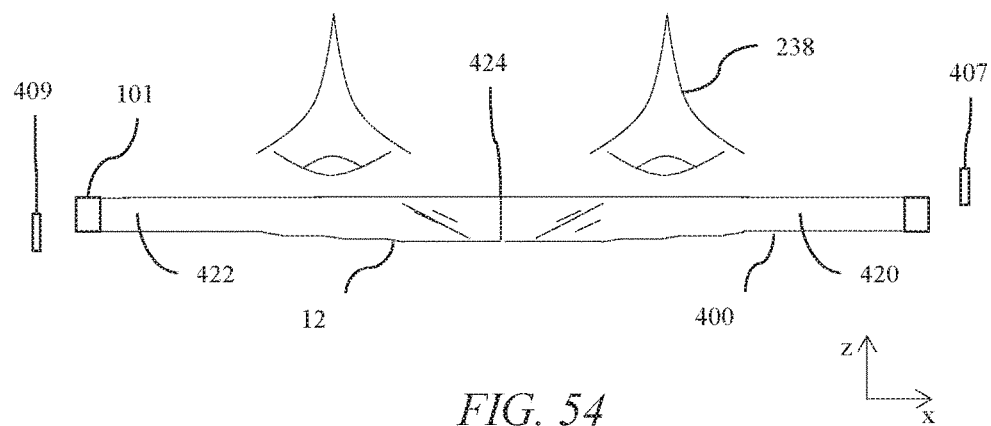
FIG. 54 is a schematic diagram illustrating in side view a near-eye stereoscopic display apparatus, in accordance with the present disclosure.

FIG. 54 is a schematic diagram illustrating in side view a tiled array of near-eye display apparatuses comprising respective independently illuminated waveguides 420, 422 comprising an integrated mirror element 424. The mirror 424 may be for example a hologram. Advantageously, such an embodiment can provide a compact stereoscopic arrangement that may be fitted to the front of direct view displays with low visibility of the seam, as will be described below.

Figure 55:
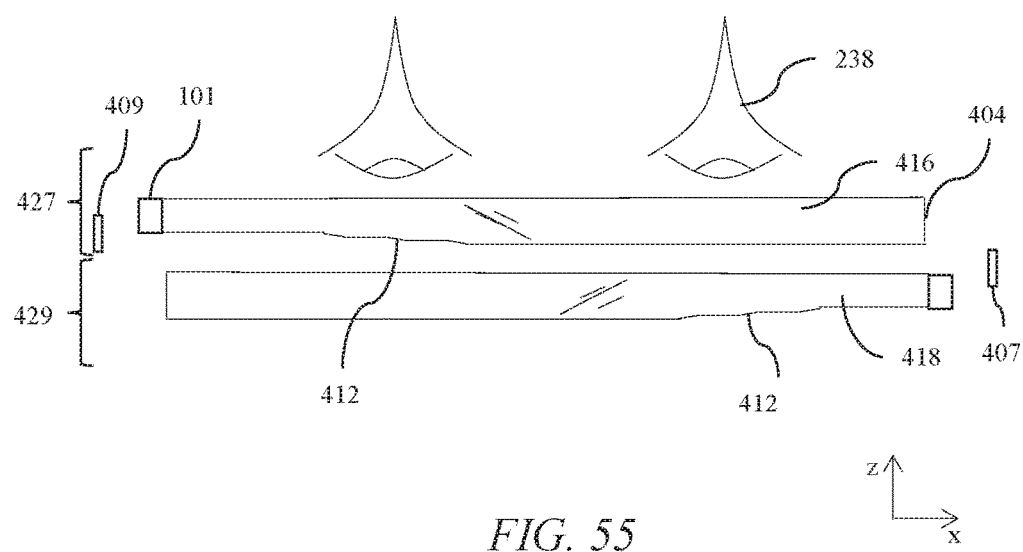
FIG. 55 is a schematic diagram illustrating in side view a further near-eye stereoscopic display apparatus, in accordance with the present disclosure.

FIG. 55 is a schematic diagram illustrating in side view a stacked array of near-eye display apparatuses comprising respective waveguides 427, 429 with independently illuminated by SLMs 407, 409. Advantageously such an embodiment can provide separate images to left and right eyes, reducing image cross talk and increasing brightness while maintaining uniformity if used with an underlying display apparatus. Planar regions may comprise optical correction and extended length may achieve improved aberrations.

Figure 56:
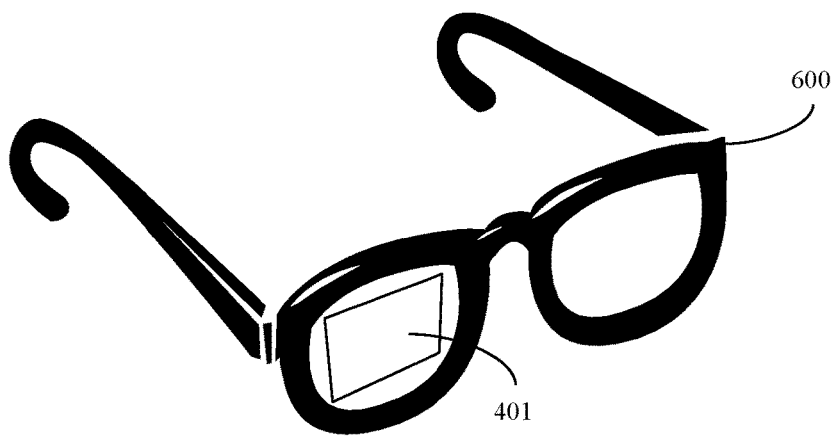
FIG. 56 is a schematic diagram illustrating schematically a near-eye display apparatus incorporated into a pair of spectacles, in accordance with the present disclosure.

FIG. 56 is a schematic diagram illustrating a near-eye display apparatus incorporated into a pair of spectacles 600. Spatial light modulators 415 and electronics may be provided in the frame of the spectacles. Further, the present embodiments are advantageously substantially transparent to normally incident light and so can be advantageously used for augmented reality viewing of image data, overlayed on real world imagery. Further, the spectacles may be further provided with optical corrective lens to reduce the amount of power that is provided by focusing optical element 101 and side 404.

Figure 57:
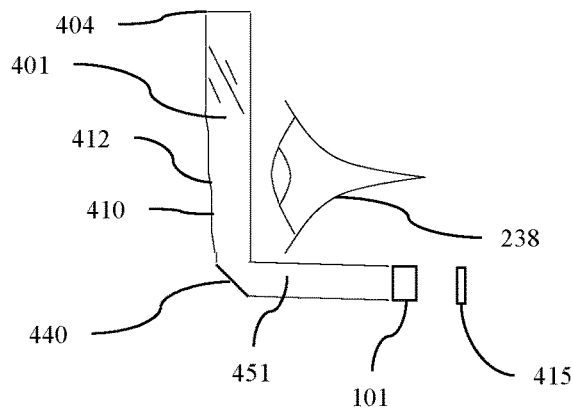
FIG. 57 is a schematic diagram illustrating in side view a folded near-eye display apparatus, in accordance with the present disclosure.
Figure 58:
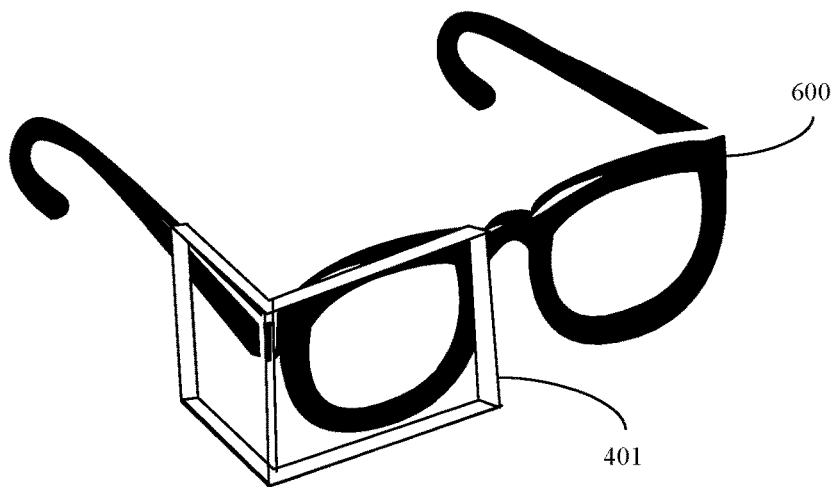
FIG. 58 is a schematic diagram illustrating schematically near-eye display apparatus incorporated into a pair of spectacles, in accordance with the present disclosure.

FIG. 57 is a schematic diagram illustrating in side view a near-eye display apparatus including a folded waveguide 420 arranged to reduce the perceived waveguide size when mounted on spectacles. A turning mirror 440 may arranged to direct guided images into the extraction region of the waveguide. Advantageously, the SLM 415 and a beam expansion region 451 of waveguide 401 may be mounted on the arms of spectacles 600 as shown in FIG. 58.

Figure 59:
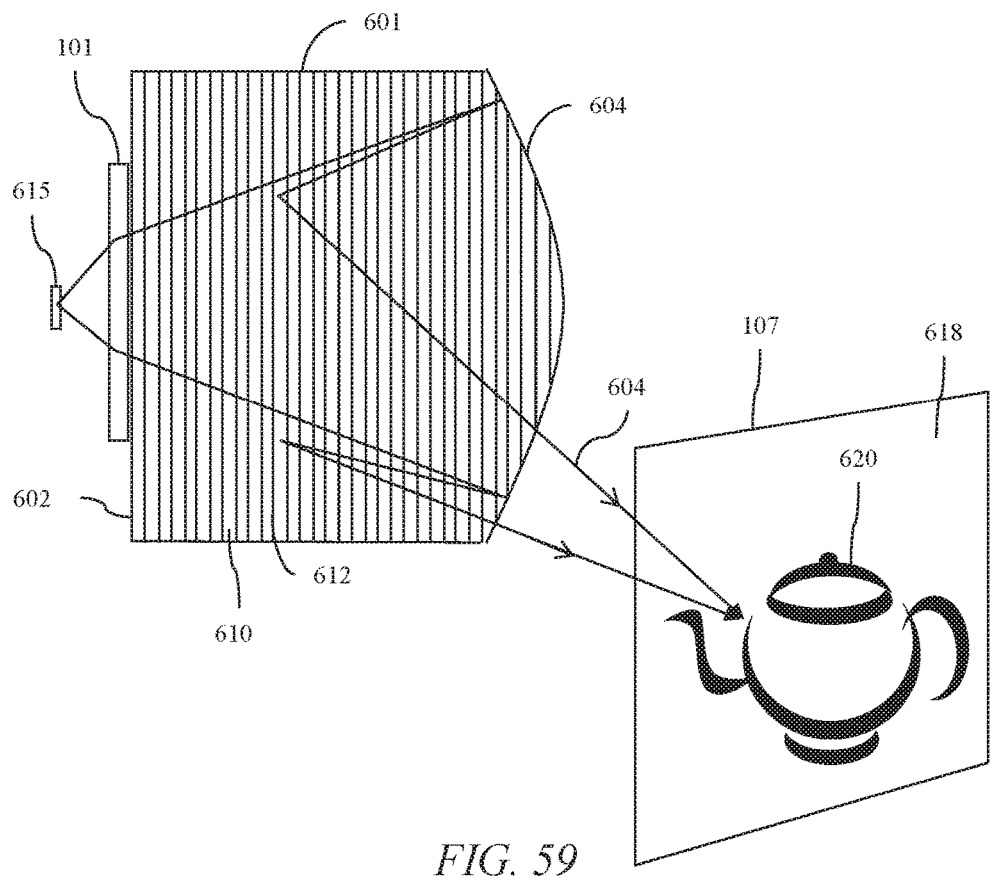
FIG. 59 is a schematic diagram illustrating a projection display apparatus comprising a waveguide arrangement, in accordance with the present disclosure.

FIG. 59 is a schematic diagram illustrating a projection display device comprising a waveguide arrangement including a waveguide 601. An illuminator array 615 illuminates a focusing optical element 101 and a directionally illuminated waveguide 601. The illuminator array 615 is operated in the same manner as the near-eye display device described above. The reflective end 604 directs light from the illumination array 615 to light extraction features 612 via guiding features 610. The waveguide 601 has an arrangement as discussed above wherein a focusing optical element 101, reflective end 604 and light extraction features 612 cooperate to provide optical images of the light sources of the display 615 at a window plane 107 in front of the display device. Thus the operation of the arrangement of FIG. 59 is similar to the arrangements discussed above. The extracted light from the features is incident on a screen 618 at the window plane 107, whereon an image 620 may be seen. Advantageously such an arrangement may provide a compact projection apparatus that may be planar.

Figure 60:
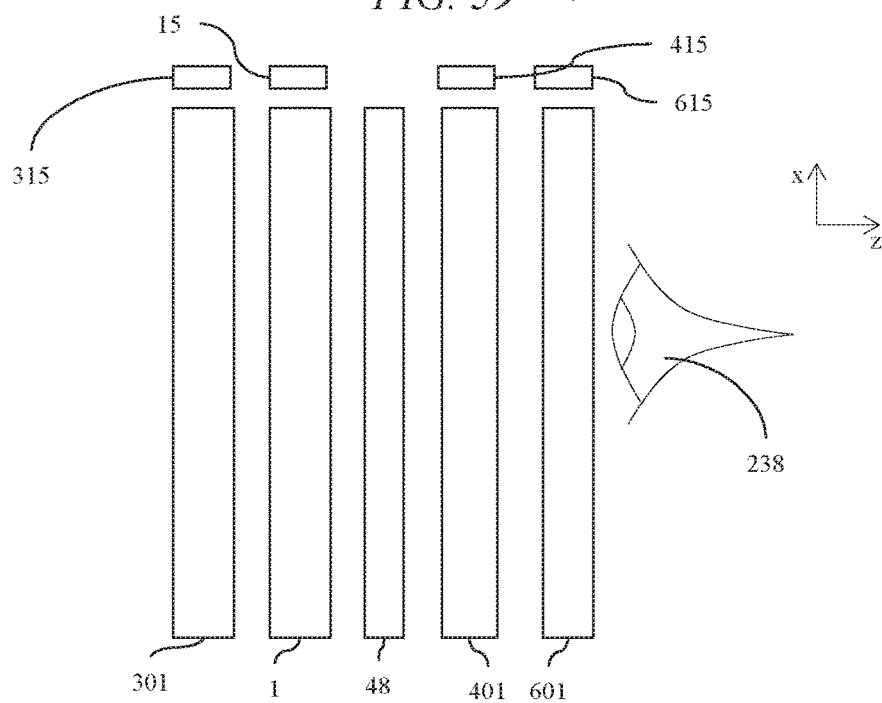
FIG. 60 is a schematic diagram illustrating a multi-function display apparatus, in accordance with the present disclosure.

FIG. 60 is a schematic diagram illustrating a multi-function display apparatus that may be achieved using the valve and unidirectional planar display imaging directional waveguides of the present embodiments in combination. A display stack comprises a 2D output backlight 301 and light source 315, a waveguide 1 of a directional display device, a transmissive direct view spatial light modulator 48, a directionally-illuminated waveguide 401 of a near-eye display device (as described above) and a directionally-illuminated waveguide 601 of a projection display device (as described above).

In operation, a 2D mode may be achieved by activating light source 315 to illuminate backlight 301; advantageously, light is transmitted through the remainder of the elements.

In an autostereoscopic display mode, the waveguide 1 of the directional display device is illuminated by a illumination array 15 to provide autostereoscopic windows in cooperation with time multiplexed data provided to the SLM 48.

In a near-eye display mode, the illumination array 415 of the near-eye display device is illuminated to provide a collimated output.

Finally, in a projection mode of operation, illumination array 615 of the projection display device is activated to provide a projected image by means of the waveguide 601.

Advantageously, such an arrangement can be achieve multiple display functions on a single platform due to the transparency of the respective waveguides 1, 401, 601. Thus, a smartphone device for example may be used for direct view operation, as an autostereoscopic display or for imaging large sized magnified images.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A head-mounted apparatus, comprising:
    a waveguide comprising an input end, and first and second, opposed guide surfaces for guiding light along the waveguide, the first guide surface being arranged to guide light by total internal reflection and the second guide surface having a stepped shape comprising a plurality of facets extending in a lateral direction across the waveguide and oriented to reflect input light from the input end through the first guide surface as output light, and intermediate regions between the facets that are arranged to direct light through the waveguide without extracting it, the waveguide attached to a head worn mount arranged to extend across at least one eye of a user when worn on the head of the user; and
    an illumination system selectively operable to provide the input light directed from different lateral positions distributed in the lateral direction and further directed in different input directions distributed perpendicular to the lateral direction, the output light in output directions that are distributed, with respect to a normal to the first guide surface, in the lateral direction in dependence on the lateral position of the input light and are further distributed, with respect to a normal to the first guide surface, perpendicular to the lateral direction in dependence on the input direction of the input light; and
    further comprising a control system arranged to operate the illumination system to provide the input light directed from the different lateral positions and further directed in the different input directions in accordance with image data representing an image.

2. A head-mounted apparatus according to claim 1, wherein the pitch of the facets is irregular.

3. A head-mounted apparatus according to claim 1, further comprising a compensating optical element extending across the second guide surface of the waveguide and having a surface facing the second guide surface that has a matching shape.

4. A head-mounted apparatus according to claim 1, being a pair of spectacles comprising lenses arranged to extend across both eyes of the user when the pair of spectacles is worn.

5. A pair of spectacles according to claim 4, wherein the lenses are corrective lenses having optical power for correcting eyesight.

6. A pair of spectacles according to claim 5, wherein the corrective lenses are separate elements from the waveguide.

7. A pair of spectacles according to claim 5, wherein the corrective lenses are formed by a guide surface of the waveguide.

8. A near-eye display apparatus arranged to display a collimated image represented by image data, the display apparatus comprising:
    a waveguide comprising an input end, and first and second, opposed guide surfaces for guiding light along the waveguide, the first guide surface being arranged to guide light by total internal reflection and the second guide surface having a stepped shape comprising a plurality of facets extending in a lateral direction across the waveguide and oriented to reflect input light from the input end through the first guide surface as output light, and intermediate regions between the facets that are arranged to direct light through the waveguide without extracting it;
    an illumination system selectively operable to provide the input light directed from different lateral positions distributed in the lateral direction and further directed in different input directions distributed perpendicular to the lateral direction, the output light in output directions that are distributed, with respect to a normal to the first guide surface, in the lateral direction in dependence on the lateral position of the input light and are further distributed, with respect to a normal to the first guide surface, perpendicular to the lateral direction in dependence on the input direction of the input light; and
    a control system arranged to operate the illumination system to provide the input light directed from the different lateral positions and further directed in the different input directions in accordance with the image data.

9. A near-eye display apparatus according to claim 8, wherein the illumination system comprises a one-dimensional array of light sources distributed across the input end of the waveguide in the lateral direction to provide the input light from different lateral positions distributed in the lateral direction and a deflector element arranged between the array of light sources and the waveguide that is selectively operable to deflect the light output by the array of light sources by different amounts perpendicular to the lateral direction to provide the input light in different input directions distributed perpendicular to the lateral direction, the control system being arranged to operate the operate the array of light sources to display successive lines of image data and to operate the deflector element in synchronization therewith.

10. A method of displaying a collimated image, the method comprising:
    using a waveguide arrangement comprising a waveguide comprising an input end, and first and second, opposed guide surfaces for guiding light along the waveguide, the first guide surface being arranged to guide light by total internal reflection and the second guide surface having a stepped shape comprising a plurality of facets extending in a lateral direction across the waveguide and oriented to reflect input light from the input end through the first guide surface as output light, and intermediate regions between the facets that are arranged to direct light through the waveguide without extracting it, the waveguide further comprising an illumination system selectively operable to provide the input light directed from different lateral positions distributed in the lateral direction and further directed in different input directions distributed perpendicular to the lateral direction, the output light in output directions that are distributed, with respect to a normal to the first guide surface, in the lateral direction in dependence on the lateral position of the input light and are further distributed, with respect to a normal to the first guide surface, perpendicular to the lateral direction in dependence on the input direction of the input light;

operating the illumination system to provide the input light directed from the different lateral positions and further directed in the different input directions in accordance with image to be displayed so that the output light represents said image as a collimated image; and displaying the collimated image for viewing by a user.

* * * * *